United States Patent [19]

Savage et al.

[11] Patent Number: 4,797,853
[45] Date of Patent: Jan. 10, 1989

[54] DIRECT MEMORY ACCESS CONTROLLER FOR IMPROVED SYSTEM SECURITY, MEMORY TO MEMORY TRANSFERS, AND INTERRUPT PROCESSING

[75] Inventors: Shaun V. V. Savage, Bountiful; Johnny M. Harris, Woods Cross, both of Utah

[73] Assignee: Unisys Corporation, Blue Bell, Pa.

[21] Appl. No.: 798,532

[22] Filed: Nov. 15, 1985

[51] Int. Cl.$^4$ .................. C06F 12/14; C06F 13/14
[52] U.S. Cl. ............................. 364/900; 364/200
[58] Field of Search ... 364/200 MS File, 900 MS File, 364/200, 900

[56] References Cited

U.S. PATENT DOCUMENTS

| | | | |
|---|---|---|---|
| 3,573,855 | 4/1971 | Cragon et al. | 340/172.5 |
| 3,710,324 | 1/1973 | Cohen et al. | 340/172.5 |
| 3,814,919 | 6/1974 | Repton et al. | 340/172.5 |
| 4,016,545 | 4/1977 | Lipovski | 364/900 |
| 4,017,840 | 4/1977 | Schild et al. | 340/172.5 |
| 4,121,286 | 10/1978 | Venton et al. | 364/200 |
| 4,149,239 | 4/1979 | Jenkins et al. | 364/200 |
| 4,151,593 | 4/1979 | Jenkins et al. | 364/200 |
| 4,177,510 | 12/1979 | Appell et al. | 364/200 |
| 4,438,493 | 3/1984 | Cushing et al. | 364/200 |
| 4,442,484 | 4/1984 | Childs, Jr. et al. | 364/200 |
| 4,519,032 | 5/1985 | Mendell | 364/200 |
| 4,527,237 | 7/1985 | Frieder et al. | 364/200 |
| 4,669,043 | 5/1987 | Laplinsky | 364/200 |

Primary Examiner—Gareth D. Shaw
Assistant Examiner—Adolfo Ruiz
Attorney, Agent, or Firm—Griffin, Branigan, & Butler

[57] ABSTRACT

In a data processing system, each direct memory access controller is connected to a bus and the memory it controls, the memory being connected to a bus, bypassing the controller. The controller simultaneously generates two addresses, one for addressing the memory space it controls and another for addressing memory space controlled by another controller. Data is then passed directly from one memory space over the bus to another memory space in a single clock cycle. When a controller is acting as a bus master it causes the generation of a system, user or external signal signifying what memory space it will be permitted to access and each controller includes comparison circuits for comparing an address on the bus with one or more address space limit values, depending upon which of the three signals is received. An error signal is produced by the controller if another controller attempts to address memory space which it is not permitted to access. The controller also includes registers for storing an interrupt address, a constant value and status, and circuitry for transferring the status and constant value over the bus for storage at the interrupt address, the transfer taking place automatically upon detection of an exception.

17 Claims, 22 Drawing Sheets

FIG. 2D
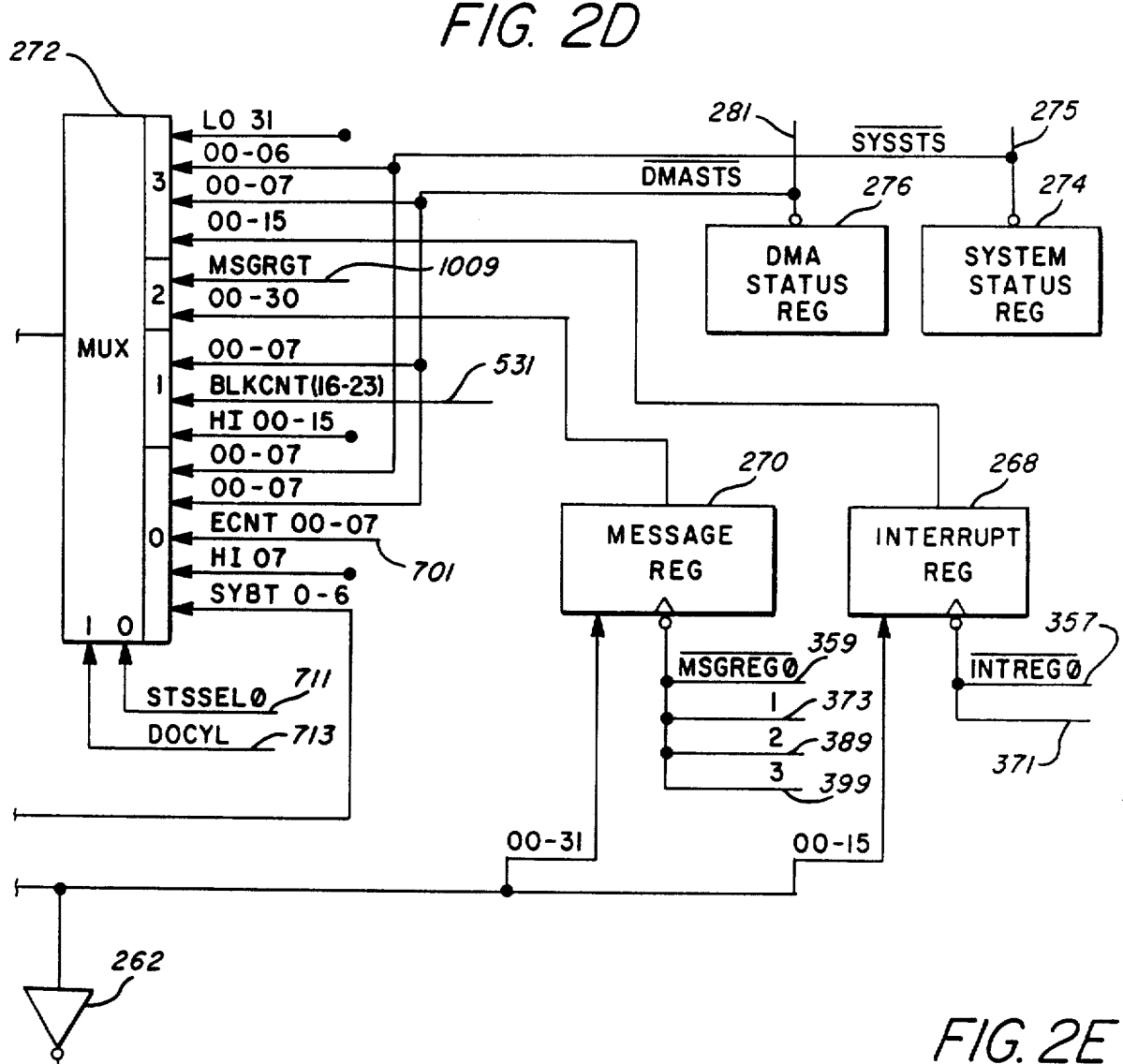
FIG. 2E
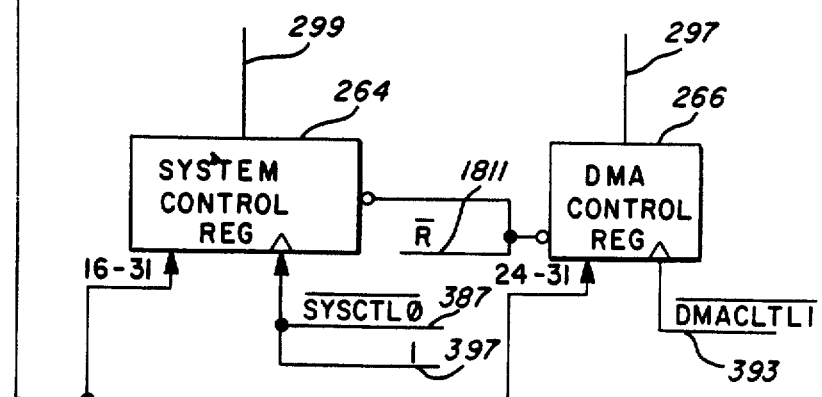
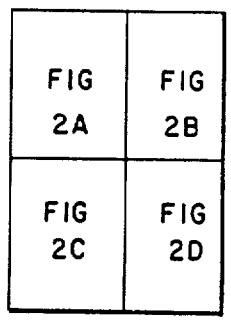

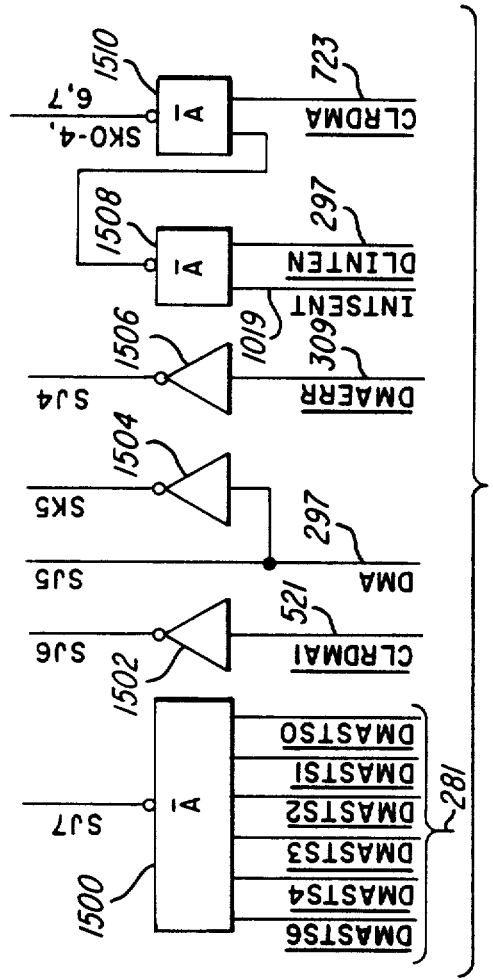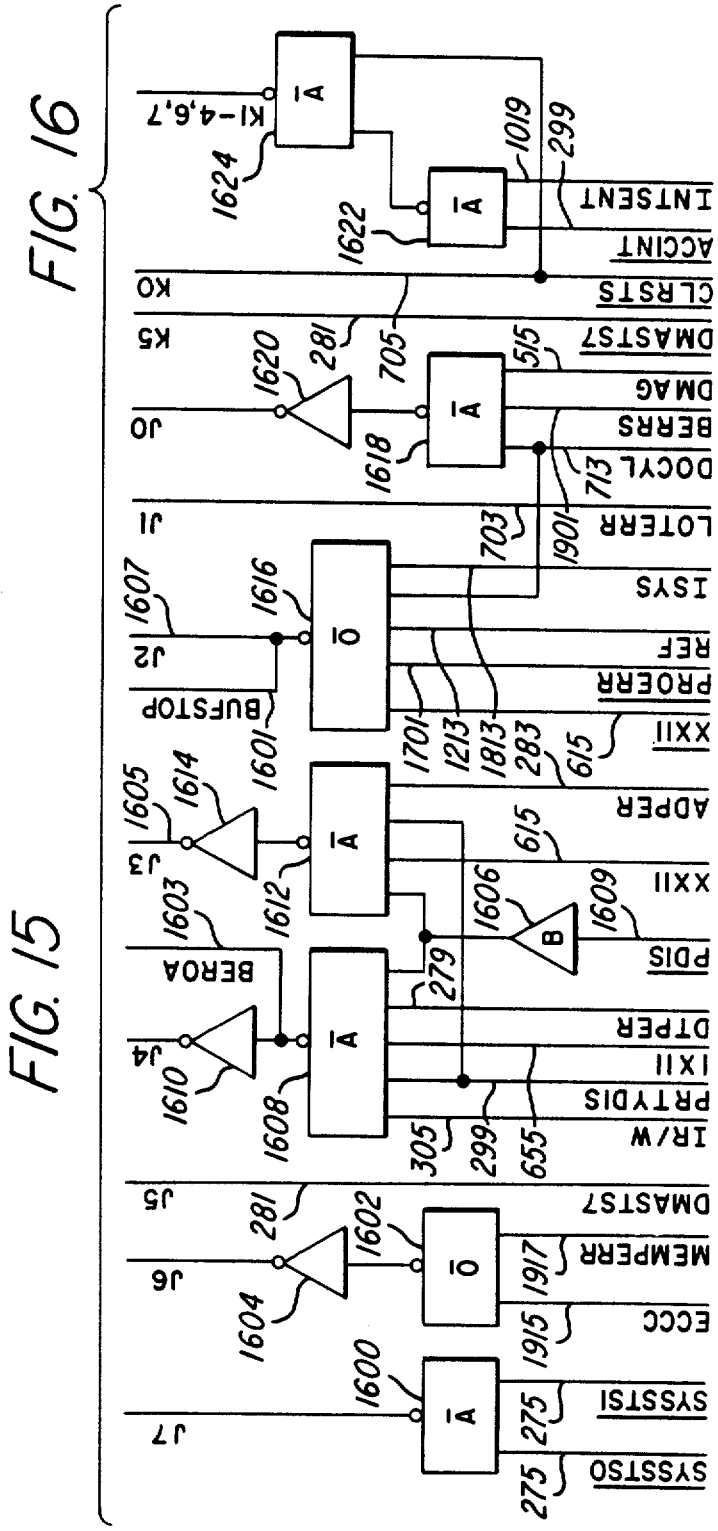

DIRECT MEMORY ACCESS CONTROLLER FOR IMPROVED SYSTEM SECURITY, MEMORY TO MEMORY TRANSFERS, AND INTERRUPT PROCESSING

FIELD OF THE INVENTION

The present invention relates to an improved memory controller which, when employed in a data processing system, enables the attainment of level A1 security, permits memory-to-memory transfers in a single cycle without intervening storage in registers, and provides improved interrupt processing.

BACKGROUND OF THE INVENTION

The problem of maintaining the security of data in data processing systems is well known. A given system may store data which should be maintained secret and it can be disastrous if part of the data is lost, mutilated, or becomes public. The system may have many terminals which should have access to some but not all of the stored data. Some of these terminals may be in-house but with increasing frequency some terminals of the system are telephone line connections which might be accessed by any member of the public if the access code should become known. With the proliferation of personal computers it is not uncommon for operators of these personal computers to gain access to a large computer system over telephone lines. When access is obtained the data stored in the system can become public knowledge. In addition, the PC operator may, in some instances, modify the stored data or even change the executive or supervisory program which controls the system.

Various approaches have been taken in attempting to provide a secure system but, insofar as we presently know, none of these approaches has achieved level A1 security. For example, the MC68020 provides function control signals which may be decoded to indicate whether an address specifies supervisory program space or data space or user program or data space. The decoded signals may then be used to limit access to certain portions of memory. However, if one should gain entry into the supervisory program then the function codes may be changed so that all memory space would become available. In accordance with one aspect of the invention each unit connected to a bus is categorized as "system", "user" or "external" to provide three levels of access to memory space. Furthermore, no user or external unit can gain access to the supervisory program which defines the categories of the units.

Direct memory access (DMA) controllers of the prior art generally require that the controller issue a first address to read the data to be transferred after which the controller must issue a second address indicating the location to which the data must be sent. In accordance with a second aspect of the invention a controller is provided which issues both addresses at the same time. This permits the memory-to-memory transfer of one word of data in a single clock pulse interval.

In the prior art it is conventional for a controller to issue an interrupt signal when an exception occurs. The exception may be an error, completion of a specific task, etc. In response to the interrupt the system processor issues a command to read the status of the unit asserting the interrupt. In accordance with a third aspect of the invention provision is made for selectively issuing an interrupt signal upon occurrence of an exception, as in the prior art, or automatically initiating an interrupt message cycle which transfers the status of the controller to a specific location in the local memory of the system processor.

SUMMARY OF THE INVENTION

An object of the present invention is to provide a more secure data processing system wherein units attached to the main bus cannot gain access to the supervisory program of the system processor.

An object of the invention is to provide a data processing system wherein units attached to a main bus cannot initiate the transfer of data directly to a system processor but must transfer the data to a memory from which it is retrieved by the system processor.

An object of the present invention is to provide a system wherein access to memory space is divided into "external", "user" and "system" categories, only controllers are permitted on the main bus, and the supervisory program of the system processor specifies the categories of memory space to which each controller may gain access.

A further object of the invention is to provide a data processing system wherein only controllers are permitted on the main bus and wherein each controller includes address registers for concurrently specifying first and second memory addresses so that a memory-to-memory transfer may take place in a single clock pulse interval.

A further object of the invention is to provide a system having memory controllers for accessing memories but the data transfer path from one memory to the other does not extend through any controller.

Still another object of the invention is to provide a system wherein an exception condition may initiate a controller cycle during which the controller contends for bus control and, upon obtaining bus control, transfers status information to an address specified by a register in the controller which is loaded prior to the detection of the exception.

Other objects of the invention and its mode of operation will become apparent upon consideration of the following description and the accompanying drawing.

BRIEF DESCRIPTION OF THE DRAWINGS

FIGS. 2A–2D, when arranged as shown in FIG. 2E, comprise a block diagram illustrating the major components of a DMA controller constructed in accordance with the principles of the present invention;

FIG. 15 illustrates the inputs for setting various stages of the DMA status register;

FIG. 16 illustrates the circuits for setting the various stages of the system status register;

DETAILED DESCRIPTION OF THE INVENTION

Conventions Employed

Figure 1:
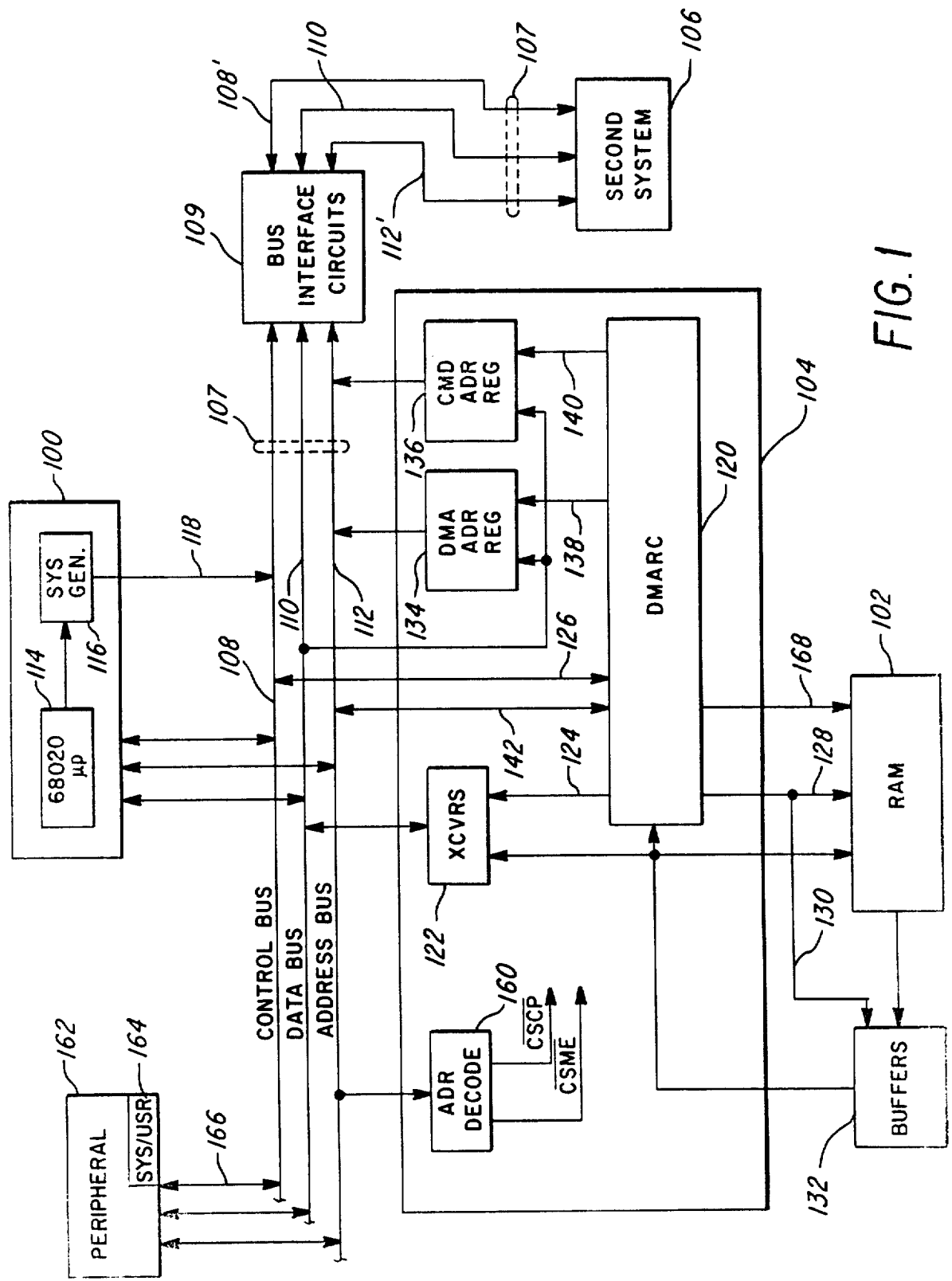
FIG. 1 is a block diagram of a data processing system employing the present invention.

In the following description the first digit of a three digit reference numeral or the first two digits of a four digit reference numeral indicates the figure where an element is located or, in the case of a lead line, the figure where the lead line originates. In the description the slash mark (/) preceding a signal mnemonic designates the complement whereas in the drawing a horizontal bar over a mnemonic indicates the complement.

The terms "asserted" and "negated" as used herein have nothing to do with signal voltage level. The term asserted is used to indicate that a signal is active, while the term negated is used to indicate that a signal is inactive or false.

Overview

FIG. 1 is a block diagram of a data processing network illustrating the use of a Direct Memory Access Ram Controller (DMARC) chip constructed in accordance with the principles of the present invention. The illustrated network, which is merely an example, includes a first data processing system comprising a system control processor 100, a local memory 102 for the processor 100, a control unit 104 for controlling the local memory 102 and a peripheral unit 162. The system control processor 100, the control unit 104, and the terminal 106 are all interconnected by a main bus 107 which includes a control bus 108, a 32-bit data bus 110 and a 32-bit address bus 112. Except for the processor 100, all first system devices on the bus 107 are controlled by a control unit similar to control unit 104. Each control unit, when it becomes a bus master, asserts either a system signal or a user signal defining the memory space to which it is permitted access. The particular signal which is asserted is determined by the setting of a register in the control units, this register being loadable only by the processor 100 when it is operating in the executive mode.

The system control processor 100 is schematically illustrated and includes at least an MC68020 microprocessor 114 and a signal generator 116 for selectively generating a system signal on a lead 118. When the processor 100 is executing a supervisory or executive routine this signal is asserted to disable memory protection circuitry and make all of the registers in all controllers 104 accessible. The signal on lead 118 is negated when the processor 100 is executing a user or applications program and in this case certain ones of the registers in controllers 104 are inaccessible to processor 100. In addition, when the signal on lead 118 is negated a certain portion of the local memory 102 is inaccessible to the processor. The system signal generator 116 asserts or negates the signal on lead 118 in accordance with the function code bits produced by the microprocessor 114.

The control unit 104 includes a DMARC chip 120 and a set of bidirectional tri-state transceivers 122. DMARC 120 produces signals on leads 124 to control the direction of data flow through the transceivers. Data from bus 110 may flow through transceivers 122 to the data inputs of DMARC 120 and RAM 102. On data transfers to the RAM the data signals are also applied to the DMARC 120 for error detection purposes. Depending upon the bus control signals applied to DMARC 120 over leads 126, the output of transceivers 122 may also be utilized to load various registers on the DMARC chip with values present on data bus 110.

DMARC 120 produces addressing signals on leads 168 and control signals on leads 128 to read information from RAM 102, write information into the RAM, or refresh the RAM. When data is read from RAM 102 the DMARC 120 produces a control signal on lead 130 to gate the data through buffers 132. Data from the buffers 132 is gated through transceivers 122 to the data bus and is also applied to DMARC 120 for error detection and correction purposes.

The local memory 102 is a dynamic RAM and may be configured with either 64k or 256k dynamic RAM chips.

The DMA address register 134 and the command address register 136 shown in FIG. 1 are optional components which permit expansion of the addressing capability to four gigabytes. These registers may be loaded from the data bus under the control of signals generated on leads 138 and 140 by DMARC 120 in response to addressing signals applied to the DMARC from the address bus over leads 142. If these registers are not provided the address bus 112 may be only 24-bits wide.

An address decoder 160 decodes addresses on the bus and generates either a chip select or a memory select signal if the address specifies the address of one of many registers on the chip or the address of a memory location in the RAM 102 controlled by the chip.

Peripheral unit 162 is intended to represent one or more units forming part of the system of which processor 100 is a part. The unit may be a memory, printer, optical character reader, etc. Regardless of the type of unit, it is connected to the main bus 107 through a control unit similar to control unit 104 and thus includes a register 164 which may be loaded by the processor 100 when it is operating in the system mode. One bit of this register may be selectively set or reset by the system processor so that when the peripheral places data on the bus it negates or asserts a signal on lead 166. This signal, like the signal on lead 118 determines what memory space is accessible to the unit when it is acting as the bus master.

The network of FIG. 1 is illustrated as having a second data processing system 106 connected by a bus 107' and bus interface circuits 109 to the bus 107. The second system 106 may take many forms. It may include a second processor like processor 100, having a local memory like RAM 102 connected to bus 107' by a control unit like control unit 104. It may include peripheral units like unit 162 and may even include one or more intelligent terminal units each controlled by a microprocessor such as the MC68000. The exact configuration of the second system 106 is unimportant to the present invention except that like the first system, all units connected to the bus 107' must be controlled by a control unit like control unit 104.

The bus interface circuits 109 include bidirectional buffers for interfacing the first system bus 107 and the second system bus 107'. These circuits also include conventional bus arbitration circuits so that when a unit in the second system 106 desires to communicate with a unit on the bus 107, it may contend with other units on bus 107 for control of the bus. Likewise, circuits 109 include arbitration circuits which permit units in the first system to contend with units on the bus 107' for control of the bus 107.

Many different implementations are possible for attaining system security utilizing the "system", "user" and "external" signals. For purposes of illustration only, it will be assumed that the first and second systems shown in FIG. 1 are each permitted only the lowest level of access, i.e. external, to the memory space of the other system. In this case, the interface circuits may include a circuit for placing an external signal on control bus 108' each time the first system gains control of the bus 107' and a circuit for placing an external signal on control bus 108 each time a unit in the second system gains control of bus 107. It should be understood that the system, user and external signal lines of control bus 108 are isolated from the system, user and external signal lines of bus 108' at all times. The external signal may be generated by circuits 109 in response to a bus grant acknowledge signal which occurs during bus arbitration when a unit is granted control of the bus.

DMARC Block Diagram

Figure 2A:
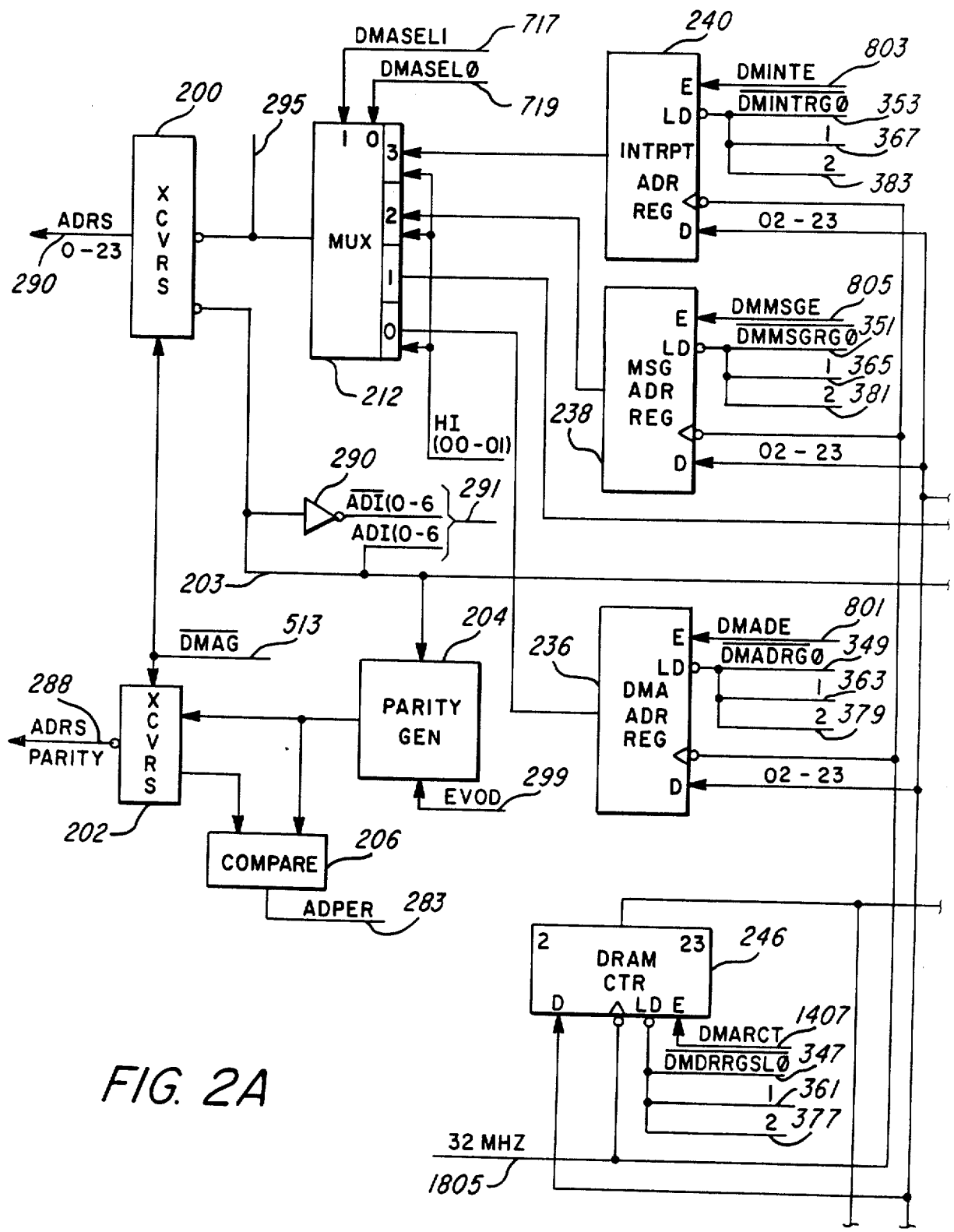

FIGS. 2A–2D, when arranged as shown in FIG. 2E, comprise a block diagram illustrating the major components on a DMARC chip 120. FIG. 2A shows the circuits for generating output addresses when the DMARC is acting as a bus master. These circuits include a DMA address register 236, a message address register 238, and an interrupt address register 240 all having their outputs connected to different ports of a four-port multiplexer (MUX) 212. The output of MUX 212 is connected to a set of address transceivers 200 and the outputs from these transceivers are connected to the system address bus 112 by way of leads 290.

The DMA address register 236 is a 22-bit counter which is utilized to specify the external address to which data is to be transferred during a direct memory access (DMA) transfer. Where the size of the system memory is such as to require it, the DMA address may be expanded by utilizing the DMA address register 134 whichis loaded with the high order bits of the DMA address. Counter 236 is a decrementing counter which is decremented by one after each DMA transfer. The counter is initially loaded from the system data bus. Data enters the chip over leads 271, is inverted by transceivers 250, and applied over buses 201 and 221 to the counter. For the purpose of loading the counter each byte is individually addressable with the three bytes being individually enabled by the signals on leads 349, 363 and 379. As subsequently explained, two or all three bytes of the counter may be simultaneously addressed by simultaneously asserting two or all three enabling signals. The counter is addressable for loading in either the system or user mode, that is, when the DMARC acting as the bus master asserts either the "system" or "user" signal on the main control bus. The counter is enabled for decrementing when the signal on lead 801 is high.

The output of counter 236 is connected to positions 2–23 of port 0 of MUX 212. Bits 0 and 1 of this port are tied to the logic 1 voltage level. When the signals on leads 717 and 719 are both low the output of the counter 236 is gated through MUX 212 and is inverted by transceivers 200 before being applied to the system address bus.

To digress for a moment, address bits 02-23 define long word (4-byte) addresses. Bits 00 and 01 are utilized to define the byte offset within the long word and are used by the MC68020 microprocessor in conjunction with two size control signals to permit dynamic bus sizing as explained in the publication *MC68020 32-Bit Microprocessor User's Manual* (2nd ed.) by Prentice-Hall, Inc. (hereinafter referred to as Publication I).

Message address register 238 is a 22-bit register wherein the seven low order stages are a decrementing counter. When a message cycle is initiated the contents of a message register 270 are read out to the system data bus 110 and written to the address specified by the message address register 238. The counter may be autodecremented when the signal DMMSGE on lead 805 is asserted and can provide 64 long word addresses before wrap around occurs.

The message address register 238 may be loaded only by the system and is loaded a byte at a time when the signals on leads 351, 365 or 381 are asserted. Any combination of bytes may be loaded simultaneously depending on the combination of signals that are asserted at the same time. The outputs of the register 238 are connected to port 2 of MUX 212 and bits 0 and 1 of this port are tied to the high logic level. The output of the message address register is gated through MUX 212 to the address bus when the signal on lead 717 is active and the signal on lead 719 is inactive.

The interrupt address register 240 is configured in the same way as the message address register 238. The interrupt address register specifies the address to which the status of the DMARC is to be sent during an interrupt cycle. The status is defined by a system status register 274, a DMA status register 276 and an interrupt register 268. One or more bytes of the interrupt address register may be simultaneously loaded from the data bus by asserting one or more of the signals on leads 353, 367 and 383. Loading may be accomplished only by the system. The signal DMINTE on lead 803 enables the counter in the register. The output of register 240 is applied to port 3 of MUX 212 and is gated through the MUX when the signals on leads 717 and 719 are both asserted.

A fault address register 210 stores the address involved in the last data transfer which produced an error. Bits 2–23 of this register are connected to the outputs of MUX 208 while bits 0 and 1 are connected to bus 203. The output of the register is connected to port 1 of MUX and is read out through transceivers 200 to the address bus when the signal on lead 719 is asserted while the signal on lead 717 is negated.

To control the addressing of a memory such as RAM 102, addresses are applied over the system address bus 112 and leads 290 to the transceivers 200. At the same time parity bits are applied over leads 288 to a set of transceivers 202. The address bits (inverted by transceivers 200) are applied over a bus 203 to a parity generator circuit 204 which generates parity bits, one for each byte of the address. This parity may be either even or odd depending upon whether the signal EVOD on lead 299 is true or false as subsequently described. The output of parity generator 204 is applied to a comparator 206 where the generated address parity is compared with the address parity as received from the bus. If the two parities are not equal then compare circuit 206 produces the error signal ADPER on lead 283.

An address on leads 203 may be used to directly address RAM 102. The address is passed through MUX 208 to a bus 293. From bus 293 bits 10 and 18 are applied to two inputs of a MUX 214 and the output of this MUX is applied to a MUX 216. The other port of the MUX 216 receives bit 8 of the address on bus 293. The output of MUX 216 is connected to one of a set of inverting drivers 220. Bits 02-07, 09 and 10 of bus 293 are applied to one port of a selector 218. Bits 16, 11-15, 17 and 19 are applied to a second port of the selector 218 and the outputs of the selector are connected to drivers 220. The drivers 220 produce 9-bit RAM addressing signals on bus 292 for application to the RAM 102.

The purpose of MUX 214 and MUX 216 is to provide the capability of addressing a RAM comprising either 64k or 256k chips. Addressing is accomplished by first generating a 9-bit row address at the outputs of drivers 220 and then generating a 9-bit column address at the outputs of these same drivers. Regardless of the memory chip size, row address bits 0-8 correspond to address bits 2-10. Also, regardless of size the column address bits 0-5, 7 and 8 correspond to address bits 16, 11-15, 17 and 19, respectively. In the 64k mode column address bit 6 corresponds to address bit 10 on bus 293 while for the 256k mode column address bit 6 corresponds to bit 18 on address bus 293.

Figure 11:
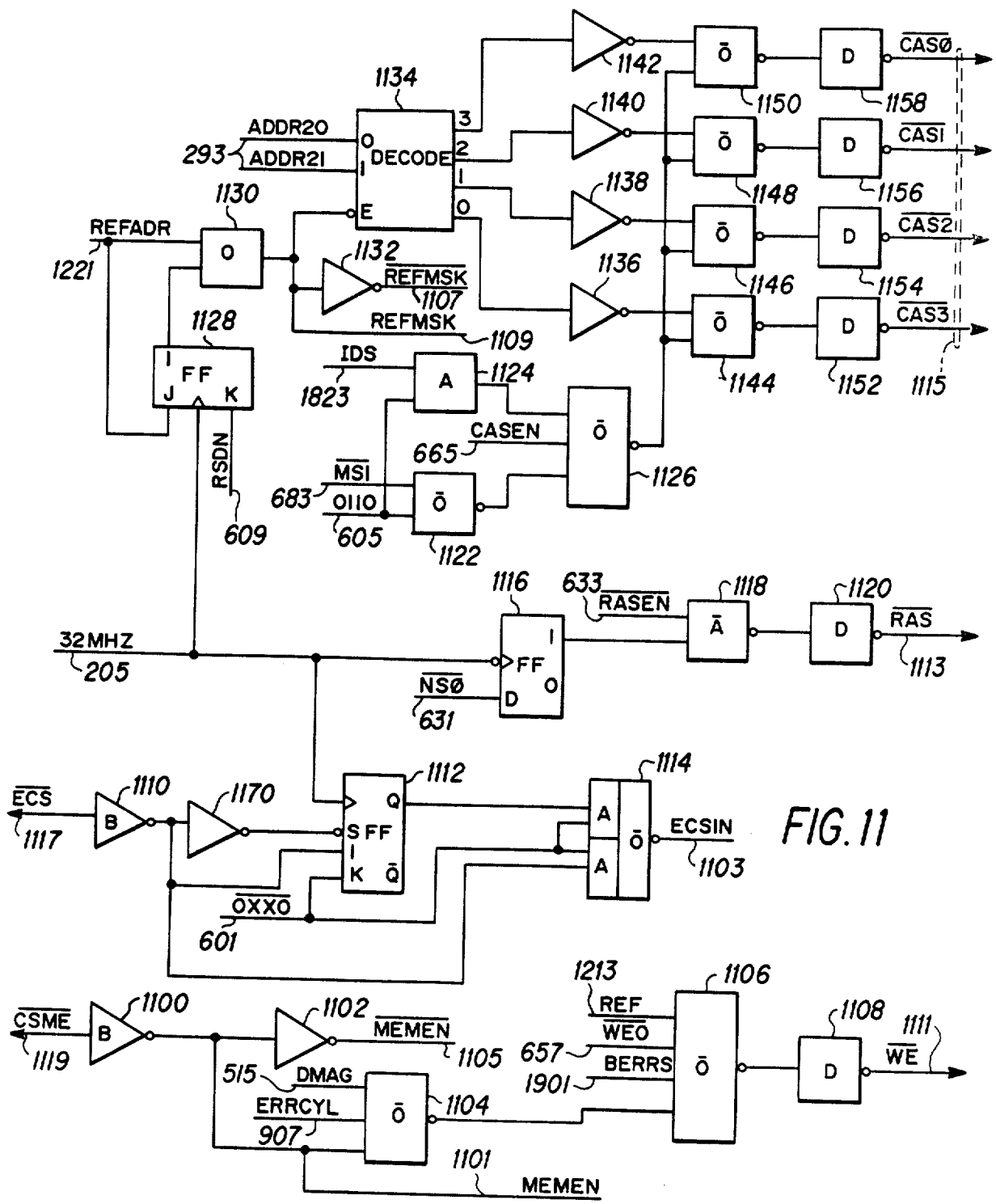
FIG. 11 illustrates the column and row address strobe signal controls and the memory write enable controls.

The row and column address signals produced by drivers 220 may be used to address 256k by four bytes of memory. However, plural memory units may be provided in which case bits 20 and 21 may be utilized to selected which memory unit is to respond to the addressing signals produced by the drivers. As shown in FIG. 11, address bits 20 and 21 are applied to a decoder 1134 which produces an output signal on one of four output leads to thereby generate one of four column address strobe signals CAS0-CAS3 to select the unit which is to respond to the addressing signals generated by drivers 220.

DRAM counter 246 is provided for generating the local RAM addresses during a DMA transfer. Counter 246 is a 22-bit counter which may be loaded from the system data bus in either the system or user mode. The counter may be loaded one, two or three bytes at a time, depending upon which of the signals on leads 347, 361 and 377 are asserted. Once loaded, the counter is incremented by the 32 mHz clock pulses if the signal on lead 1407 is asserted.

Bits 2-9 of counter 246 are applied to port 0 of MUX 248 while bits 10-23 are applied to port 0 of MUX 208. When the signal on lead 1221 is not asserted bits 2-9 from counter 246 pass through MUX 248 to the MUX 208. In this case the entire contents of the counter are gated through MUX 208 to generate the RAM address on bus 292.

An 8-bit counter 244 has its output connected to port 1 of MUX 248. During refreshing the signal on lead 1221 is asserted so that the output of the counter 244 is applied to MUX 208 together with the high order bits of counter 246.

As part of the security or memory protection feature, two registers 222 and 224 are provided. Register 222 is designated the external register and it is loaded from bits 00-15 of the system data bus. Either one or both bytes of the register may be loaded from the data bus depending upon whether one or both of the signals on leads 355 and 369 are asserted.

Register 224 is designated as the user register. It is loaded from bits 16-23 of the system address bus and, like register 222, may be loaded one or two bytes at a time depending upon whether one or both of the signals on leads 385 and 395 are asserted. Both registers 222 and 224 may be loaded only in the system mode.

The outputs of registers 222 and 224 are applied to two ports of a multiplexer 226 and the output of this multiplexer is connected to one set of inputs of a comparator circuit 228. Address bits 08-23 from MUX 208 are applied to the second set of inputs of comparator 228.

The memory protection circuitry operates as follows. The memory (RAM 102) is considered to be divided into three memory spaces. The first memory space extends from the top-most address of the memory down to the address represented by the value stored in register 222. This is designated the external memory space and is accessible by an external unit, a user or the system. The second memory space extends from the top of the memory down to the address represented by a value stored in register 224, this value being less than the value in register 222. This space is designated user memory space and it is accessible by the system or a user but not by an external unit. The third memory space comprises the entire range of memory and it is addressable only by the system.

Figure 2B:
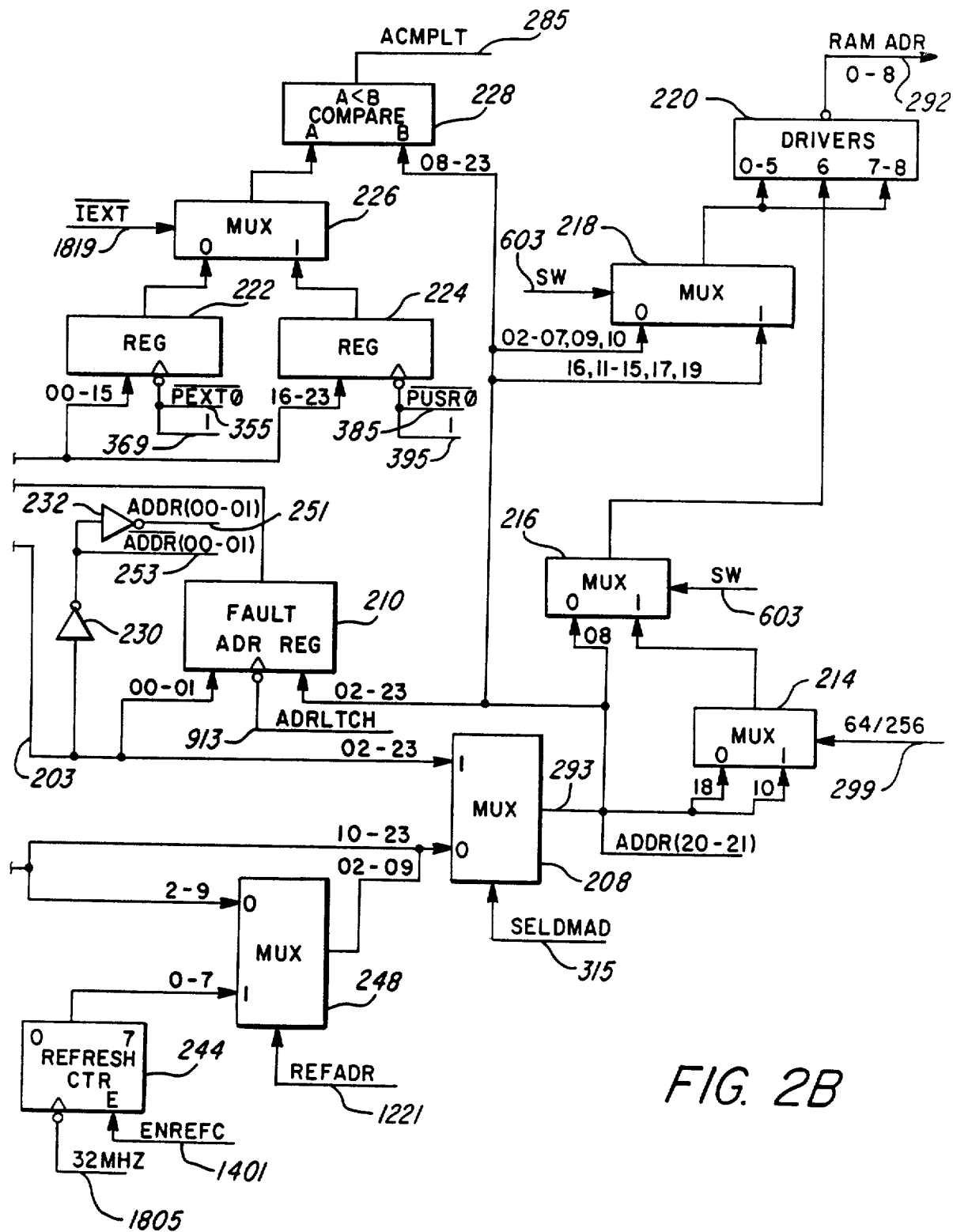
Figure 17:
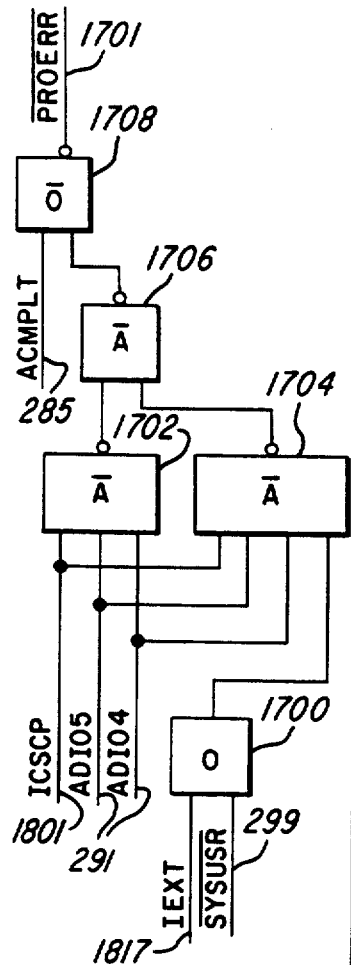
FIG. 17 illustrates the circuits for generating the memory protection error signal.

Consider first the case where a unit in the second system 106 wishes to access RAM 102. The unit first contends for control of bus 107'. After it is granted control of this bus it places an address on address bus 112'. Circuits 109 recognize the address as being in system 1 so they then contend with the other units on bus 107 for control of that bus. When circuits 109 are granted control of the bus 107 they gate the address onto bus 112 and assert the signal EXTERNAL on a lead in bus 108. The signal EXTERNAL passes over the bus 108 and enters the DMARC chip 120 over a lead 1843. The signal is inverted at 1832 and 1834 to negate the signal on lead 1819. In FIG. 2B, the signal on lead 1819 enables MUX 226 to pass the contents of register 222 to the comparator 228. The address on bus 108 enters DMARC 120 and is applied to the second input of comparator 228. If the address applied to the DMARC is less than or equal to the address represented by the value in register 222, comparator 228 asserts the signal ACMPLT on lead 285. In FIG. 17, the signal ACMPLT passes through NOR 1708 so that the signal /PROERR on lead 1701 is asserted. In FIG. 16 /PROERR passes through NOR 1616 to set stage 2 of system status register 274 by way of lead 1607. The signal on lead 1607 is also applied to FIG. 19 where it passes through NOR 1926, NAND 1930 and transceiver 1934 to assert /BERR as an error signal on the bus.

Figure 6A:
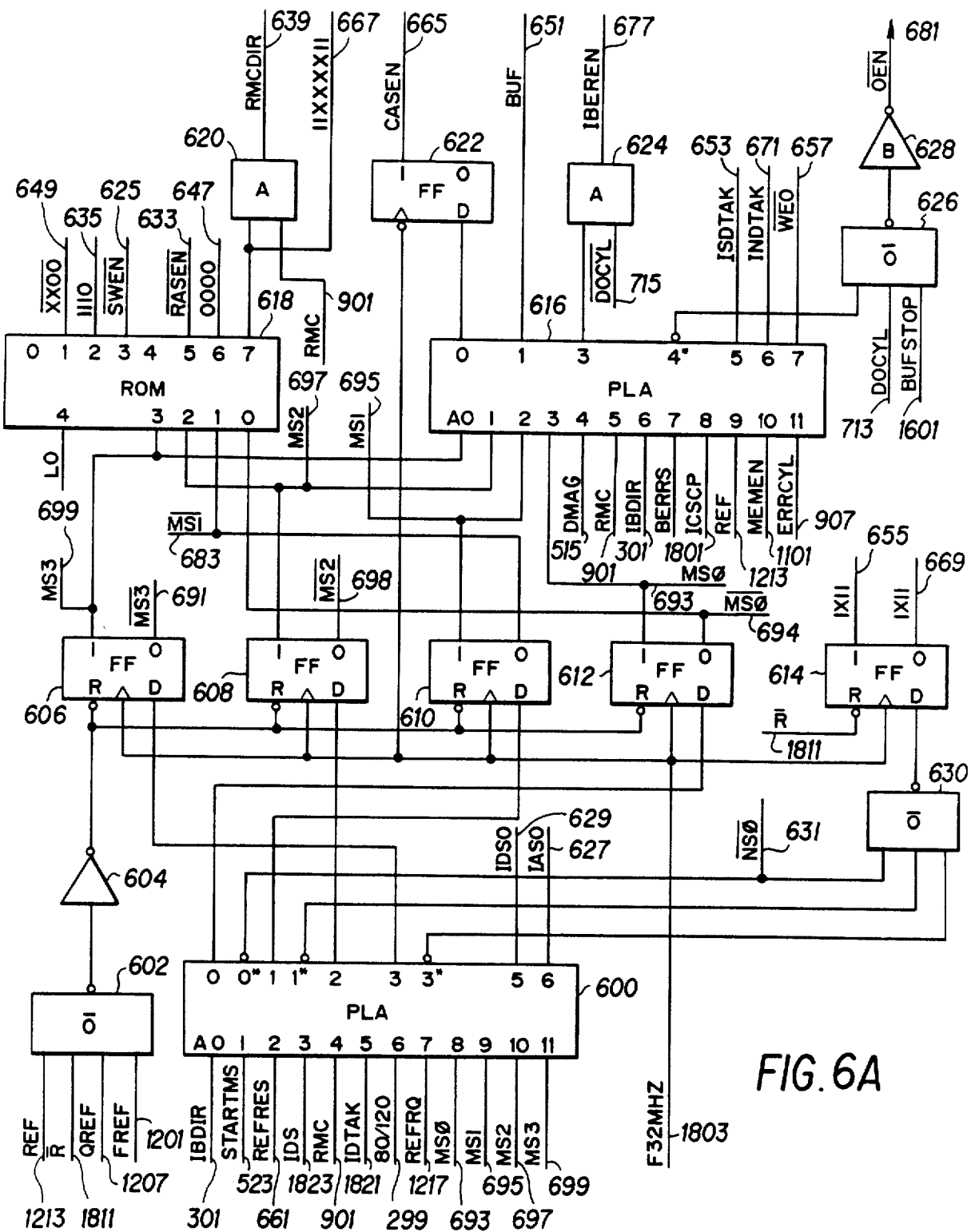
FIG. 6A ad 6B illustrate the main state controls for the controller.

The output of NOR 1616 is also applied by way of lead 1601 to FIG. 6A where it passes through NOR 626 and inverting buffer 628 to negate the signal /OEN on lead 681. /OEN enables drivers 132 when it is asserted. Therefore, the negation of /OEN prevents any output of the RAM 102 from reaching the main data bus 110 if an external unit attempts to access an address in the RAM which is outside the memory space designated by register 222 for use by external units.

Consider now the case where the unit 162 attempts to access an address in RAM 102 which is less than the address represented by the value in user register 224. Assuming the processor 100 has previously set the system control register 164 in unit 162 to the user mode, the unit negates the signal SYSTEM on lead 166 on each bus transaction. This signal passes over the control bus 108 and one of the control leads 126 to DMARC 120. The signal SYSTEM is inverted by a transceiver 1800 to negate the signals ISYS on lead 1813 and /ISYS on lead 1815. In FIG. 16, ISYS is applied to NOR 1616 but the negated signal has no effect on the NOR.

Since an external unit is not performing the memory access, the signal /EXT is negated. In FIG. 2B this signal enables MUX 226 so that the contents of the user register are passed through the MUX to comparator 228. The address from unit 162 passes over the address bus 112, is inverted by transceivers 200, and passes through MUX 208 to the comparator 228. If the address from the processor is less than the address represented by the contents of register 224, the signal ACMPLT is asserted on lead 285. This causes the output drivers 132 to be blocked, stage 2 of the system status register to be set, and a bus error signal asserted as previously described.

When the system processor 100 has set the register 164 in a unit 162 so that the signal SYSTEM is asserted on lead 166, the unit is operating in the system mode and has access to all memory space. The memory protection circuitry is disabled. The unit 162 asserts the signal SYSTEM on each bus transaction so that in FIG. 18 the signal ISYS on lead 1813 is asserted. In FIG. 16, ISYS passes through NOR 1616 to negate the signal on lead 1601. In FIG. 6A, this permits the NOR 626 to respond to other signals to assert /OEN, thereby enabling the output drivers 132 for RAM 102 regardless of the magnitude of the address as compared to the contents of registers 222 and 224.

Data enters the DMARC chip only for purposes of loading the registers therein or, when a memory access is being executed, to perform error detection. Data from data bus 110 is inverted by the set of transceivers 250 and distributed over a bus 201 to the various registers. From bus 201 data is applied over bus 221 to registers 222, 224, 238 and 240, and counters 236 and 246, all previously described. In addition, data on bus 201 is applied over a bus 223 to an interrupt register 268 and a message register 270, and through inverters 262 to a system control register 264 and a DMA control register 266.

The system control register 264 is a 16-bit latch register which may be loaded a byte at a time or both bytes at one time depending upon whether one or both of the signals on leads 387 and 397 are asserted. This register may be loaded only in the system mode. The various bits of the system control register are defined as follows:

| Bit 15 | SYSUSER | When this bit is set either the system or a user may access the DMA registers. When this bit is reset only the system may access the registers. |
| Bit 14 | ECC/PARITY | This bit selects the type of error detection used for memory integrity. When the bit is set ECC is performed. ECC is a modified Hamming code. If this bit is reset parity is performed on each byte. The parity may be odd or even depending upon the setting of bit 7. |
| Bit 13 | | This bit selects the speed of the dynamic memory chip to be interfaced with the DMARC. 120 ns is the default. |
| Bit 12 | ECCOR | This bit enables the memory error detection. The type of error detection is specified by bit 14. |
| Bit 11 | ACCINT | This bit enables the interrupt I/O pin to be set low on an error condition. The interrupt condition is cleared by reading the system status register 274. If this bit is set to zero it enables the system to receive the interrupt information at the address specified by the interrupt address register. The interrupt condition is cleared automatically when the interrupt information is written. |
| Bit 10 | 24MHZ | This bit configures the DMARC to operate at 16 to 24 mHz. |
| Bit 9 | WINTEN | This bit enables the DMARC to perform an interrupt cycle. The interrupt cycle consists of writing the contents of the system, status and interrupt registers 268, 274 and 276 to the address specified by the interrupt address register 240. |
| Bit 8 | WMSGEN | This bit enables the DMARC to perform a message cycle which consists of writing the contents of the message register 270 to the address specified by the message address register 238. |
| Bit 7 | EVOD | If bit 14 is reset then bit 7 selects odd or even parity for parity checking both the address and data bus. If bit 7 is reset then even parity is checked. |
| Bit 6 | INCMSG | This bit enables the message address register 238 to be auto-incremented after each message cycle. The message address can be incremented 64 long word addresses before wrap-around occurs. The default is non-incrementing. |
| Bit 5 | INCINT | This bit enables the interrupt address register 240 to be auto-incremented after each interrupt cycle. Like the message address register, it may be incremented 64 long word addresses before wrap-around and the default is non-incrementing. |
| Bit 4 | 64/256 | This bit configures the DMARC to operate with 64k or 256k memory organization. The 256k organization is the default. |
| Bit 3 | PRTYDIS | This bit disables the address and data parity error detection. The sending of this bit overrides the PDIS I/O pin. The default is parity disabled. |
| Bit 2 | LINTEN | When this bit is set it enables the INT I/O pin which is a low level signal on an interrupt condition. The default is LINTEN is disabled. |
| Bit 0 | MSGINTEN | This bit enables the DMARC to perform a message cycle. The default is MSGINTEN is disabled. |

The DMA control register 266 is an 8-bit latch register which establishes the environment for a DMA transfer. It is a write only register and may be configured by the system or a user. Bits 0 and 7 of the register are not utilized in the present invention. The function of bits 1-6 is as follows:

| | | |
|---|---|---|
| Bit 6 | DMA | When this bit is set the DMA cycle is started. The DMA address and block count should be established before setting this bit. The bit is cleared by the output of stage 6 of the DMA status register 276 when it asserts the signal DMADONE or by stage 4 of the DMA status register when it asserts the signal DDMAERR. |
| Bit 5 | INCADD | The DMA address register 236 is incremented when this bit is set. When it is reset the DMA address register is fixed. |
| Bit 4 | DIR | This bit determines the direction of the DMA transfer and follows the bus read/write line. The read is asserted high and the write is asserted low. |
| Bits 3-2 BSZ1-BSZ0 | | These bits determine the size of the DMA block that is transferred. The bus is released after each block. 0  0  1 (4 bytes) 0  1  4 (16 bytes) 1  0  16 (64 bytes) 1  1  64 (256 bytes) |
| Bit 1 | DLINTEN | This is the DMA local interrupt bit which disables the interrupt cycle and permits the INT I/O pin (FIG. 10) to be low when a DMA transfer is completed. Also, the DMA status register 276 and the system status register 274 must be read by the user to clear the interrupt condition. If this bit is not set the DMARC will initiate an interrupt cycle which will write the contents of the interrupt register 268 to the address specified by the system and clear the DMA status register 276 when the interrupt is completed. |

The interrupt register 268 is a 16-bit write only register which must be loaded by the system. Either one or both bytes of the register may be loaded depending upon whether one or both of the signals on leads 357 and 371 are asserted. The output of the register is connected to port 3 of MUX 272 so that when both of the signals on leads 711 and 713 are asserted the contents of this register as well as the contents of the system status register 274 and the DMA status register 276 are gated through the MUX 272 to port 1 of MUX 260. When the signal on lead 707 is asserted while the signal on lead 709 is negated MUX 260 is enabled to pass the input to port 1 through to the set of data transceivers 250. The output of these transceivers is connected by leads 271 to the data bus 110. The data thus placed on the bus is written to the address specified by the interrupt address register 240. The interrupt register is loaded by the system with some constant value which, when transferred to the local memory 102, provides an indication to the processor 100 as to what action should be taken as the result of an interrupt.

Figure 2C:
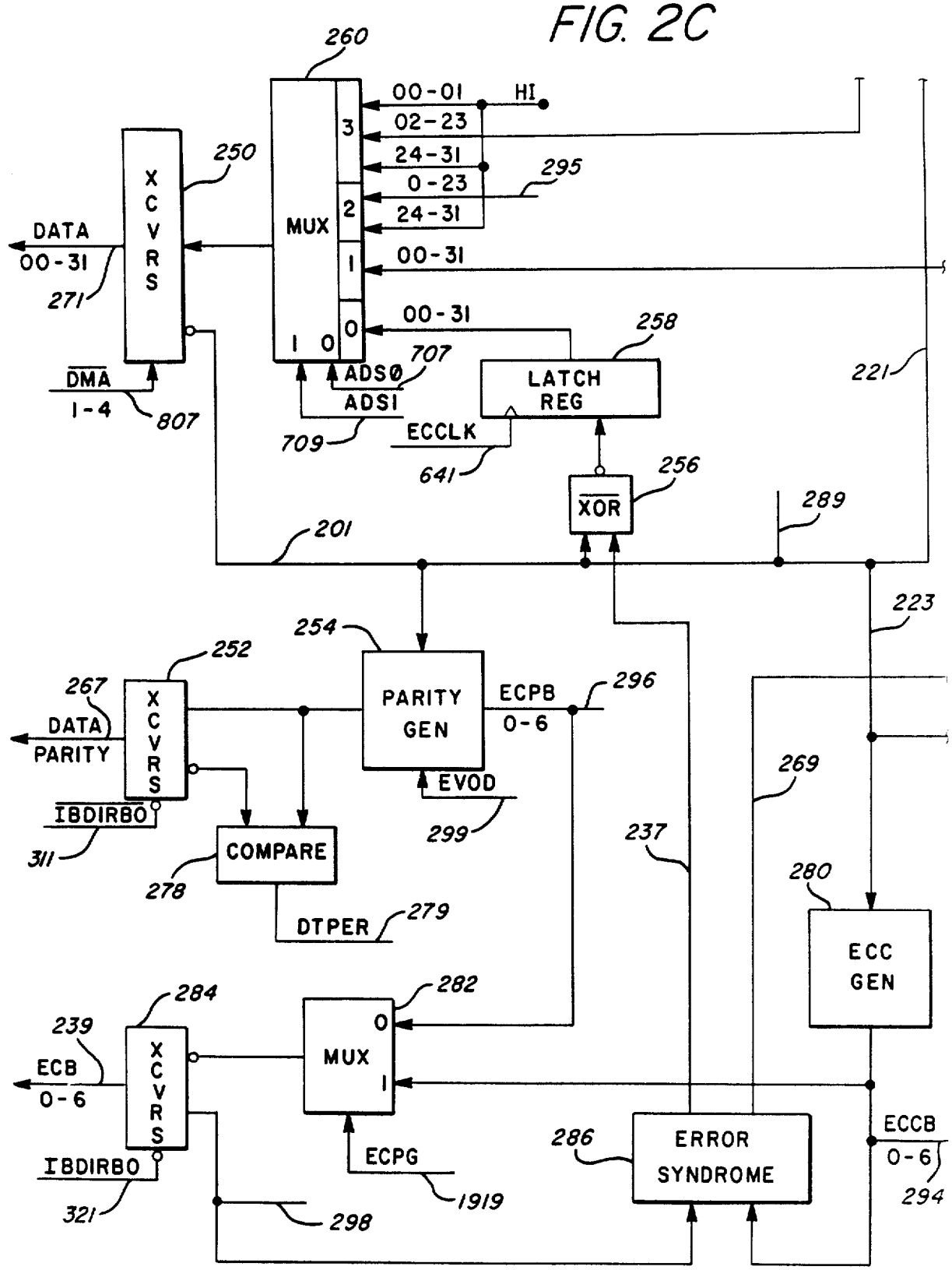

The message register 270 is a 32-bit register which is loaded with the message to be passed from the local user to an address specified by the message address register 238. By way of example, the message register may be loaded under control of the microprocessor 146 with data which passes through either drivers 150 or drivers 152. In FIG. 2C this data passes through transceivers 250 and over buses 201 and 223 to the message register 270. The message register may be loaded one or more bytes at a time depending upon which of the signals on leads 359, 373, 389 and 399 are asserted.

Bit 31 of the message register is not used. Output bits 00-30 are applied to port 2 of MUX 272. Also applied to this port is the signal MSGRGT on lead 1009. Two methods are available to notify a sender, for example, microprocessor 146, that the DMARC is ready to repeat or do another message cycle. In one method the signal on lead 1009 is asserted when the DMARC is ready for the next message. The user is responsible for clearing this bit when writing to the register. In the second method the DMARC may be configured to interrupt the sender and the interrupt can be cleared by reading the message register.

The system status register 274 is an 8-bit read only register which is reset when read. It provides information on the cause of a bus error. Output bits 00-06 are connected to port 3 of MUX 272 while all output bits are connected to port 0 of the MUX. The various bits of the register are set in response to various error conditions as follows.

| | | |
|---|---|---|
| Bit 7 | INTERCOM | An interrupt and/or interrupt cycle is started when this bit is set. This bit is set when either bit 0 or bit 1 of the system status register is set as indicated below. |
| Bit 6 | ECC/PARITY ERROR | This bit is set when the current bus error was caused eith by an ECC error or a parity error depending upon the setting of bit 14 of the system control register 264. |
| Bit 5 | DMA ERROR | This bit is set by an error occuring during DMA processing. The DMA status register 276 must be read to determine the cause and permit DMA processing to be restarted. |
| Bit 4 | DATA/PAR ERROR | An error in data parity causes this bit to be set if the configuration bit PRTYDIS and the I/O pin PDIS are disables. Data parity is checked on a write to the DMARC. |
| Bit 3 | ADDR/PAR ERROR | An error in the address parity causes this bit to be set if the configuration bit PRTYDIS and the I/O pin PDIS are disabled. The address parity is checked on a DMA or normal read or write to the DMARC. |
| Bit 2 | ACC/ERROR | This bit is set if an access violation occurs as a result of a user or external processor requesting access to a memory address lower than the address specified by the user access register 224 or the external access register 222. |
| Bit 1 | LOTERR | An error correction counter 732 counts error correction cycles and when 256 memory accesses have resulted in an error this bit is set. |
| Bit 0 | DOCYL/ERROR | This bit is set by an error occurring during a message transfer cycle or interrupt cycle processing. |

The DMA status register 276 is an 8-bit register which provides information about the current status of the DMA process. The register is reset at the completion of an interrupt cycle or by the user or system reading the register. The state of DLINTEN (bit 1 of the DMA control register 266) determines which of the processes will reset the register. The system can read this register with address bit 06 low and the register will not be reset. The output from the DMA status register is applied to ports 0, 1 and 3 of MUX 272. Only the four high order bits of the DMA status register are utilized. These bits are set as follows.

| Bit 7 | DMACOMP | This bit is set if any other stage of the register except bit 5 is set. |
|---|---|---|
| Bit 6 | DMADONE | this bit is set when a DMA transfer has been completed. |
| Bit 5 | DMAACT | This bit is set to indicate that a DMA transfer is currently active. |
| Bit 4 | DMAERROR | This bit is set to indicate that a DMA transfer must be restarted because an error has occurred during the transfer. |

Data applied to the DMARC through transceivers 250 is applied to a parity generator 254 which generates odd or even parity depending upon whether the signal EVOD on lead 299 is asserted or negated. The output of the parity generator is applied to one set of inputs of a comparator 278. The received data parity is inverted by transceivers 252 and applied to a second set of inputs of comparator 278. If the two parities are not equal then comparator 278 asserts the signal DTPER on lead 279. This signal is applied to a NAND 1608 and will set stage 4 of the system status register 274 provided the PDIS pin 1609 is tied to a high level and stage 3 of the system control register 264 is set so that the signal PRYDIS is asserted.

Figure 19:
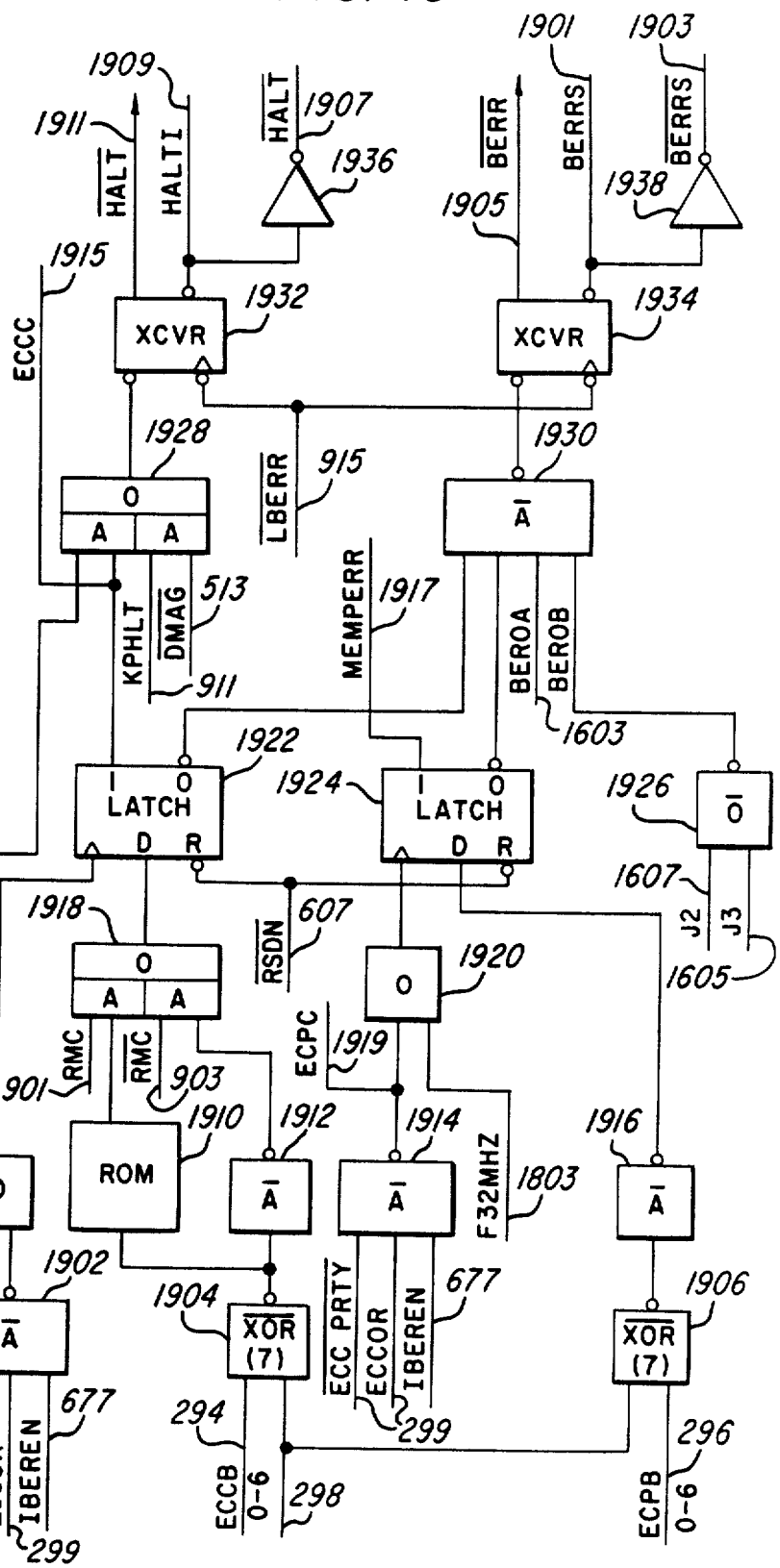

The parity generated by parity generator 254 may be stored in RAM 102 with its associated data. The output of the parity generator is connected to port 0 of a MUX 282 and the output of this MUX is inverted by transceivers 284 before being applied to leads 239. The parity bits may pass through MUX 282 only when the signal on lead 1919 is negated. In FIG. 19, this signal is negated when IBEREN is asserted on lead 677 provided bit 12 of the system control register is set to assert ECCOR and bit 14 is reset to assert /ECCPRTY.

The DMARC also generates a 7-bit Hamming code for each long word of data written to the RAM 102. After passing through transceivers 250 the data is applied to an error correction code generator 280 which has its output connected to port 1 of MUX 282. When the signal on lead 1919 is asserted the error correction code bits pass through MUX 282 and are inverted at transceivers 284 before being applied over lead 239 to the RAM 102.

When data is read from RAM 102 it is checked by the DMARC. The data passes through transceivers 250 and is applied to the error correction code generator 280 to generate an error correction code from the data read from the memory. The error correction code is applied to an error syndrome circuit 286. At the same time, the error correction code bits stored in memory with the data word are read into the DMARC through transceivers 284 and applied to a second set of inputs of the error syndrome circuits 286. Multiple errors may be detected and single errors may be corrected. If a single error occurs the error syndrome circuits 286 produce output signals on leads 237 which are applied to a set of 32 XNORs 256. The data from bus 201 is also applied XNORs. The XNORs in effect complement that bit of data which is in error as indicated by a signal asserted on one of the leads 237. The outputs of XNORs 256 are applied to a latch register 258 and the corrected data is clocked into the register when the signal ECCLK on lead 641 is asserted. The corrected data may then be applied from register 258 through port 0 of MUX 260 and transceivers 250 to the data bus.

The error syndrome circuits 286 include a register which is loaded with the syndrome bits where the error occurs. These signals are applied over leads 269 to port 0 of MUX 272 so that they may be read out of the DMARC for error analysis purposes.

DMARC Input/Output Control Signals

Figure 18:
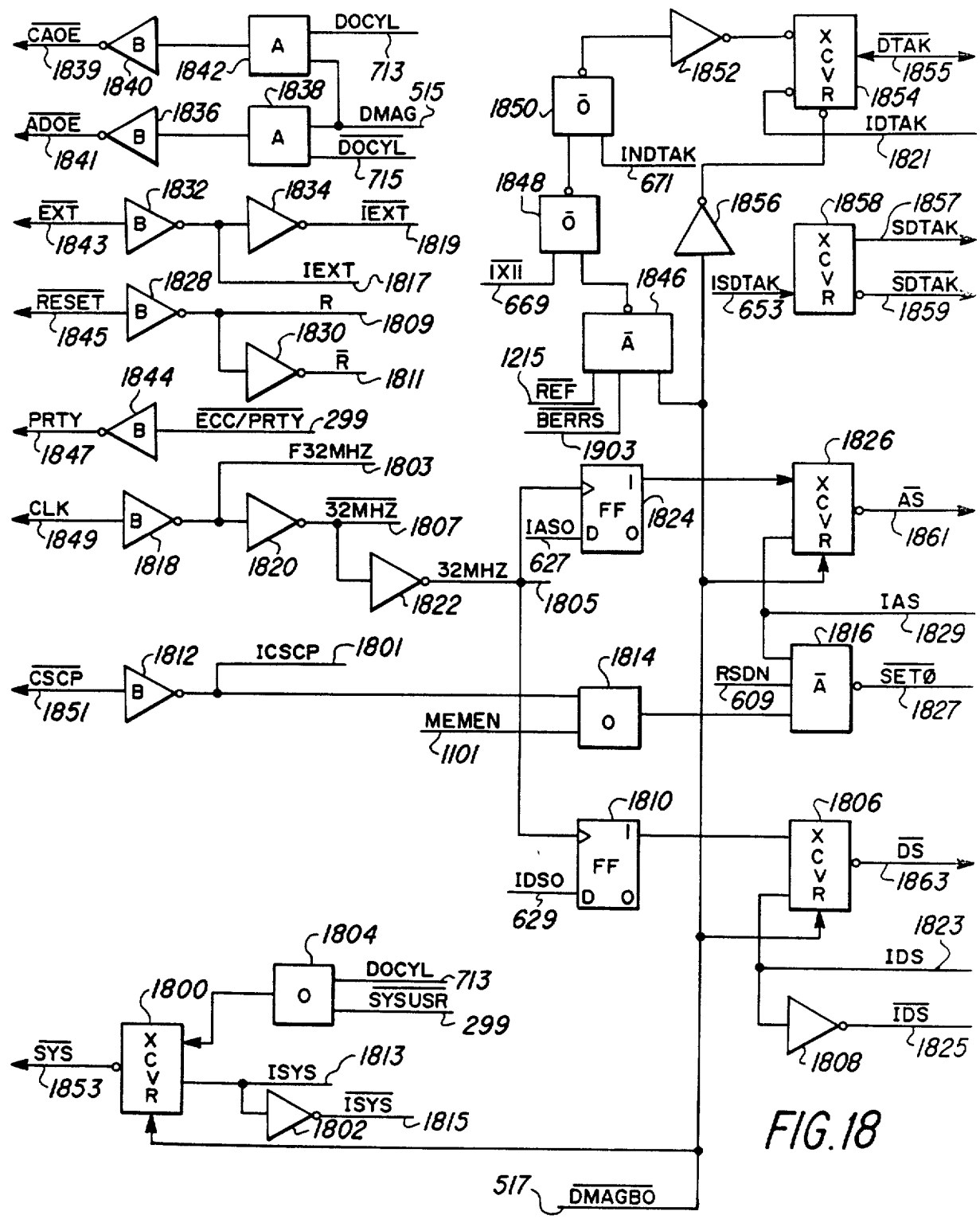
FIG. 18 illustrates the input and output buffers and transceivers for miscellaneous control signals; and, FIG. 19 illustrates the control circuits for generating Bus Error and Halt signals.

In addition to the input/output signal connections shown in FIGS. 2A-2D, the DMARC chip has a plurality of pins for applying control signals to the chip or applying control signals from the chip to circuits external of the chip. The address output enable (/ADOE) signal is activated when the DMARC is bus master and is driving the address bus. In FIG. 18, when the signals DMAG on lead 515 and /DOCYL on lead 715 are asserted AND 1838 produces an output signal which is inverted by buffer 1836 to generate the signal /ADOE on lead 1841. In FIG. 1, this signal may be applied over one of leads 138 to enable the DMA address register 134 so that it may be loaded with an address in a system where more than 24 address lines are used.

The signal Address Strobe (/AS) is a bidirectional tri-state signal. In FIG. 18, when the signal /AS on lead 1861 goes low it passes through transceiver 1826 to generate the signal IAS on lead 1829 and enable one input of NAND 1816 to initiate a read or write cycle using the address found on the address bus 290. When the DMARC is acting as a bus master, a flip-flop 1824 is set and the output of the flip-flop is inverted by transceiver 1826 to assert /AS and indicate that a valid address is on the address bus line which should be decoded by the system.

The signal Buffer Direction (BDIR) is an output signal that defines the direction of data flow for the external buffers between the data bus and an external processor. For example, in FIG. 1 this signal may be applied over one of leads 124 to bidirectional transceivers 122 to control the direction of data flow between data bus 110 and RAM 102. BDIR is generated in FIG. 3B at the output of buffer 320. BDIR is high when the DMARC or its memory are outputting data to the bus and is low when the external processor is writing data to the DMARC or its memory.

The signal Bus Error (/BERR) is a bidirectional signal which indicates that an error has occurred. /BERR is generated in FIG. 19 as the result of a parity or ECC error. When the DMARC is acting as the bus master this signal aborts the current memory cycle. This signal is also asserted in conjunction with the halt signal on lead 1911 to initiate a bus cycle retry.

The signal Bus Grant (/BG) indicates that the current bus master is ready to relinquish the bus. It is an input signal given to the DMARC in response to a bus request and is examined in conjunction with the signal Bus Grant Acknowledge before the DMARC takes control of the bus. /BG is applied to the bus arbitration circuits of FIG. 5 over lead 529.

The Bus Grant Acknowledge (/BGAK) signal is a bidirectional signal which appears on lead 519. This signal indicates that the current bus grant signal has been accepted and that the bus is in use. The DMARC examines /BGAK in conjunction with the Bus Grant signal before taking control of the bus. After the DMARC takes control of the bus this signal is output by the DMARC until the bus is released.

The Bus Request (/BR) signal is an output signal generated by the DMARC on lead 503 when it wishes to take control of the system bus to perform a data transfer. The Bus Grant and Bus Grant Acknowledge signals are then examined by the DMARC, which waits until it has received the bus before actually performing the transfer.

Four Buffer Enable signals (/BUF0-/BUF3) control the buffers 122 between the DMARC and the main system bus. Each of the signals /BUF0-/BUF3 controls one byte of data. When the corresponding signal is low the data buffer is enabled to allow data to be transferred according to the BDIR signal. The signals /BUF0-/BUF3 are generated in FIG. 4 on leads 463, 465, 467 469.

The Command Address Output Enable (/CAOE) signal is asserted by the DMARC when it is bus master and is writing a long word (4-byte) message to memory as the result of a message cycle or an interrupt condition. This signal is generated on lead 1839 in FIG. 18. The signal may be applied over one of leads 140 to enable the output of the command address register 136 to thereby drive the additional address lines in a system where more than 24 address lines are used.

The Column Address Strobe signals (/CAS0-/CAS3) are output signals that are generated by the DMARC in FIG. 11. These signals are applied to RAM 102 in order to strobe the column address found on the RAM address lines 292 into the RAM circuits. A decoder 1134 decodes address bits 20 and 21 to determine which of the four column address strobe signals will be generated.

The Clock (CLK) signal is generated by an oscillator (not shown) and provides the clocking for the logic functions on the chip. The Clock signal must be between 16 and 32 MHz for proper dynamic RAM refresh. When the DMARC is used with a 68020 microprocessor the clock signal frequency should be twice the frequency of the 68020 clock for optimum performance. The clock input signal is applied to a buffer 1818 to generate the signal F32MHZ on lead 1803. This signal is inverted at 1820 to generate the signal /32MHZ on lead 1807 and the signal on this lead is inverted at 1822 to generate the signal 32MHZ on lead 1805. These signals are distributed throughout the DMARC logic circuits shown in FIGS. 3-19.

The Chip Select signal (/CSCP) is an input signal which, when low, enables reads from or writes to the internal registers of the DMARC. The current memory cycle then reads or writes the selected register of the DMARC instead of memory. /CSCP is generated by the address decode circuits 160 which decode all addresses on the address bus 112.

The Memory Select Signal (/CSME) is an input signal applied to the DMARC over a lead 1119. When this signal is asserted it enables reads and writes to the memory controlled by the DMARC. /CSME is also generated by the address decode circuits 160.

The signal Data Strobe (/DS) is a bidirectional tri-state signal indicating that there is valid data on the data bus during a memory write or that the data from memory should be placed on the data bus during a memory read. When another unit is acting as the bus master /DS is applied as an input over lead 1863 and through a transceiver 1806 to generate the signal IDS on lead 1823 and the signal /IDS on lead 1825. When the DMARC is acting as bus master, lead 1863 becomes an output indicating that data should be transferred. In this case flip-flop 1810 is set and its output passes through transceiver 1806 to drive lead 1863 low.

The signal Data Acknowledge /DTAK is a bidirectional tri-state signal generated in response to a data strobe and indicates the completion of a data transfer. The DMARC asserts this signal on lead 1855 up to two clock cycles before the data transfer is completed in order to optimize the memory cycle time when used with a 68020 processor. Another signal called Slow Data Acknowledge (/SDTAK) is also generated by the DMARC for those applications which cannot tolerate an early data acknowledge. When the DMARC is acting as bus master lead 1855 becomes an input for the data acknowledge from the memory or peripheral being accessed. /SDTAK cannot be used as an input for this purpose.

Early Cycle Start (/ECS) is an input signal which is applied to the DMARC through a buffer 1110. It initiates a memory access cycle in the DMARC. Before the signal is activated the correct memory address should be available on the address bus. The timing of this signal has been designed to be compatible with the early cycle start signal from the 68020 microprocessor.

External (/EXT) is an input signal applied to the DMARC through a buffer 1832. This signal indicates the lowest access priority and enables the memory protection circuitry. In the external mode the only memory that can be accessed is that specified by the external protection register 222. Most of the DMARC registers are also protected and inaccessible when this signal is asserted. It is generated by the generator 154 provided for all external units.

The Halt (/HALT) signal is a bidirectional signal which is generated by or applied to a transceiver 1932. Halt is asserted by the DMARC in conjunction with the Bus Error signal to request that the current memory cycle be done over to allow for error correction. When the DMARC is acting as bus master, this signal is examined together with Bus Error to determine whether to abort the current memory cycle or do it over.

The Interrupt (/INT) signal is an output signal generated by transceiver 1044 to indicate that the DMARC is interrupting the processor to request service. The conditions which can cause an interrupt are determined by programming the system control register 264. This signal is negated when the interrupting condition is cleared.

Figure 3A:
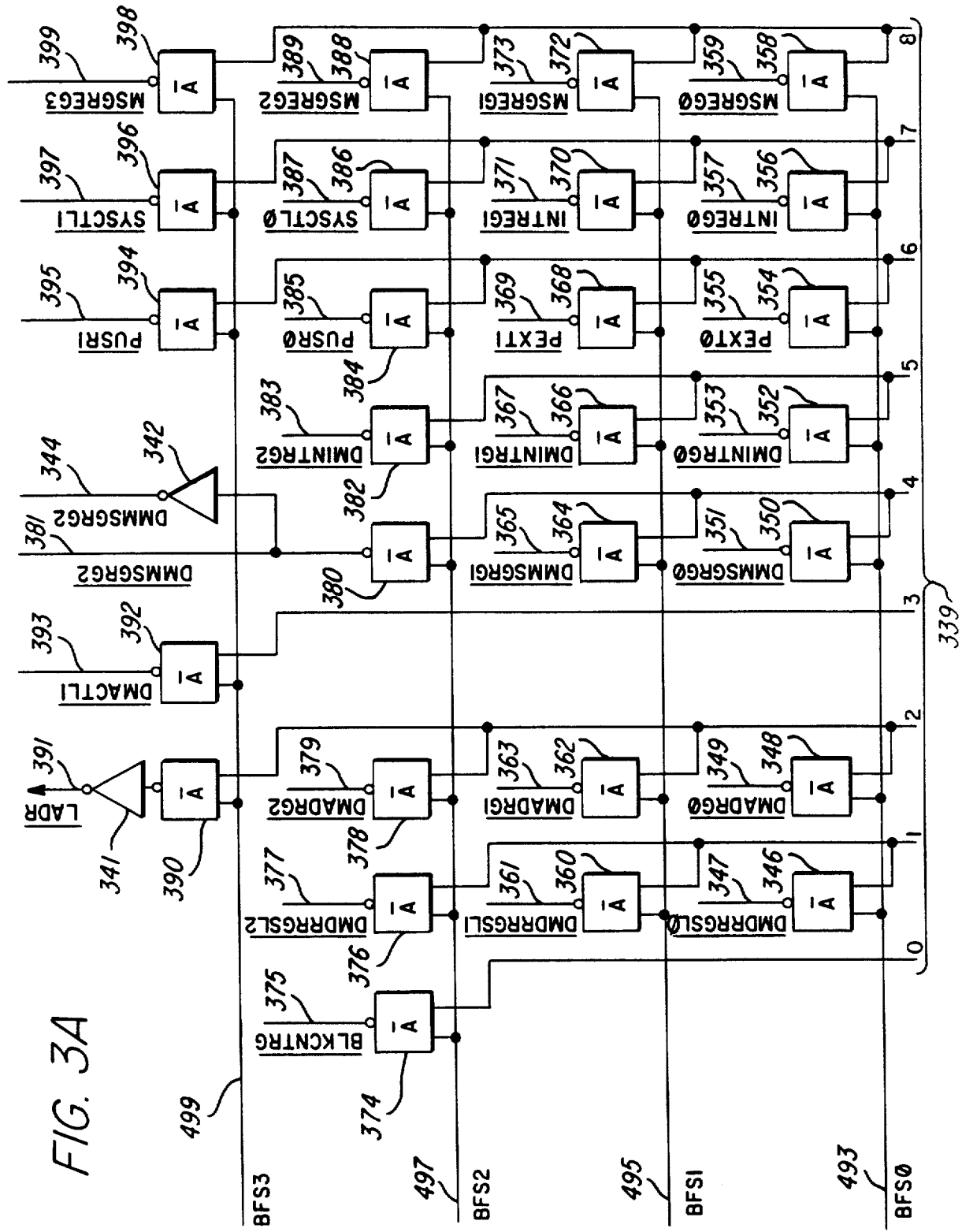
FIGS. 3A and 3B illustrate the write decode circuits which address the registers of the controller during a write operation.

The signal Latch Address (/LADR) is generated on lead 391 when the Write Decode signals of FIG. 3A determine that a write is to be made to byte 3 of the DMA address register, that is, to that portion 134 of the DMA address register which is external to the DMARC chip and holds the high order byte for a 32-bit address. /LADR is applied over one of leads 138 to the register 134 to latch therein an address from the data bus 110. The latched data may then be gated onto the address bus 112 by the signal ADOE.

The Output Enable (/OEN) signal is an output signal produced by buffer 628 when the RAM memory circuit should output data onto the data bus. This signal is applied over one of leads 130 to the drivers 132 to enable these drivers to pass the output of the RAM.

Parity Disable (/PDIS) is an input signal which is applied to the DMARC through a buffer 1606 to disable both address and data parity checking. This input is normally tied high to allow for parity checking.

The signal Parity (PTRY) is an output signal whose level is determined only by the setting of stage 14 of the system control register 264. When stage 14 is reset the signal PRTY on lead 1847 is low to select the parity mode. When bit 14 is set the signal PRTY is high to select the ECC mode for RAM data integrity checking.

The signal Read/Write (R/W) is a bidirectional tri-state signal which indicates whether the current bus cycle is a read or a write cycle. R/W is applied to or is generated by a transceiver 314. When R/W is high the current bus master reads data and when it is low the bus master outputs data.

The signal Row Address Strobe (/RAS) is an output signal generated by a driver 1120. /RAS is utilized to strobe the row address found on the RAM address lines 168 into the dynamic RAM circuits. Thus, /RAS would be applied over one of leads 128 to the RAM 102.

The Reset (/RESET) signal initializes the DMARC to a known state and clears the address protection and system control registers. Any DMA in progress is halted and the DMARC must be reconfigured. A Reset signal should be applied after power-on and at normal system reset time. /RESET is applied to the DMARC through a buffer 1828.

The signal Slow Data Acknowledge (/SDTAK) is an output signal generated by transceiver 1858 in response to a data strobe and indicates the completion of a data transfer. The DMARC waits until the data transfer is completed to assert this signal. See the description of /DTAK above for a further description of the application of this signal.

The signal System (/SYS) is a bidirectional tri-state signal. It may be generated by a DMARC having bus control if the DMARC is executing a message transfer or interrupt message cycle or if bit 15 of the system control register 264 is reset. As an input signal it is applied to the DMARC through a transceiver 1800 to indicate the highest access priority and disable the memory protection circuitry. In this mode all of the memory and all of the DMARC registers of the receiving unit are accessible.

The signals SZ0 and SZ1 are bidirectional tri-state signals indicating the size or number of bytes being transferred and are used in conjunction with address lines A00 and A01. Reference may be made to Publication 1 for a more detailed description of dynamic bus sizing. SZ0 and SZ1 are applied to transceivers 400 and 402. If both signals are zeros then a long word (4 bytes) is transferred. If both signals are ones then 3 bytes are transferred. If SZ0 is a zero and SZ1 is a one, then a word (2 bytes) is transferred. If SZ0 is a one and SZ1 is a zero then one byte is transferred. When the DMARC is acting as a bus master these bits are always output as zeros for a long word transfer. A high logic level is connected to transceivers 400 and 402 and when they are enabled for outputting this logic 1 level is inverted so that SZ0 and SZ1 are both zeros. Address lines A00 and A01 are also always output as zeros and this is the reason that the two low order inputs to ports 0, 2 and 3 of MUX 212 are tied to the logic 1 level.

The Write Enable (/WE) signal is an output indicating that the DMARC is performing a memory write cycle and that the RAM memory circuits should be placed in a write mode. /WE is generated at the output of a driver 1108 and is applied over one of leads 128 to RAM 102 to place the RAM in a write mode.

Write Decode Circuits

Figure 3B:
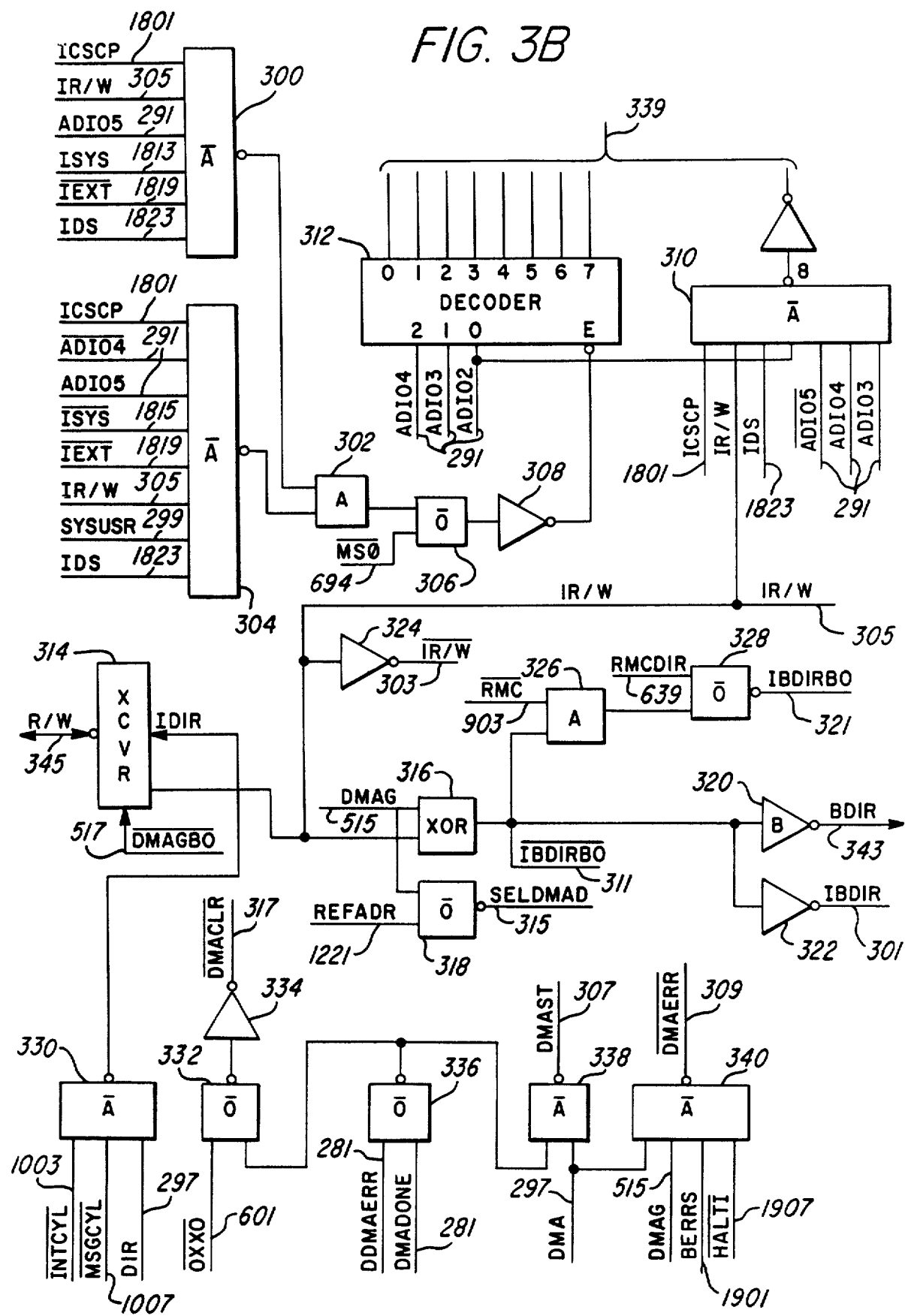

FIGS. 3A and 3B show the write decode circuits which control the entry of data into the various registers shown in FIGS. 2A–2D. FIG. 3A shows a plurality of two-input NANDs each of which generates an output signal to control the entry of one byte of data into one of the registers. The signal BFS0 on lead 493 is applied to one input of NANDs 346, 348, 350, 352, 354, 356 and 358. The signal BFS1 on lead 495 is applied to one input of NANDs 360, 362, 364, 366, 368, 370 and 372. The signal BFS2 on lead 497 is applied to one input of NANDs 374, 376, 378, 380, 382, 384, 386 and 388. The signal BFS3 on lead 499 is applied to one input of NANDs 390, 392, 394, 396 and 398.

In order to write into any register the chip must be selected. The Chip Select Signal CSCP is inverted by buffer 1812 to assert the signal ICSCP on lead 1801. In FIG. 3B, ICSCP is applied to one input of NANDs 300, 304 and 310. The input signal R/W applied to the DMARC over lead 345 must be low in order to write into a register. The signal is inverted by transceiver 314 to assert the signal IR/W on lead 305. This signal is also applied to one input of NANDs 300, 304 and 310. In FIG. 2A, the addressing signals applied to the DMARC chip are inverted by transceivers 200 and appear on bus 201. Bits 0–6 on bus 201 are designated ADI00–ADI06. The low order bits at the output of transceivers 200 are inverted by inverters 290 to generate the signals /ADI00–/ADI06. In FIG. 3B, /ADI05 is applied to one input of NAND 310. ADI02, ADI03 and ADI04 are applied to inputs of NAND 310 and a decoder 312. ADI05 is applied to NANDs 300 and 304 while /ADI04 is applied to NAND 304.

After data is applied to the DMARC over the data bus the transmitting unit asserts the signal /DS. In FIG. 18 this signal is inverted by transceiver 1806 to assert the signal IDS on lead 1823. In FIG. 3B IDS is applied to NANDs 300, 304 and 310.

The output of NAND 310 is inverted and applied to one input of NANDs 358, 372, 388 and 398 which control the loading of the various bytes of the message register 270. Thus, one or more of these gates may be enabled to assert an output signal depending upon which of the signals BFS0–BFS3 is simultaneously asserted. Since messages to be transmitted by a local user are passed through the message register 270, no security or protection is required to limit access to the register.

Decoder 312 decodes address bits 2–4 and produces output signals to enable the NANDs of FIG. 3A which in turn produce the enabling signals to enable the loading of other control registers on the chip. The degree of access security to each of these registers varies. The system is permitted access to any of the registers. When the system asserts the address and data it also asserts the signal /SYS which is inverted by transceiver 1800 to generate the signal ISYS on lead 1813 and this signal is applied to NAND 300. Since no external unit is attempting the writing operation the signal /EXT on lead 1843 is high. This signal is inverted by buffer 1832 and inverted again by inverter 1834 to assert the signal /IEXT on lead 1819. This signal is also applied to NAND 300. If address bit 05 is a zero NAND 300 is enabled and blocks AND 302. The low level output of AND 302 is inverted by NOR 306 and inverted again by inverter 308 to assert a signal which enables decoder 312. The decoder then decodes address bits 02–04 to energize one of eight output leads. Each of these leads conditions one input of each gate in one column of gates shown in FIG. 3A.

NAND 304 controls access to those registers which may be accessed by a user as well as the system. These are primarily the DMA registers. In order to gain access to these registers the system must have first set stage 15 of the system control register 264 so that the signal SYSUSR is asserted. If address bit 5 is a zero and address bit 4 is a one NAND 304 produces a low level output signal which passes through AND 302, OR 291 and inverter 308 to enable the decoder 312.

Table I shows the addresses for reading and writing the various registers.

TABLE I

| ADDRESS 543210 | Register Read/Write Addresses | | | |
|---|---|---|---|---|
| | REGISTER NAME | | | |
| | WRITE | | READ | |
| 000000 | SYSCTL1 | 264 | SYSSTS | 274 |
| 000001 | SYSCTL0 | 264 | DMASTS | 276 |
| 000010 | INTREG1 | 268 | ERRCNT | 732 |
| 000011 | INTREG0 | 268 | SYNDBIT | |
| 000100 | PUSR1 | 224 | | |
| 000101 | PUSR0 | 224 | FLTAD2 | 210 |
| 000110 | PEXT1 | 222 | FLTAD1 | 210 |
| 000111 | PEXT0 | 222 | FLTAD0 | 210 |
| 001000 | INTAD(0-2) | | INTAD(0-2) | |
| 001001 | INTAD2 | 242 | INTAD2 | 242 |
| 001010 | INTAD1 | 242 | INTAD1 | 242 |
| 001011 | INTAD0 | 242 | INTAD0 | 242 |
| 001100 | MSGAD(0-2) | | MSGAD(0-2) | |
| 001101 | MSGAD2 | 238 | MSGAD2 | 238 |
| 001110 | MSGAD1 | 238 | MSGAD1 | 238 |
| 001111 | MSGAD0 | 238 | MSGAD0 | 238 |
| 010000 | DMACTL1 | 266 | DMASTS | 276 |
| 010001 | | | BLKCNT | 540 |
| 010010 | | | | |
| 010011 | | | | |
| 010100 | DMAAD(0-3) | | DMAAD(0-3) | |
| 010101 | DMAAD2 | 236 | DMAAD2 | 236 |
| 010110 | DMAAD1 | 236 | DMAAD1 | 236 |
| 010111 | DMAAD0 | 236 | DMAAD0 | 236 |
| 011000 | RAMAD(0-2) | | RAMAD(0-2) | |
| 011001 | RAMAD2 | 246 | RAMAD2 | 246 |
| 011010 | RAMAD1 | 246 | RAMAD1 | 246 |
| 011011 | RAMAD0 | 246 | RAMAD0 | 246 |
| 011100 | | | | |
| 011101 | BLKCNT | 540 | | |
| 011110 | | | | |
| 011111 | | | | |
| 100000 | MSGREG(0-3) | | MSGREG(0-3) | |
| 100001 | MSGREG2 | 270 | MSGREG2 | 270 |
| 100010 | MSGREG1 | 270 | MSGREG1 | 270 |
| 100011 | MSGREG0 | 270 | MSGREG0 | 270 |

Figure 4:
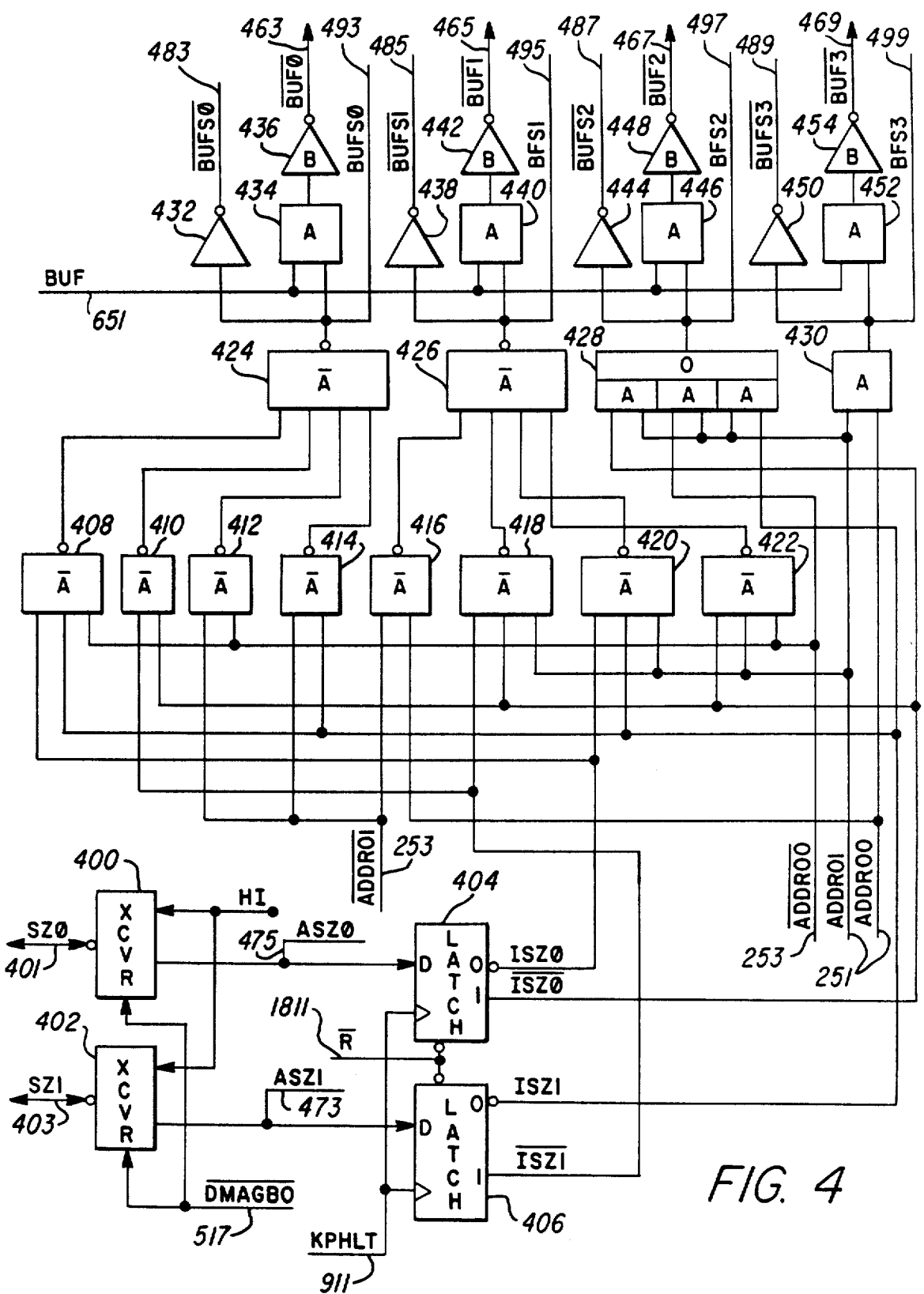
FIG. 4 shows the word size circuits and the circuits for generating the buffer control signals.

FIG. 4 shows the circuits for generating the buffer control signals BUFS0-BUFS1. One or more of these signals may be generated simultaneously depending upon the value of address bits 00 and 01 and the sizing bits SZ0 and SZ1. In FIG. 2B, the inverted address bits on leads 201 are passed through an inverter 230 to generate the signals /ADR00 and ADR01. The output of inverter 230 is passed through a further inverter 232 to generate the signals ADDR00 and ADDR01. In FIG. 4 /ADR00 is applied to one input of NANDs 408, 412 and 422 and one input of an AND/OR 428. The signal ADDR00 is applied to one input of NAND 416 and AND 430. The signal /ADDR01 is applied to one input of NANDs 412, 414 and 416 while the signal ADDR01 is applied to NANDs 418, 420, 422 and 430 and all three ANDs of the AND/OR 428. The bus sizing signals SZ0 and SZ1 are inverted by transceivers 400 and 402 and applied as inputs to latches 404 and 406. The sizing signals are latched into the latches when the signal KPHLT on lead 911 goes low. When latch 404 is reset it produces the high level signal ISZ0 which is applied to one input of NANDs 408 and 420. When latch 404 is set it produces the high level signal /ISZ0 and this signal is applied to NANDs 410, 418 and 422 and one of the ANDs of AND/OR 428. When latch 406 is set it asserts the signal /ISZ1 which is applied to one input of NANDs 410 and 418. When latch 406 is reset it asserts the signal ISZ1 which is applied to one input of NANDs 408, 414, 420 and one of the ANDs of AND-/OR 428.

As an example of the operation of the buffer signal and write decode circuits, consider the case where the system processor 100 wishes to load the DMA address counter 236 with a 3-byte address. The processor places the address of the DMA address counter on bits 0-5 of the address bus. These bits have the value 010100. The address is decoded by address decode circuitry 160 to generate the signal /CSCP on lead 1851 to thereby assert the signal ICSCP. The processor 100 also asserts the signal /SYS on lead 1853 to generate the signal ISYS. The processor also outputs zeros to the bus on the sizing leads SZ0 and SZ1. Finally, the processor outputs the signal /DS on lead 1863 to thereby assert the signal IDS.

In FIG. 4, these conditions cause the signals /ISZ0, /ISZ1, ADDR00 and ADDR01 to be high. Under these conditions AND 430 is enabled and it produces the signal BFS3 on lead 499. Both inputs of the left-most AND are enabled so AND/OR 428 produces the signal BFS2 on lead 497. All three inputs of NAND 418 are enabled so it produces an output signal that blocks NAND 426. This asserts the signal BFS1 on lead 495. Both inputs of NAND 401 are enabled and it produces an output signal to block NAND 424 which then asserts the signal BFS0 on lead 493. In FIG. 3A the signals BFS0-BFS3 simultaneously energize one input of each of the NANDs.

In FIG. 3B, all inputs to NAND 300 are enabled and it asserts an output signal to enable decoder 312. Decoder 312 decodes address bits 2-4 (101 inverted=010) and asserts a signal at output terminal 2. The signal from terminal 2 enables one input of NANDs 348, 362, 378 and 390. The output signals from NANDs 348, 362 and 378 enable the loading of the three low order bytes of the DMA address into the DMA address counter 236. The output signal from NAND 390 is inverted at 341 to assert the signal /LADR which is applied to the DMA address register 134 (if present) to load the high order byte of data from the data bus into this register.

Assume on the other hand that the system processor 100 merely wishes to load byte 1 of the DMA address counter 236. The processor generates the same signals as before except that the signal SZ0 on lead 401 is high so that latch 404 is reset. Also, the signal ADDR01 is low while the signal /ADDR01 is high. Under these circumstances NAND 416 is enabled and its output blocks NAND 426 to assert the signal BFS1. The signals BFS0, BFS2 and BFS3 are not asserted. Therefore, in FIG. 3A only the NAND 362 is enabled and the output from this NAND enables the loading of byte 1 of the DMA address counter 236.

From Table I and Publication 1, the addressing of any register and any byte of any register should be obvious hence a detailed description of every possibility is deemed unnecessary.

Read Decode Circuits

Figure 7A:
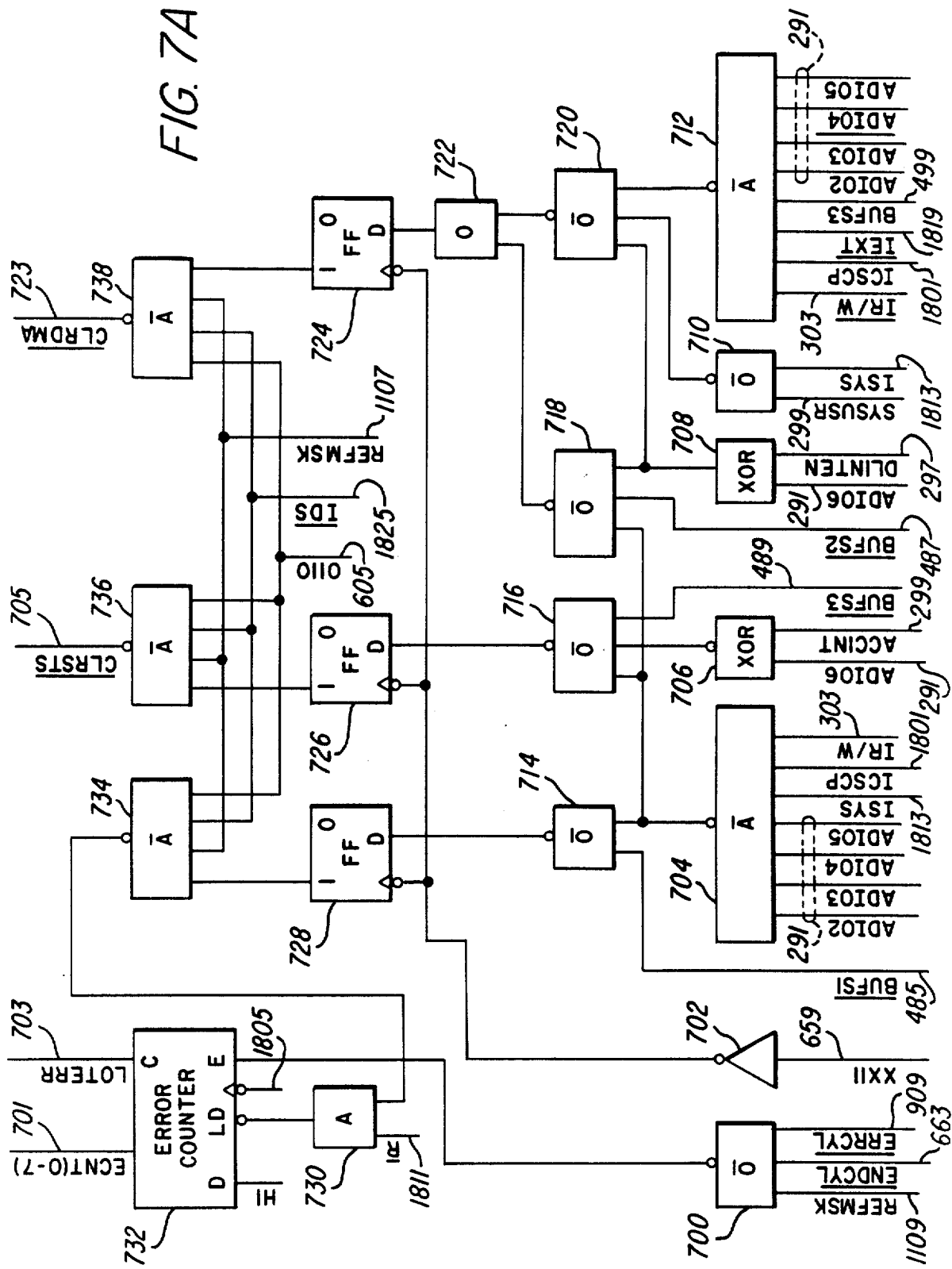
FIGS. 7A and 7B illustrate the read decode circuits.
Figure 7B:
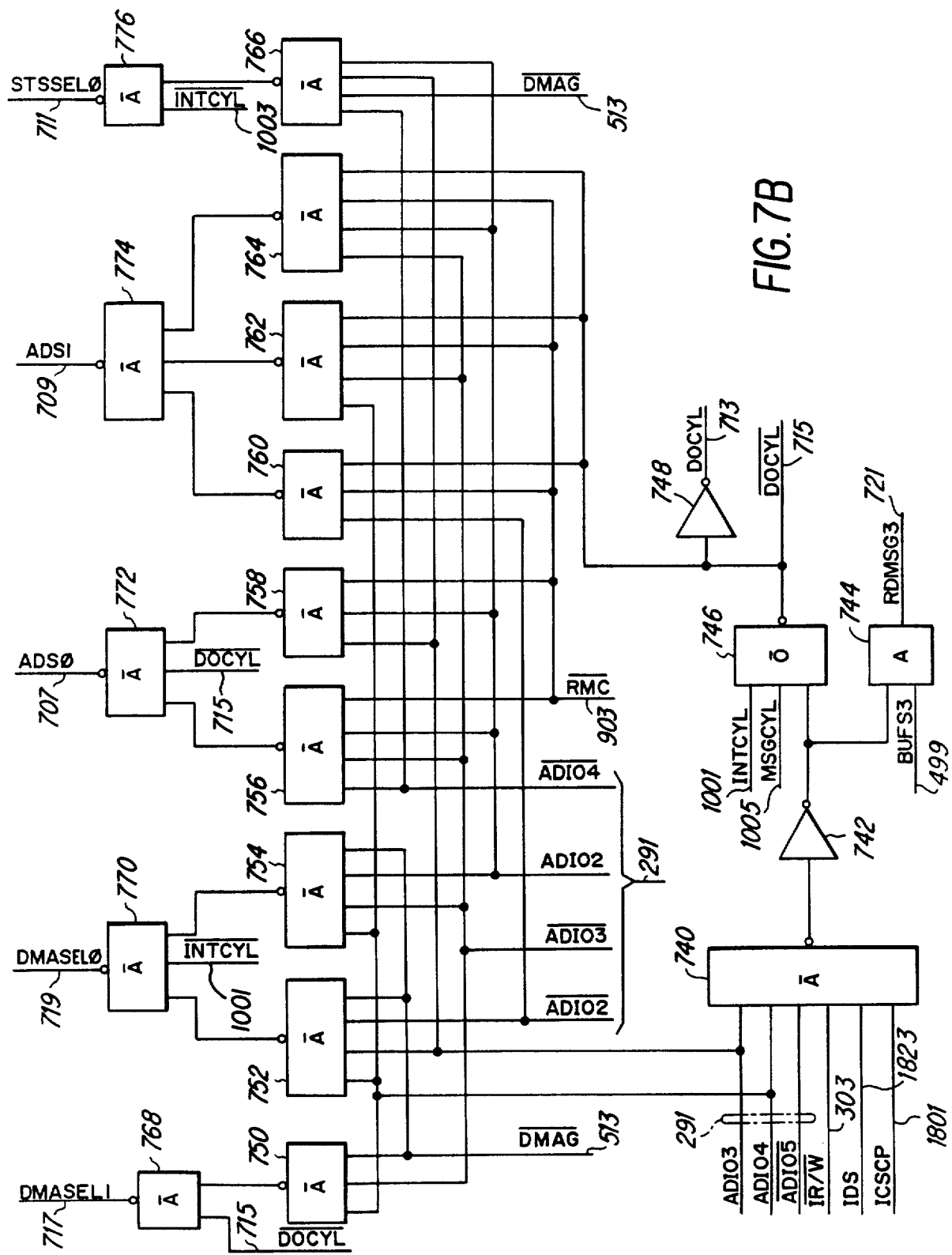

The circuits for decoding an address in order to read the contents of a DMARC register onto the data bus are shown in FIGS. 7A and 7B. Referring for the moment to FIGS. 2A-2D, it is seen that all of the address register outputs are applied to a multiplexer 212 and the output of this multiplexer is applied over a bus 295 to a multiplexer 260. The output of the DMA and system status registers 274 and 276 and the interrupt and message registers 268 and 270 are also applied to MUX 272. MUX 272 also receives the output of the error counter over leads 701, the block counter over leads 531 and the syndrome bit register over leads 269, with the output of MUX 272 also being connected to MUX 260. Therefore, by controlling the selection signals applied to MUXs 212, 260 and 272 one may select for readout any of the addressable registers on the DMARC chip.

FIG. 7B shows the circuits for generating the selection signals which are applied to MUXs 212, 260 and 272. Inverted address bit ADI02 is applied to one input of NANDs 754, 756, 758, 764 and 766 while its complement is applied to NANDs 752 and 760. ADI03 is applied to NANDs 740, 752, 758 and 766 while its complement is applied to NANDs 750, 754, 756, 762 and 764. ADI04 is applied to NANDs 740, 750, 752, 754 and 762 while its complement is applied to NANDs 756 and 766. /ADI05 is applied to NAND 740.

The signal /RMC on lead 903 is high when the DMARC is not in a read-modify write cycle as a result of an error. /RMC is applied to one input of NANDs 756, 758, 760, 762 and 764. The signal /DMAG on lead 513 is asserted by the bus arbitration circuit during a message or interrupt cycle. This signal is applied to one input of NANDs 750, 752, 754 and 766.

NAND 740 asserts an output signal only when the message address register is to be read. In this case the Chip Select signal must be asserted so that ICSCP is asserted. In addition, the data strobe signal must be asserted so the signal on lead 823 is high. Also, the read/write input signal to the chip must be high so that the signal /IR/W on lead 303 is asserted. The output of NAND 740 is passed through an inverter 742 and applied to one input of an AND 744 and a NOR 746.

AND 744 also receives the signal BUFS3 and asserts the signal RDMSG3 on lead 721. NOR 746 also receives the signals INTCYL and MSGCYL. If any input of NOR 746 is high it asserts the signal /DOCYL on lead 715 and, through inverter 748, the signal DOCYL on lead 713. /DOCYL is applied to one input of NANDs 760, 762, 764, 768 and 772.

Assume for example that it is desired to read out the contents of the message register 270. In this case NAND 740 produces an output signal which passes through inverter 742 and NOR 746 to assert the signals /DOCYL and DOCYL. In FIG. 2D, DOCYL is applied to MUX 272 to gate the contents of the message register through the MUX to MUX 260. The signal /DOCYL blocks NAND 772 so that the signal ADS0 is asserted on lead 707 and in FIG. 2C this signal is applied to MUX 260 to gate the output of MUX 272 through MUX 260 to the data transceivers 250.

The circuits of FIG. 7B also control the reading out of the registers during normal operations even though they may not be addressed by an address from the address bus. For example, during a message transfer cycle the signal MSGCYL on lead 1005 is asserted and it passes through NOR 746 to assert DOCYL and /DOCYL. Thus, MUXs 272 and 260 are addressed as in the preceding example to read the contents of the message register 270 to the data bus.

During an interrupt cycle the contents of the interrupt register 268 and the DMA and system status registers 276 and 274 must be read out to the data bus so that they may be transferred to the address specified by the interrupt address register 240. During the interrupt cycle the signal INTCYL is applied to NOR 746 to assert DOCYL and /DOCYL. /DOCYL blocks NANDs 768 and 772 so that the signals DMASEL1 and ADS0 are asserted. During the interrupt cycle the signal /INTCYL is negated so that NANDs 770 and 776 assert the signals DMASEL0 and STSSEL0.

DMASEL0 and DMASEL1 address MUX 212 so that the contents of the interrupt address register 240 are gated through the MUX and transceivers 200 to the address bus. The signals DOCYL and STSSEL0 address MUX 272 so that the contents of the interrupt register, DMA status register and system status register are gated through the MUX to port 1 of MUX 260. The signal ADS0 then gates this data through MUX 260 to the transceivers 250 in the data bus.

When the system status register 274 is read it is also reset. The circuits for resetting the system status register are shown in FIG. 7A and include a NAND 704, an XNOR 706, a NOR 716 and a NAND 736. The system status register is cleared when the system asserts the signal /SYS on lead 1853 and asserts a read on lead 345 so that the signals applied to NAND 704 over leads 1813 and 303 are both high. In addition, the system must place on the address bus an address which, from the high order bits, generates /CSCP on lead 1851 so that the input of NAND 704 over lead 1801 is positive. Furthermore, address bits 00-05 must all be zeros. Under these conditions NAND 704 produces a low level output signal which is applied to NOR 716. In FIG. 4, address bits 00 and 01 enable AND 430 and its output is inverted at 450 to assert /BFS3 on lead 489. In FIG. 7A this signal is applied to a second input of NOR 716. Assuming for the moment that the output of XNOR 706 is low, NOR 716 asserts an output signal which is clocked into flip-flop 726 when the machine state signal XX11 on lead 659 is asserted. The output of flip-flop 726 enables one input of NAND 736 which is further enabled by the signals /REFMSK on lead 1107, /IDS on lead 1825, and machine state signal 0110 on lead 605. NAND 736 asserts the low level signal /CLRSTS on lead 705. In FIG. 16, /CLRSTS is applied to the K input of the JK flip-flop comprising stage 0 of the system status register and resets the flip-flop. /CLRSTS also blocks a NAND 16224 whose output resets stages 1-4, 6 and 7 of the system status register. The resetting of the register is clocked by the 32 MHZ signal generated on lead 1805.

The clearing of the system status register 274 is conditional depending upon bit 06 of the address and the state of bit 11 of the system control register 264. If the address bit 06 is a zero and stage 11 of the system control register is set, or if the address bit is a one and stage 11 is reset XNOR 706 asserts a low level output signal to permit the clearing of the system status register. Otherwise, XNOR 706 asserts a high level output signal and prevents the resetting of the system status register.

The DMA status register 276 may also be cleared when it is read. From Table I it is seen that the DMA status register is read when the low order bits of the address are 000001 or 010000. Assuming the address is 000001, NAND 704 asserts a low level signal which is applied to NOR 718. In FIG. 4, addressing bits 00 and 01 enable the middle AND of AND/OR 428 and the output of this circuit is inverted at 444 to assert /BFS2. In FIG. 7A this signal is applied to a second input of NOR 718. Assuming for the moment that the output of XOR 708 is negated, NOR 718 produces an output signal which passes through OR 722 to the latch 724. When the machine state signal XX11 on lead 659 is asserted flip-flop 724 is set and conditions one input of NAND 738. When the signals machine state 0110, /IDS and /REFMSK are asserted NAND 738 asserts the signal /CLRDMA on lead 723. In FIG. 15 this signal blocks a NAND 1510 and the output of this NAND is applied to the K terminals of the JK flip-flops comprising stages 0-4, 6 and 7 of the DMA status register. The register is clocked by the 32 MHZ pulse generated on lead 1805.

The DMA status register may also be cleared when read by the system or a user asserting an address which selects the chip, the low order bits of the address being 010000. In FIG. 4, AND 430 is enabled so that inverter 450 asserts the signal /BFS3. In FIG. 7A this signal is applied to one input of NAND 712. An external device cannot clear the DMA status register hence the signal /EXT on lead 1843 must be high so that the signal /IEXT on lead 1819 is negated. AND 712 produces a low level output signal to NOR 720. If the system is executing a read operation the signal ISYS on lead 1813 is inverted by NOR 710 to block a second input of NOR 720. Again assuming that the output of XOR 708 is low, NOR 720 asserts an output signal through OR 722 to set latch 724 and thereby clear the DMA status register as previously described.

A user may read and clear the DMA status register if bit 15 of the system control register 264 is set to assert the signal SYSUSR. In this case SYSUSR passes through NOR 710 to negate one input of NOR 720.

The DMA status register may be cleared only if the output of XOR 708 is low. This condition exists if bit 06 of the address is a zero and stage 1 of the DMA control register 266 is reset or if stage 1 is set and address bit 06 is a zero.

The error counter 732 is reset to all ones each time it is read. The low order address bits for reading and resetting the error counter have the value 000010. NAND 704 produces an output to negate one input of NOR 714. In FIG. 4 the two low order address bits enable NAND 416 and its output blocks NAND 426. The output of NAND 426 is inverted at 438 to assert the signal /BFS1. In FIG. 7A this signal blocks the second input of NOR 714. The output of NOR 714 is applied to latch 728 and the latch is set when the machine state signal XX11 on lead 659 is asserted. The output of latch 728 enables NAND 734 and when the other inputs are satisfied the NAND produces a low level output signal during machine state 0110 to block AND 730. The resulting output from AND 730 enables the resetting of the error counter. The resetting is accomplished by loading ones into all stages of the counter.

A NOR 700 enables the error counter to count errors except when one of the signals on leads 663, 909 or 1109 is asserted at the input of NOR 700. The error counter is a decrementing counter and, when enabled, is decremented by 32 MHZ pulses on lead 1805.

Bus Arbitration Controls

Figure 5:
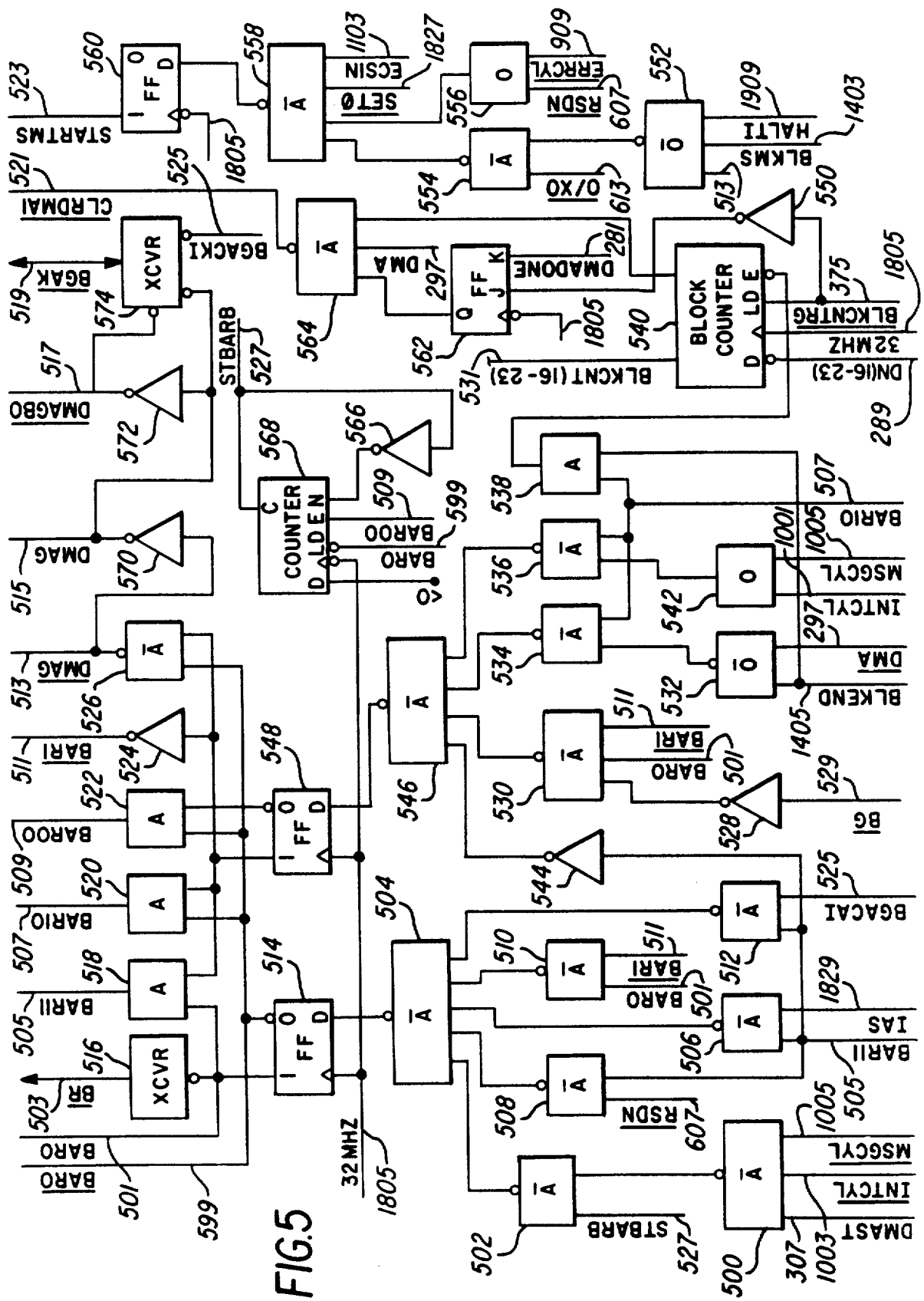
FIG. 5 illustrates the bus arbitration circuits and the circuits for initiating a cycle of operation of the DMA control circuits.

The circuits for controlling bus arbitration are shown in FIG. 5 and include a modulo-16 counter 568 and two flip-flops 514 and 548. Assume initially that both flip-flops are reset and the counter 568 is full so that the signal STBARB on lead 527 is asserted. A bus arbitration cycle is initiated by a message transfer cycle, an interrupt message cycle or a DMA transfer cycle. The message transfer and interrupt message cycle signals /MSGCYL and /INTCYL are generated in FIG. 10 as subsequently described. A DMA cycle is initiated by setting stage 6 of the DMA control register 266. In FIG. 3B, the output of the DMA control register enables NAND 338 which then asserts the signal DMAST. In FIG. 5 the signal DMAST as well as /MSGCYL and /INTCYL signals are applied to a NAND 500. When any of these signals is negated the output of NAND 500 enables one input of NAND 502. The signal STBARB enables the second input of NAND 502 and it produces an output signal to block NAND 504. The output of NAND 504 is applied to FF 514 which is then set by the next clock pulse on lead 1805. When FF 514 is set its output is applied to a transceiver 516 which asserts the bus request signal /BR which is applied to the system control bus 108. FF 514 also asserts the signal /BAR0 on lead 599 and this signal loads zeros into all stages of counter 568. The flip-flop also blocks NAND 522 and the output of this NAND prevents the incrementing of counter 568. These actions cause the counter 568 to retain a zero count throughout the bus arbitration.

The output of FF 514 is also applied over lead 501 to NAND 510. FF 548 is still reset so NAND 510 produces an output signal which keeps NAND 504 blocked so that the FF 514 remains set. Nothing further happens until the Bus Grant signal /BG is received over lead 529. This signal is inverted at 528 and enables one input of NAND 530. The output of FF 514 enables a second input of NAND 530. The set output of FF 548 is inverted by an inverter 524 and applied to a third input of NAND 530. Since FF 548 is still reset, all inputs to NAND 530 are high and it produces an output signal to block NAND 546. At the next following clock pulse FF 548 is set. With both FFs 514 and 548 set AND 518 asserts the signal BAR11 on lead 505. This signal is applied to one input of NANDs 506, 508 and 512.

Upon receiving a Bus Grant, the arbitration control circuits wait until the address strobe and bus grant acknowledge are negated before asserting its own bus grant acknowledge. As long as /BGAK on lead 519 is asserted transceiver 574 inverts the signal and the output of the transceiver is applied over lead 525 to enable NAND 512. The output of NAND 512 blocks NAND 504 and the output of this NAND keeps FF 514 set. In like manner, until the address strobe is negated the signal IAS on lead 1829 enables NAND 506 to block NAND 504 and keep FF 514 set. During this interval the signal on lead 505 is inverted at 544 and blocks NAND 546 so that FF 548 remains set.

When the signals on leads 525 and 519 are negated the outputs of NANDs 506 and 512 enable two inputs of NAND 504. The other inputs of the NAND are high and NAND 504 produces a low signal to reset FF 514. /BAR0 is negated so that zeros are gated into counter 568.

The outputs of FFs 514 and 548 enable NAND 526 and AND 518. AND 518 asserts the signal BAR10 on lead 507 to enable one input of NANDs 534 and 536 and AND 538. If an interrupt message or message transfer cycle is to be performed, one of the signals on leads 1001 and 1005 is asserted to that OR 542 enables a second input of NAND 536. The output of NAND 536 blocks NAND 546 so that flip-flop 548 remains set. In the case of a DMA transfer, the signals BLKEND and /DMA are low at the start of the cycle so that NAND 534 is enabled to thereby block NAND 546 and keep FF 548 set.

NAND 526 asserts the signal /DMAG on lead 513. This signal is passed through inverter 570 which asserts the signal DMAG on lead 515. DMAG is applied to transceiver 574 and is passed through inverter 572 and applied to the direction control input of the transceiver. The transceiver 574 then asserts the signal /BGAK on lead 519.

The signals /DMAG, DMAG and /DMAGB0 are gating signals used throughout the DMARC. These signals are used during interrupt message, message transfer and DMA cycles as subsequently described and are asserted until FF 548 is reset. This may occur during a DMA transfer if an error occurs or when a block has been transferred. It may also occur on a bus error or when a message transfer or interrupt message cycle is completed. The set output of flip-flop 548 and the reset output of flip-flop 514 condition AND 520 and it produces an output signal over lead 507 to enable one input of NANDs 534, 536 and 538. During an interrupt message or message transfer cycle the output of OR 542 enables a second input of AND 536 and its output disables NAND 546 to keep FF 548 set. During a DMA transfer both inputs to NOR 532 are negated and its output enables NAND 534 which in turn blocks NAND 546 to keep FF 548 set.

When /DMAG is asserted it is applied over a lead 513 to a NOR 552. The other inputs of NOR 552 are negated at this time so the output of the NOR enables one input of NAND 554. If the main state controls are not in state 01X0 as subsequently described, the second input of NAND 554 is enabled and it produces a low level output to block NAND 558. The output of NAND 558 is applied to FF 560 and at the next clock pulse the flip-flop is set and asserts the signal STARTMS on lead 523. In FIG. 6A, this signal starts a cycle of the main state sequencer. The states assumed by the sequencer during any cycle thereof are determined by the type of cycle being executed by the DMARC as subsequently explained. It is sufficient at this point to note that during an interrupt message or message transfer cycle the main state sequencer causes the signal INTCYL or MSGCYL, respectively, to be negated when the sequencer reaches state 0110. The output of OR 542 blocks NAND 536 and its output enables NAND 546 so that FF 548 is reset. During a DMA cycle the signal BLKEND is asserted when the main state sequencer reaches state 0110 if the last word of a block has been transferred. In this case NOR 532 blocks NAND 536 to cause FF 548 to be reset.

When FF 548 is reset AND 522 is enabled and asserts BAR00. This signal enables counter 568 to cound clock pulses because the carry output signal is low. The counter counts 16 clock pulses before it again asserts STBARB. This signal is inverted at 566 to disable incrementing of the counter. The arbitration circuits may now start another arbitration cycle if there is to be an interrupt message or message transfer cycle, or if the DMA transfer operation has not been completed, i.e., there are remaining blocks of data to be transferred.

Main State Sequencer

Figure 6B:
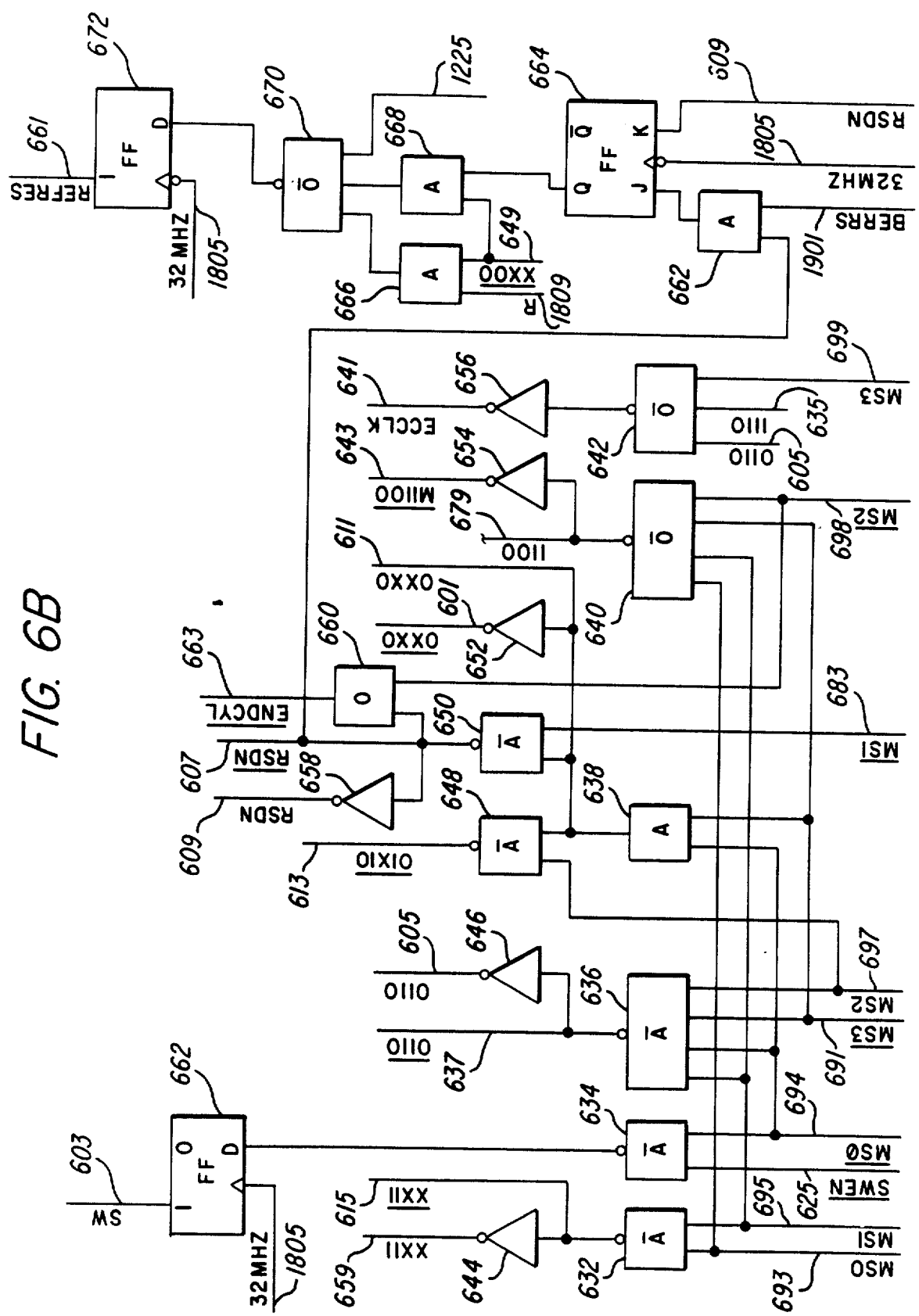

The main state sequencer which controls the cycling of the DMARC is illustrated in FIGS. 6A and 6B. The sequencer is capable of assuming 16 states but the states assumed by the sequencer during any given cycle are determined by the type of cycle being executed. The 16 states are defined by four flip-flops 606, 608, 610 and 612. For example if flip-flop 612 only is set then the sequencer is in state 0001. The sequencing of these flip-flops is controlled by a programmable logic array (PLA) 600. The PLA responds to output signals from the flip-flops representing a present sequence state, and various control signals as indicated in FIG. 6A, to generate signals for setting the flip-flops to represent the next state. The flip-flops are all clocked by the 32 MHZ clock signal.

A second PLA 616 is provided which produces various control signals depending upon the state represented by the flip-flops as well as various control signals applied to the PLA. In addition, a ROM 618 is provided for unconditionally generating certain control signals when the sequencer is in certain states. The circuits of FIG. 6B respond primarily to the signals produced by flip-flops 606, 608, 610 and 612 to generate signals during particular states of the sequencer.

For the sake of brevity, the main state sequencer circuits are not described in detail. Tables A and B show the logic equations for PLAs 600 and 616, respectively, while Table C shows the values stored at each address in ROM 618. These tables appear at the end of this specification. The operation of the sequencer during various types of cycles is described later.

Message Transfer Cycle

During a message transfer cycle the DMARC transfers the message (long word) in the message register 270 to the address specified by the contents of the message address register 238. The message transfer cycle may be used, for example, when a local processor in one of the units connected to the main bus desires to pass a message to the system processor 100. Security dictates against a direct transfer. In accordance with one aspect of the present invention the transmitting processor, for example local processor 146, loads the message register 270 in its associated control unit 104'. The control unit 104' then transmits the message to the address specified by its message address register. This address might be, for example, an address in RAM 102. The system processor 100 may then obtain the message from the RAM.

Figure 10:
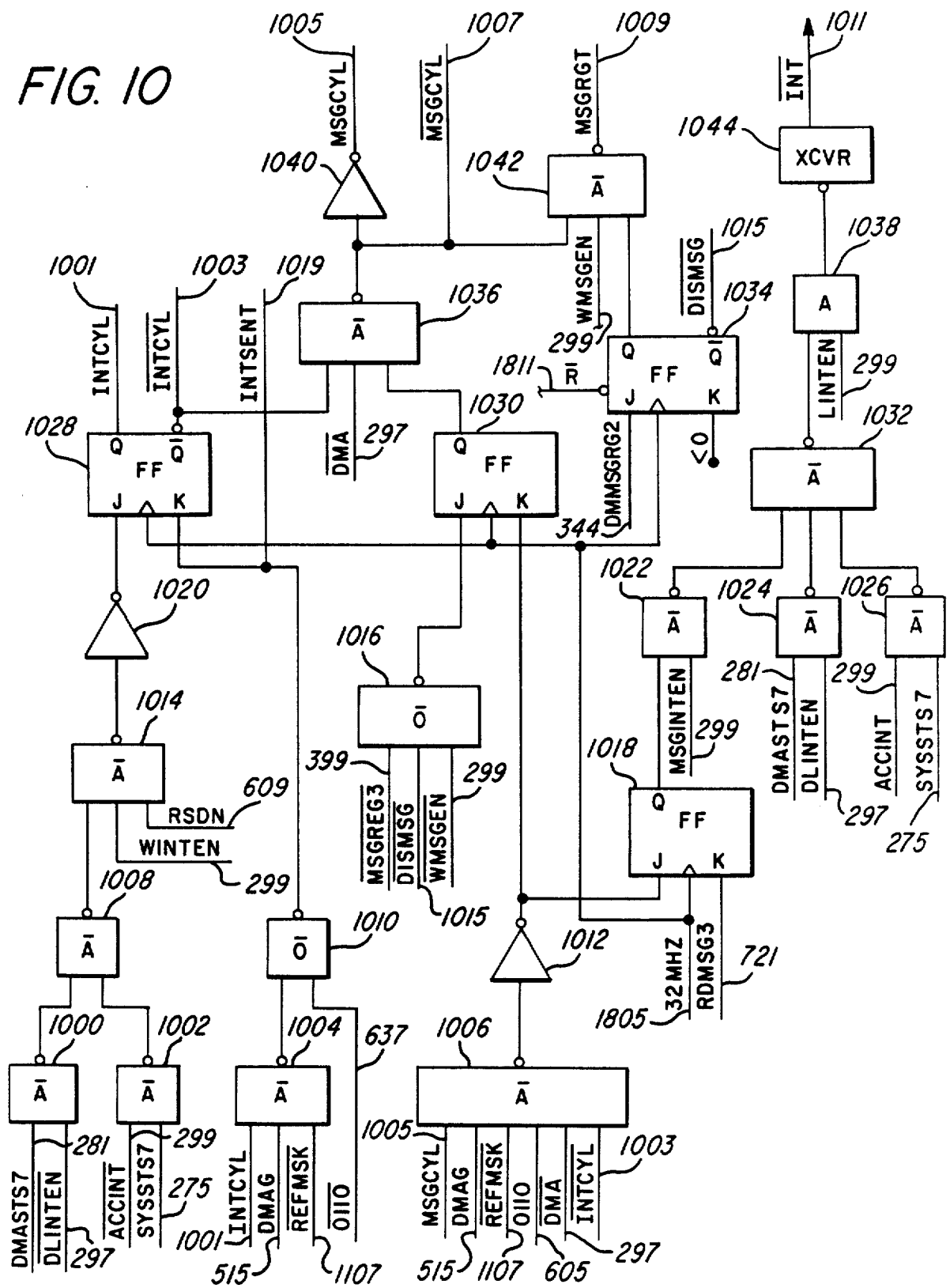

Before the message can be transferred, the system processor 100 must set up the registers in the control unit 104'. Bit 8 of the system control register 264 must be set to enable the DMARC in the control unit 104' to perform a message transfer cycle. Bit 6 may also be set at this time if it is desired to auto-increment the message address register 238 so that successive messages may be transferred to different addresses. When bit 8 is set it asserts WMSGEN which is applied to NAND 1042. The system processor 100 must also load the message address register 238 in control unit 104' with the address to which the message is to be sent. As the message address register is loaded by the local processor, the write decode circuits of FIG. 3 assert DMMSGREG2 on lead 344. In FIG. 10, DMMSGREG2 causes FF 1034 to be set by the next clock pulse. The set output of FF 1034 enables one input of NAND 1042. When the flip-flop is set it also asserts /DISMSG which is applied to NOR 1016. Once FF 1034 is set, it remains set until the DMARC receives the signal RESET.

When the processor 146 loads the message into the message register in control unit 104', the write decode circuits of FIG. 3A assert /MSGREG3. This signal is applied to NOR 1016 which then asserts a signal to set FF 1030. The output of FF 1030 enables NAND 1036 which asserts /MSGCYL on lead 1007 and, through inverter 1040, MSGCYL on lead 1005. The output of NAND 1036 blocks NAND 1042 so that MSGRGT is asserted on lead 1009. This signal is applied to port 2 of MUX 272 as bit 31 and is passed through the MUX when the message register 270 is read out.

Figure 8:
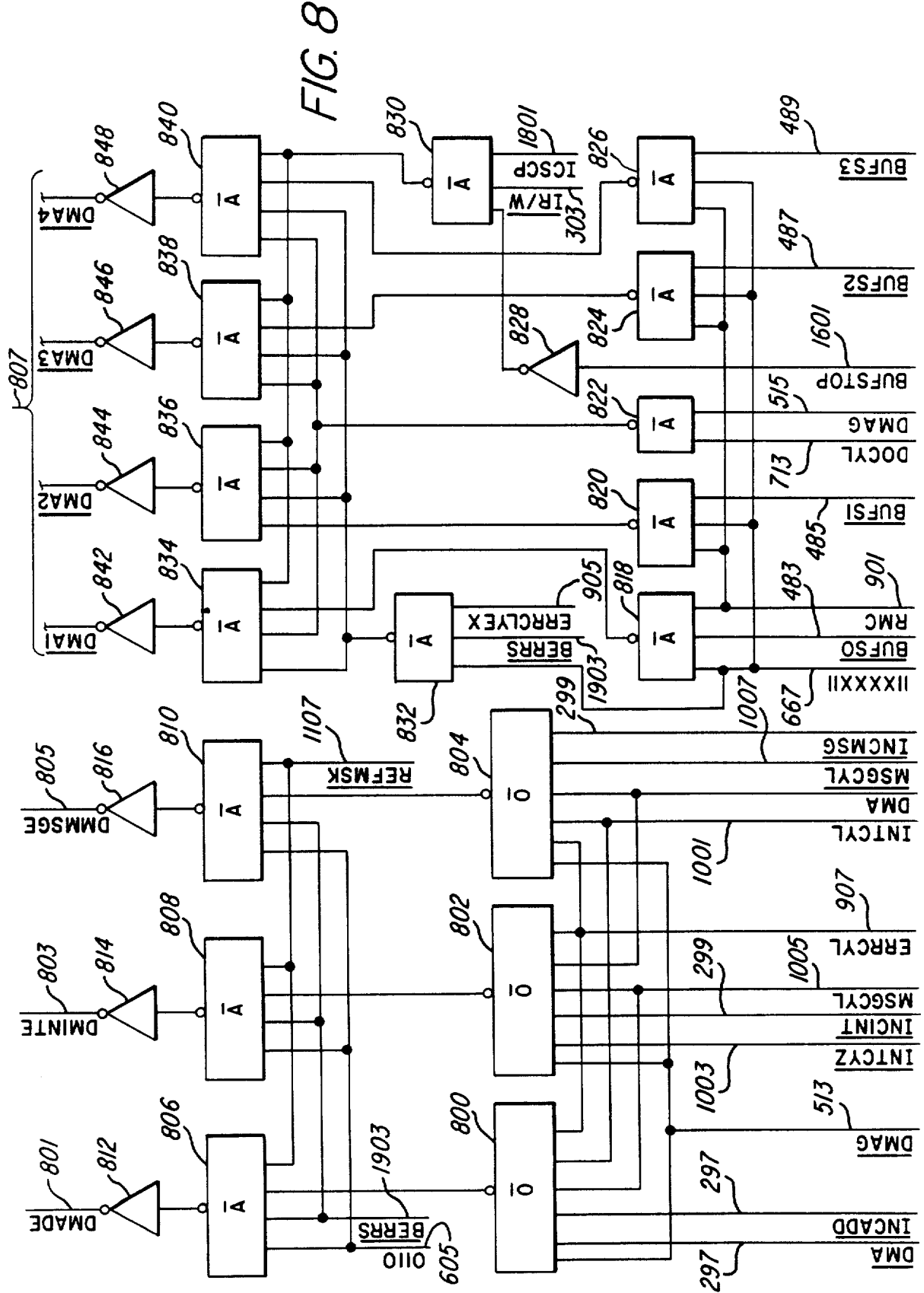
FIG. 8 illustrates the gating controls for the data bus transceivers as well as the controls for enabling counting by the DMA address counter, the interrupt address register and the message address register.

When MSGCYL and /MSGCYL are asserted they perform several functions. In FIG. 8, MSGCYL passes through NORs 800 and 802 to block NANDs 806 and 808. This assures that the signals on leads 801 and 803 remain negated to prevent incrementing the DMA address register 236 and the interrupt address register 240. /MSGCYL is applied to NOR 804. This NOR also receives the signal /INCMSG which is negated only if bit 6 of the system control register has been set to allow incrementing. Assuming incrementing is to be permitted NOR 804 asserts an output signal to enable one input of NAND 810. However, since the main state sequencer has not yet been started the signal 0110 on lead 605 is still low so that the signal DMMSGE on lead 805 is negated.

In FIG. 7B, MSGCYL passes through NOR 746 to assert /DOCYL and DOCYL. As explained with reference to the read decode circuits, this causes the contents of the message register 270 to be gated through MUX 272 and MUX 260 to transceivers 250. However, the message is not passed through the transceivers at this time because the direction control signals on leads 807 are still negated. /DOCYL also causes ADS0 to be asserted by NAND 707 and in FIG. 2A this signal gates the address in the message address register through MUX 212 to transceivers 200.

Figures 13, 14:
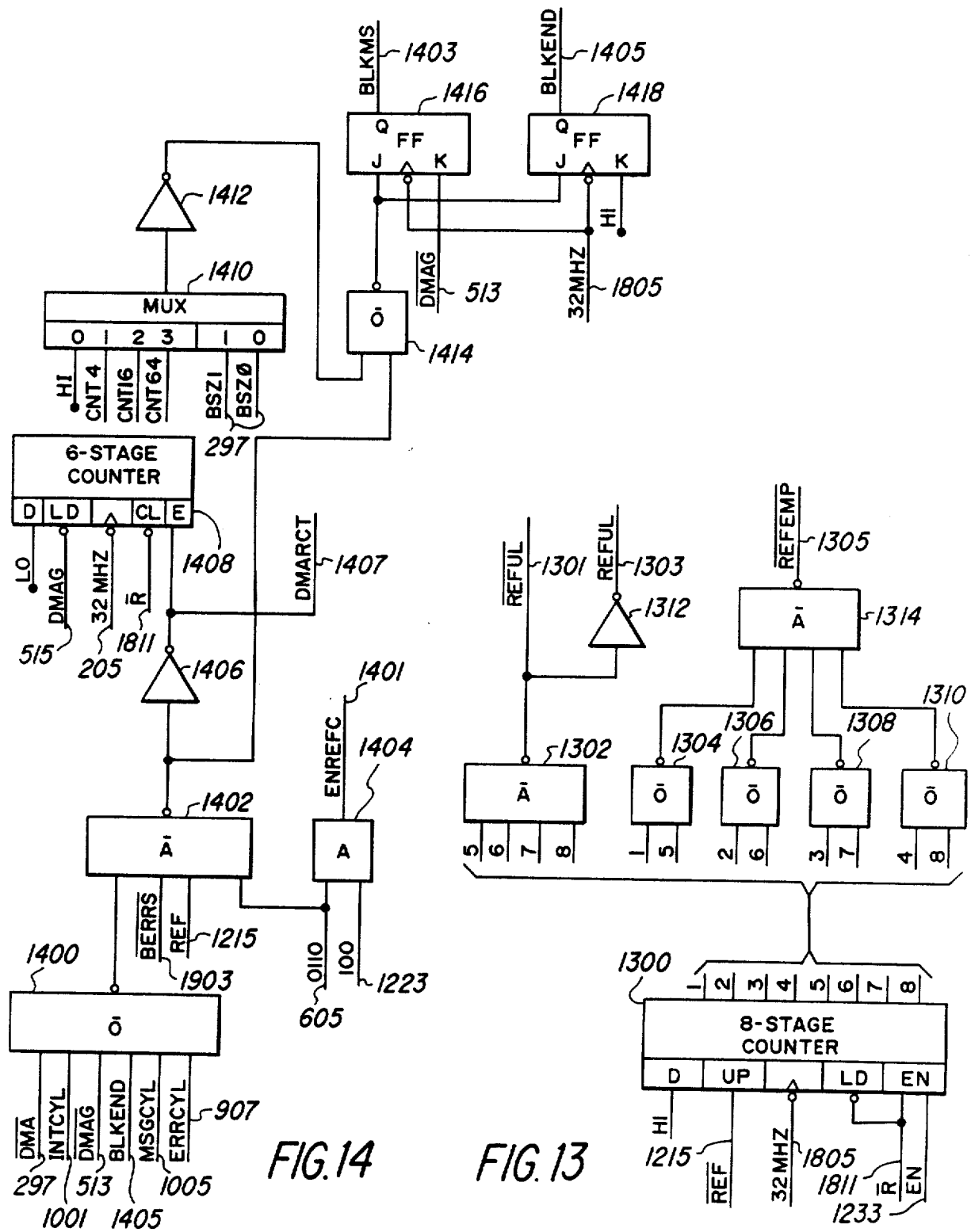
FIG. 14 illustrates the DMA block size control circuits.

In FIG. 14 MSGCYL passes through NOR 1400 and blocks NAND 1402. This prevents incrementing of the word counter 1408 or the setting of FFs 1416 and 1418.

In FIG. 5 /MSGCYL blocks NAND 500 thereby enabling the start of a bus arbitration cycle. When the control unit 104' is granted control of the bus it asserts the signals /DMAG, DMAG and /DMAGBO on leads 513, 515 and 517 as previously described.

In FIG. 3B, /MSGCYL blocks NAND 330 and the output of the NAND is applied to transceiver 345 so that when the DMARC gains control of the bus and /DMAGBO is asserted the signal R/W on lead 345 is asserted in the write mode.

When control unit 104' receives control of the bus it releases the address from the message address register 238 onto the main bus, asserts the Command Output Enable signal, and asserts the Read/Write signal in a write mode. When / DMAG is asserted it enables transceivers 200 and 202 so that the address from the message address register and the parity of this address are released to the bus. In FIG. 3B, /DMAGBO enables transceiver 314 which inverts the high level output of NAND 330 to assert the write mode to the bus over lead 345. The output of NAND 330 is also passed through transceiver 314 to one input of XOR 316. DMAG is applied to a second input of this XOR and its output is passed through buffer 320 and inverter 322 so that the signals BDIR and IBDIR are both high. The output of XOR 316 is the signal /IBDIRBO on lead 311.

The output of XOR 316 is also applied to AND 326 and blocks this AND so that the signal IBDIRBO on lead 321 is high. The signal BDIR on lead 343 sets the transceivers 122 to the output mode. In FIG. 2C, IBDIRBO sets transceivers 284 for the input mode while /IBDIRBO enables transceivers 252 in the output mode.

In FIG. 18, DMAG and DOCYL enable AND 1842 and its output is inverted by buffer 1840 to assert /CAOE which releases the high order byte of the address from command address register 136 to the address bus.

On the next clock pulse /DMAG acts through NOR 552 and NAND 554 to set FF 560 as previously described. The FF asserts STARTMS which is applied to PLA 600 to start the main state sequencer.

Assuming the main state sequencer is in state 0000 at the time STARTMS is asserted, and assuming that bit 13 of the system control register 264 is set for a fast memory cycle, Table II illustrates the operation of the sequencer during a message transfer cycle. Bit 13 of the system control register asserts 80/120 which is applied to input A6 of PLA 600. IBDIR and REFRES are also asserted at inputs A0 and A2 of the PLA. At the time STARTMS is asserted, the remaining inputs to the PLA are at the low level. In response to these conditions the PLA asserts signals at terminals 0, 1, 2 and 3 to set FFs 606, 608, 610 and 612 to state 0001 at the next clock pulse. At the same time, outputs 1* and 3* are inverted by NOR 630 so that FF 614 is reset. The assertion of outputs 0*, 1* and 3* is not shown in Table II for the sake of clarity.

From Table II it is seen that when the main state sequencer is in state 0001, PLA 616 asserts a high level signal at its output 7 while ROM 618 asserts a high level signal only at its output 1. Most of the signals asserted by PLA 616 and ROM 618 do not directly control the message transfer and will be discussed later.

TABLE II

| Main State Sequence for DMA Write, Message Transfer and Interrupt Message Cycles | | | | |
|---|---|---|---|---|
| INPUT TO PLA 600 | SETS STATE | PLA 600 OUT | PLA 616 OUT | ROM 618 OUT 0–7 |
|  | 0000 |  | 7 | 00010110 |
| 0000 | 0001 |  | 7 | 01000000 |
| 0001 | 0011 | 6 | 01 7 | 01000000 |
| 0011 | 0111 | 6 | 0147 | 01000000 |
| 0111 | 1101 | 6 | 0147 | 01000001 |
| 1101 | 1011 | 56 | 0147 | 01000001 |
| 1011 | 1111 | 56 | 0147 | 01010001 |
| 1111 | 1110 | 56 | 0147 | 01110101 |
| 1110 | 1110 | 56 | 0147 | 01110101 |
| — | — | — | — | — |
| 1110 | 0110 | 56 | 147 | 01011101 |
| 0110 | 0100 |  | 7 | 00011100 |
| 0100 | 0000 |  | 7 | 00010110 |

When the state sequencer is set to state 0001, PLA 600 begins asserting IAS0 at its output 6. In FIG. 18, IAS0 sets FF 1814 at the next clock pulse and the output of the FF is inverted by transceiver 1826 to assert /AS on lead 1861. This signal is placed on the bus to indicate that a valid address is on the bus. At the same time, the outputs of PLA 600 set the main state sequencer to state 0011.

In state 0011 PLA 600 continues to assert IAS0. PLA 616 begins asserting BUF on lead 651 and in FIG. 4 this signal enables ANDs 434, 440, 446 and 452 so that the signals /BUF0-/BUF3 are asserted. These signals gate the message through transceivers 122 to the data bus.

From state 0011 the sequencer is moved to state 0111 where PLA 600 continues asserting IAS0 while PLA 616 continues asserting BUF. From state 0111 the sequencer moves to state 1101 at which time PLA 600 asserts IDS0 at output 5 while continuing to assert IAS0. IDS0 is applied over lead 629 to FF 1810 which is then set by the next clock pulse. The output of the FF is inverted by transceiver 1806 to assert /DS on lead 1863. This data strobe signal is applied to the main bus to indicate that valid data is on the data bus lines.

On successive clock pulse cycles the sequencer moves to states 1011, 1111 and 1110. During these states PLA 600 continues asserting IDS0 and IAS0 at outputs 5 and 6 while PLA 616 continues asserting BUF at its 1 output.

The sequencer remains in state 1110 until a data acknowledge is received. In FIG. 18 /DTAK is received over lead 1855 and is inverted by transceiver 1854 to assert IDTAK on lead 1821. This signal is applied to PLA 600 which asserts output signals to change the sequencer to state 0110.

When the sequencer assumes state 0110, PLA 600 negates its outputs 5 and 6 to terminate the address strobe and data strobe. In FIG. 6B, the outputs of FFs 606, 608, 610 and 612 enable NAND 636 and it asserts /0110 and, through inverter 646, 0110. The outputs of FFs 606 and 612 enables AND 638 at its output enables one input of NAND 648. The other input of NAND 648 is derived from FF 608. NAND 648 thus asserts /01X0 on lead 613.

In FIG. 5, /01X0 blocks NAND 554 and this enables NAND 558 whose output resets FF 560 at the next low clock phase. This terminates STARTMS.

FIG. 8, 0110 passes through NAND 810 to assert DMMSGE if the message address register is to be incremented. DMMSGE enables the message address register so that it may be incremented by one at the next clock pulse.

FIG. 10, /0110 passes through NAND 1006 and inverter 1012 to reset FF 1030 at the next clock pulse. This negates MSGCYL and in FIG. 5 this signal acts through OR 542, NAND 536 and NAND 546 to reset FF 548 and terminate control of the bus by the DMARC. When FF 548 is reset, /DMAG, DMAG and /DMAGBO are negated so that the bus direction signal and the various transceivers return to the state existing at the beginning of the message cycle.

From state 0110 the main state sequencer moves to state 0100 at which time PLA 616 negates the BUF signal on lead 651. This completes the message transfer cycle and on the next clock pulse the sequencer moves to state 0000.

Interrupt Message Cycle

An interrupt message cycle writes the contents of the system and DMA status registers 274 and 276 and interrupt register 268 to the address specified by the interrupt address register 240. A DMARC may not initiate an interrupt message cycle unless the system has first loaded the system control register 264 and the interrupt address register 240. Also, the interrupt register 268 should be loaded with some value which will tell the system processor 100 what should be done when the processor is ready to process the interrupt. Bit 11 of the system control register must be reset to allow initiation of an interrupt message cycle in case of a bus error when a DMARC is performing a message transfer or DMA cycle, or at any time when an error occurs that increments the error counter 732 to a full count. In FIG. 16, the output of the error counter sets stage 1 of the system status register and the output of this stage is applied to NAND 1600 to set stage 7. In the case of a bus error on a message cycle or a DMA read transfer, NAND 1618 acts through inverter 1620 to set stage 0 of the system status register. The output of this stage also acts through NAND 1600 to set stage 7. In FIG. 10, when stage 7 of the system status register is set and bit 11 of the system control register is reset to assert /ACCINT, NAND 1002 produces an output signal to block NAND 1008. The output of NAND 1008 is applied to NAND 1014. This NAND also receives the signal WINTEN from stage 9 of the system control register. This stage must be set to allow any interrupt message cycle.

In FIG. 15 a DMA error sets stage 4 of the DMA status register while stage 6 is set by the output of inverter 1502 at the completion of a DMA transfer. The outputs of stages 4 and 6 of the DMA status register are applied to NAND 1500 to set stage 7 if either stage 4 or stage 6 is set. In FIG. 10, the output of stage 7 of the DMA status register is applied to a NAND 1000. Bit 1 of the DMA control register must be reset to assert /DLINTEN if an interrupt message cycle is to take place as the result of a DMA error or the completion of a DMA transfer. The output of NAND 1000 passes through NAND 1008 to AND 1014. If an interrupt condition exists and if the DMARC is configured as described, NAND 1014 produces an output signal through inverter 1020 to set FF 1028 and assert the signals INTCYL on leads 1001 and 1003.

When FF 1028 is set the signal /INTCYL acts through NAND 500 to initiate bus arbitration. In FIG. 7B INTCYL acts through NOR 746 to assert DOCYL and /DOCYL. In FIG. 2D DOCYL is applied to MUX 272. In FIG. 7B /DOCYL blocks NANDs 768 and 772 to assert DMASEL1 and ADS0. /INTCYL blocks NANDs 770 and 776 to assert DMASEL0 and STSSEL0 on leads 719 and 711. With DOCYL and STSSEL0 both asserted MUX 272 passes the contents of the system status registrer 274, the DMA status register 276 and the interrupt register 268 through to port 1 of MUX 260. Since ADS0 is asserted the data is passed through MUX 260 to transceivers 250 which are in the input mode until the DMARC is granted control of the bus.

FIG. 8, INTCYL passes through NORs 800 and 804 to block NANDs 806 and 810. This negates DMADE and DMMSGE so that the DMA address and message address registers cannot be incremented. /INTCYL is applied to NOR 802 and when /DMAG occurs the NOR aserts a high level signal to NAND 808. If stage 5 of the system control register 264 is set to permit incrementing of the interrupt address register the signal /INCINT on lead 299 is low. These conditions permit the NAND 808 to be enabled at machine state 0110 to assert DMINTE, thereby enabling incrementing of the interrupt address register.

In FIG. 14, when INTCYL is asserted it passes through NOR 1400 and blocks NAND 1402. The output of NAND 1402 disables the counter 1408 so that it cannot count and prevents the setting of FFs 1416 and 1418.

When control of the bus is granted to the DMARC the signals /DMAG, DMAG and /DMAGBO are asserted on leads 513, 515 and 517, and the STARTMS sequence is initiated as previously described. In FIG.

18, DMAG passes through AND 1842 and buffer 1840 to assert /CAOE on lead 1839. This signal gates the high order address from the external command address register 136 onto the address bus.

In FIG. 2A, /DMAG enables transceivers 200 and 202 so that the contents of the interrupt address register are gated out to the bus through transceivers 200 while the address parity is gated out through transceivers 202.

In FIG. 8, when DMAG is asserted it passes through NAND 822 and enables NANDs 834, 836, 838, and 840 so that the signals /DMA1-/DMA4 are asserted. In FIG. 2C these signals enable transceivers 250 so that the status is gated onto the main bus.

In FIG. 5, /DMAG blocks NOR 552 (the other inputs are negated) and its output enables NAND 554. If the main state sequencer is not in state 01X0 NAND 554 blocks NAND 558 so that FF 560 is set at the next clock pulse. The flip-flop produces a signal STARTMS on lead 523 and this signal is applied to PLA 600 to start the main state sequencer.

Once the main state sequencer is initiated, it sequences through the same states as for the message transfer cycle previously described. Near the end of the interrupt message cycle, when the main state sequencer reaches states 0110, the signal 0110 enables NAND 808 to assert DMINTE and enable the interrupt address register to be incremented if stage 5 of the system control register is set to assert /INCINT.

In FIG. 10, /0110 passes through NOR 1010 to reset FF 1028 thereby negating INCTYL and /INTCYL. This terminates the DMARC control of the bus and causes the various control lines to be negated as in a message transfer cycle. The output of NOR 1010 is the signal INTSENT and it is applied over lead 1019 to a NAND 1622. Assuming that bit 11 of th system control register 264 is set the second input of NAND 1622 is already enabled and the NAND produces an output signal to block NAND 1624. The resulting output from NAND 1624 resets stages 1–4, 6 and 7 of the system status register 274.

The signal INTSENT is also applied to NAND 1508 and if bit 1 of the DMA control register is reset, /DLINTEN enables the second input of NAND 1508. The output of the NAND blocks NAND 1510 and the output of this NAND resets stages 0–4, 6 and 7 of the DMA status register.

Direct Memory Access Cycle

A DMA operation may be initiated by a DMARC to control the transfer of one or more blocks of data between the memory associated with the DMARC and another memory such as the local memory 102 for the system processor 100. The number of long words in a block is determined by the setting of bits 2 and 3 of the DMA control register 266 which address MUX 1410. Bit 4 of the DMA control register must be set for a read operation or reset for a write operation. A read operation reads data from the main bus and puts it in the memory controlled by the DMARC while a write operation places data from the memory on the bus. The number of blocks to be transferred is loaded into block counter 540 prior to initiation of the DMA cycle and the DMA address register 236 (and 134 if provided) is loaded with the starting address specifying the first location in a remote memory to be accessed. Bits 2 and 3 of the DMA control register must be loaded with an indication of the number of words in each block. The DRAM counter 246 is loaded with an address specifying the first location to be accessed in the memory controlled by the DMARC. The DMA cycle is initiated when stage 6 of the DMA control register 266 is set to assert DMA and /DMA.

In FIG. 8, DMA is applied to NORs 802 and 804 and the outputs of these NORs block NANDs 808 and 810 throughout the DMA cycle. This negates DMINTE and DMMSGE so that the interrupt and message address registers 236 and 238 cannot be incremented. /DMA is applied to NOR 800 so that if bit 5 of the DMA control register 266 is set to assert /INCADD, the output of 800 may enable one input of NAND 806 when bus control is granted and /DMAG is asserted. The signal 0110 is negated at this time so DMADE on lead 801 remains negated.

In FIG. 15, DMA is applied to the J input and through an inverter 1504 to the K input of the FF in stage 5 of the DMA status register 276 to set the stage. In FIG. 14, /DMA is applied to NOR 1400 but has no effect at this time because /DMAG is asserted.

With reference to FIG. 7B, it should be noted that, unlike the message transfer and interrupt message cycles previously described, the DMA cycle does not cause DOCYL and /DOCYL to be asserted. Therefore, in FIG. 8 the signals /DMA1-/DMA3 are negated so that in FIG. 2C the data transceivers are set for the input mode. This permits the data transferred during a DMA cycle to be routed into the DMARC for error checking although the data is actually transferred directly between the memory controlled by the DMARC and the main bus. For example, in FIG. 1 the DMARC in control unit 104' may control the transfer of data from RAM 144 to the main bus, bypassing the DMARC in control unit 144, and from the main bus the data may be written into RAM 102, bypassing DMARC 120.

In FIG. 3, DMA passes through NAND 338 to assert DMAST on lead 307. In FIG. 5, DMAST is applied to NAND 500 to initiate a bus arbitration cycle. When the DMARC is granted bus control, it asserts /DMAG, DMAG and /DMAGBO as previously described. In FIG. 7B, /DMAG blocks NANDs 750, 752 and 754 and the outputs of these NANDs enable NANDs 768 and 770 so that DMASEL0 and DMASEL1 are negated. In FIG. 2A these signals address port 0 of MUX 212 so that the output of the DMA address counter 236 is gated through the MUX to transceivers 200. /DMAG sets the address transceivers 200 and address parity transceivers 202 in the output mode to gate the address and its parity onto the main bus.

In FIG. 14, when DMAG is asserted it latches into counter 1408 the zeros applied to its data inputs. /DMAG and /DMA are applied to NOR 1400 and since all inputs are low the NOR applies a high level signal to NAND 1402. However, the NAND is still blocked at this time because the signal 0110 is negated. The output of NAND 1402 acts through NOR 1414 to drive the J inputs of FFs 1416 and 1418 low. This does not change the states of the FFs which have been reset previously.

In FIG. 3, /DMAGBO sets transceiver 314 for the output mode. Depending on whether direction bit 4 of the DMA control register 266 is set or reset, NAND 330 applies a signal to transceiver 314 to assert R/W on lead 345 in the read or write mode, respectively. The output of NAND 330 also passes through transceiver 314 to XOR 316. DMAG is also applied to XOR 316. Therefore, IBDIRBO, /IBDIRBO, BDIR and IBDIR are asserted or negated depending upon whether the DMA transfer is a read or a write operation. If it is a write operation, IBDIRBO sets transceivers 284 for the input mode so that the ECC bits read from the memory may be compared with the ECC bits generated by ECC generator 280 in response to the data read from the memory controlled by the DMARC and applied to the generator through data transceivers 250. At the same time, /IBDIRBO sets transceivers 252 to the output mode. For a read operation transceivers 284 are set for the output mode while transceivers 252 are set for the input mode.

BDIR is applied to data transceivers 122 to set them to the output mode for a DMA write or the input mode for a DMA read. IBDIR is applied to PLAs 600 and 616 and controls the signals generated by the sequencer as it moves through the various states during the DMA cycle, these signals being different for the DMA read or write cycles.

In FIG. 11, the signal DMAG is applied to a NOR 1104 and the output of the NOR is applied to a NOR 1106. This conditions the NOR 1106 so that when the main state sequencer asserts /WEO during a DMA read operation the signal /WE is asserted on lead 1111. This conditions the circuits in the memory associated with the DMARC so that the memory writes the data read from the remote memory.

FIG. 18, DMAG passes through AND 1838 and is inverted at 1841 to assert /ADOE on lead 1841 thereby enabling the readout of the high order address bits from the DMA address register 134.

For the DMA write operation the main state sequencer of FIG. 6A sequences through the same sequence of states as for a message cycle. However, certain additional outputs of PLA 616 and RAM 618 are useful in carrying out the DMA write operation.

Output 7 of PLA 616 is the signal /WEO which is applied over lead 657 and through NOR 1106 and driver 1108 to negate /WE. /WEO is high throughout the DMA cycle so that /WE sets the memory controlled by the DMARC for reading out.

At the time the DMARC is granted bus control, the signal DMAG is generated and in FIG. 3B this signal is inverted by NOR 318 to negate SELMAD. In FIG. 2B SELMAD conditions MUX 208 so that the starting DMA address in DRAM counter 246 is gated through the MUX 208 to MUXs 214, 216 and 218.

When the main sequencer is in state 0000, ROM 618 negates /RASEN on lead 633. In FIG. 11, /RASEN enables one input of NAND 1118. In addition, FF 116 is set, the setting taking place when the main state sequencer reached state 1110 of the previous cycle so that PLA 600 asserted /NS0. The output of the FF enables the second input of NAND 118. The output of the NAND is inverted by driver 1120 to negate the row address signal on lead 1113 thereby preventing the memory from accepting the row address until the address signals have settled.

From Table II it may be noted that starting in state 1111 of the previous cycle ROM 618 began producing a high level signal on lead 625 to enable one input of NAND 634 (FIG. 6B). Beginning in state 1110 the FF 612 is reset so that /MS0 is asserted. At this time the NAND asserts an output to reset FF 662 at the same time the sequencer assumed state 0110. FF 662 has remained reset to negate the signal SW. Therefore at sequencer state 0000 the negated signal SW is controlling MUXs 216 and 218 so that the low order address bits gated through MUX 208 from DRAM counter 246 are being applied to drivers 220 as the memory row address.

When the sequencer enters state 0001, the PLA 618 asserts /SWEN and /RASEN. In FIG. 11, /RASEN blocks NAND 1118 to thereby assert /RAS to strobe the row address into the memory addressing circuits of the memory controlled by the DMARC. In FIG. 6B, /SWEN blocks NAND 634 so that FF 662 is set at the same time the output of PLA 600 sets the main state sequencer to state 0001. When the FF is set it asserts /SW and in FIG. 2B this signal enables MUXs 216 and 218 so that the high order bits of DRAM counter 246 are applied to drivers 220 as the column address for the memory controlled by the DMARC. At the same time, PLA 600 asserts IAS0 on lead 627 and in FIG. 18 this signal causes /AS to be applied to the main bus. Also, PLA 616 asserts an output signal to enable the setting of FF 622 and asserts BUF on lead 651 to enable the transceivers 122. FF 622 asserts CASEN on lead 665 when the sequencer enters state 0011. In FIG. 11, CASEN is inverted by NOR 1126 and applied to NORs 1144, 1146, 1148 and 1150 thereby enabling the NORs to respond to the outputs of decoder 1134.

At this time decoder 1134 is receiving output bits 20 and 21 from DRAM counter 246, these bits being available on lead 293 at the output of MUX 208. Since the signal REFADR is negated and FF 1128 is reset, the output of OR 1130 enables decoder 1134 and it decodes address bits 20 and 21 to assert a signal on one of four output leads. The signal passes on one of inverters 1136, 1138, 1140 or 1142, one of NORs 1144, 1146, 1148 or 1150, and one of drivers 1152, 1154, 1156 or 1158 to assert one of the signals /CAS0-/CAS3 to thereby strobe the column address into the addressing circuits of the memory controlled by the DMARC.

At this point the memory controlled by the DMARC has been addressed by the address in DRAM counter 246 and the address in DMA address register 236 has been placed on the bus to select the destination address. Transceivers 122 are set for the output mode but data from the memory has not yet been applied to the transceivers. When the sequencer moves to state 0111 PLA 616 asserts a low level signal at output 4* which is connected to NOR 626. Under normal conditions DOCYL and BUFSTOP are both negated so the output of NOR 626 is inverted by buffer 628 to assert /OEN on lead 621. This signal enables drivers 132 so that the long word read from the memory passes through drivers 132 and transceivers 122, and over the bus to the destination address specified by the DMA address register.

The sequencer then moves to states 1101, 1011, 1111 and 1110 and waits in state 1110 for a data acknowledge in the same manner as for a message cycle. When the sequencer enters state 1111 ROM 618 negates /SWEN and when it reaches state 1110 it negates /RASEN. PLA 616 negates BUF when state 0110 is reached and causes CASEN to be negated when state 0100 is reached.

The DMA write cycle does not necessarily terminate after a single word is transferred. The sequencer may proceed through several of its cycles, transferring one word on each cycle. The DMARC does, however, relinquish bus control after it has transferred a single block. If there are additional blocks of words to be transferred then the DMARC initiates another contention for bus control after arbitration counter 568 has counted to its capacity as previously described.

In FIG. 14, when the sequencer reaches state 0110 the signal 0110 is asserted on lead 605. This signal passes through NAND 1402 and inverter 1406 to enable counter 1408 which is then incremented at the next clock transition. The output of inverter 1406 is also applied over lead 1407 to the DRAM counter 246 so that it is incremented by the next clock pulse. In FIG. 8, the signal 0110 causes DMADE to be asserted if the DMA address register is to be incremented and in FIG. 2B this enables the register to be incremented by the next clock transition.

In FIG. 14, the signals BSZ1 and BSZ0 select the block size as 1, 4, 16 or 64 long words. Assuming that the count in the counter 1408 has not reached the desired count, the output of MUX 1410 remains low. This output is inverted by inverter 1412 and acts through NOR 1414 to keep FF 1416 and 1418 reset. In FIG. 5, the output of FF 1406 holds the input of NOR 552 low so thsat /DMAG on lead 513 causes the NOR to assert a signal as previously described to set FF 560 and start another cycle of the main sequencer.

On the other hand, if the count in counter 1408 equals the desired word count for one block, the outputs from MUX 1410 and NAND 1402 causes FFs 1416 and 1418 to assert BLKMS and BLKEND. In FIG. 5, BLKMS is applied to NOR 552 to prevent the FF 560 from being set to start another cycle. BLKEND is applied to NOR 532 and through NAND 538 to the enable input of block counter 540. The counter is incremented at the next clock pulse and at the same time the output of NOR 523 causes FF 548 to be reset thereby terminating the control of the bus by the DMARC. FFs 1416 and 1418 are reset by the clock transition in state 0100 since the output of NAND 1402 is then high.

If the last block of words has not been transferred, the DMA control register is not cleared hence the conditions still exist for starting another bus arbitration cycle. On the other hand, if the last block of words has been transferred, the incrementing of block counter 540 causes it to produce a carry output on lead 521 to enable one input of NAND 564. The second input of the NAND is enabled because bit 6 of the DMA control register was set to initiate the DMA operation. The third input of the NAND is connected to the output of FF 562. At the time the signal /BLKCNTRG was asserted to load the block counter 540, the signal was inverted at 550 to set FF 562. Therefore, when the block counter produces a carry output NAND 564 asserts /CLRDMA1 on lead 521. In FIG. 15, this signal is inverted at 1502 and sets stage 6 of the DMA status register. Stage 6 asserts the signal DMADONE and in FIG. 3B this signal passes through NOR 336 to block NAND 338 and negate DMAST. In FIG. 5, this prevents initiation of another bus arbitration.

The output of NOR 336 also blocks NOR 332 and since the sequencer is now in state 0100 the NOR causes inverter 334 to assert /DMACLR. This signal resets bit 6 of the DMA control register 226 thereby negating the signal DMA.

During a DMA write cycle, or during a message transfer or interrupt message cycle, the DMARC controlling the destination address memory executes a normal write operation during which it writes the word from the bus into the destination address. The R/W signal from the bus-controlling DMARC selects the mode for the remote DMARC and the address strobe signal from the controlling DMARC initiates operation of the main state sequencer in the remote DMARC. The address placed on the bus by the controlling DMARC is decoded by decode circuits 160 at the remote DMARC and generates the signal /CSME so that the remote DMARC knows it is to execute a memory cycle.

DMA Read Operation

A DMA read operation is essentially the same as a DMA write operation except that data from a remote memory is transferred to the memory controlled by the DMARC. The DMA address register 236 specifies the source of the data and DRAM counter 246 specifies the destination. Bit 4 of the DMA control register must be set for the DMA read operation so that in FIG. 3B the output of NAND 330 causes R/W on lead 345 to be in the read mode (high) and causes IBDIRBO, /IBDIRBO, IBDIR, BDIR and /IBDIRO to be complement to their states for the write mode. This reverses the input/output modes of transceivers 252 and 284. The transceivers 200 and 202 are set for the output mode and transceivers 250 for the input mode, the same as for a DMA write operation. In FIG. 18 /DMAGBO sets transceivers 1800, 1806 and 1826 to the output mode and transceiver 1854 to the input mode, as for the DMA read operation. In FIG. 4, transceivers 400 and 402 are set for the output mode.

Referring to Table II, the DMA read operation proceeds through the same sequence of steps as for a DMA write operation. However, in a DMA read operation the main state sequencer waits in state 0011 for the data acknowledge (DTAK) and does not wait at state 1110. The signals produced by PLA 60 during each state of the sequencer is the same as for a write operation. However, the signals produced by PLA 616 are different. For a DMA read operation PLA 616 keeps its output 4* high throughout all states of the sequence thereby negating /OEN and preventing readout of the memory through buffers 132. Output 7 of PLA 616 is negated when the sequencer is in states 1011 and 1111. The signal /WEO is applied to NOR 1106 so that driver 1108 asserts /WE on lead 1111 to place the memory in the write mode so that the data read from the bus is written into the memory.

During the DMA read operation PLA 616 asserts a signal at its output 0 as for a write operation to enable the column address strobe for the memory, and asserts a signal at its output 1 to enable transceivers 122 to pass the data to the memory.

During a DMA read operation of one DMARC, another DMAR which controls the data source, i.e. the memory location specified by DMA address register 236, executes a normal read cycle as described below to read a word from memory and place it on the main bus. The R/W signal output by transceiver 314 of the bus master sets the remote DMARC for the normal read and the address strobe output by the bus master on lead 1861 initiates the main state sequencer in the remote DMARC. The address placed on the bus by the bus master is decoded by the address decode circuits 160 at the remote DMARC to assert /CSME which is then applied to the buffer 1100 in the remote DMARC.

Normal Read and Write Cycles

A normal read cycle reads one long word from the memory and places it on the data bus while a normal write cycle writes into the memory a long word present on the data bus. The data is also applied to the DMARC with its ECC bits so that its validity may be checked.

The DMARC uses the standard MC68000 bus and control signals. The MC68020 and MC6800 differ in the interface signals they provide, namely Early Cycle Start (ECS), Sizing and Data Strobe signals. The DMARC may use either the ECS produced by the MC68020 or the Address Strobe produced by the MC68000 to start a memory cycle. The ECS signal from a 68020 processor is gated by the logical address strobe signal produced by the process to obtain the signal /ECS which is applied to the DMARC. In FIG. 11, /ECS is passed through inverting buffer 1110 to one input of AND/OR 1114. The signal /0XX0 is high so the AND/NOR negates ECSIN. Th output of buffer 1110 is applied to the J input of FF 1112 and, through inverter 1170, to the set input of the FF. This sets the FF which remains set until the main state sequencer reaches state 0XX0 near the end of a read or write cycle. The output of the FF enables AND/NOR 1114 so that ECSIN remains negated after /ECS is negated. In FIG. 5, ECSIN blocks /NAND 558 so that FF 560 is set at the next clock pulse to assert STARTMS and start the main state sequencer.

In the case where the address strobe is utilized, the bus master asserts /AS and this signal enters the DMARC on lead 1861. The signal is inverted at transceiver 1826 and applied to NAND 1816. The signal RSDN is asserted as long as the main state sequencer is in state 0X00. If the address on the address bus is an address of a location in the memory controlled by a DMARC, the address decoder 160 for the DMARC asserts the signal /CSME. In FIG. 11, /CSME passes through inverting buffer 1100 and NOR 1104 to apply a low level signal to NOR 1106.

The output of buffer 1100 is the signal MEMEN and it is applied through OR 1814 to NAND 1816. When the address strobe signal is received NAND 1816 asserts /SET0 and in FIG. 5 this signal blocks NAND 558. This causes FF 560 to be set at the next negative-going transition of the clock and the FF asserts STARTMS to start the main state sequencer.

At the time the main state sequencer is started, the address is already being applied to the DMARC from the bus. The address passes through transceivers 200 to MUX 208. In FIG. 3B, both inputs to NOR 318 are low so that it asserts SELDMAD on lead 315. In FIG. 2B, SELDMAD gates the address through MUX 208 to MUXs 214, 216 and 218. The addressing of the memory for a normal read or write cycle is the same as for the DMA write cycle previously described. Therefore, during sequencer state 0001 ROM 618 asserts /RASEN so that the low order address bits are applied to the memory with the row address strobe /RAS. In sequence state 0011 CASEN is asserted by FF 622 and the column address strobe /CAS gates the high order address bits to the memory.

The DMARC may then wait until the data strobe signal /DS is received from the bus master. When /DS is received, it passes through transceiver 1806 and is applied to PLA 600 so that the sequencer moves to state 1011. Thus, for a normal read or write operation the sequencer does not enter states 0111 and 1101 as it does for the operations represented by Table II.

In state 1011 the DTACK signal is sent to the bus master. PLA 618 asserts INDTAK on lead 671 and the signal passes through NOR 1850, inverter 1852, transceiver 1854 and lead 1855 to the system control bus. Also, PLA 618 asserts BUF1 on lead 651 to enable the transceivers 122 to pass the data. The direction of data flow through the transceivers is determined by BDIR which, in FIG. 3B, follows the level of the R/W signal being received over lead 345.

In state 1111 the 4* output of PLA 618 acts through NOR 626 and buffer 628 to assert /OEN if a read cycle is being performed, thereby gating the data from the memory through buffers 132. If a write cycle is being performed PLA 616 asserts /WEO and in FIG. 11 this causes /WE to be asserted so that the memory is placed in the write mode to store the data from the bus.

During state 1111 and succeeding state 1110 the data is checked for ECC or parity errors. A BERR and a HALT signal are asserted in FIG. 19 if there is an error and the memory cycle is terminated. Assuming no error, the sequencer moves to state 0110 where the SLOW DTAK signal is asserted, indicating that the data is valid. PLA 618 asserts ISDTAK on lead 653 and in FIG. 18 this signal passes through transceiver 1858 to assert /SDTAK on lead 1859.

The sequencer remains in state 0110 until the input signal /DS is negated. This causes IDS to be negated at the input of PLA 600 and the output of the PLA 600 sets the sequencer to state 0100. In this state the DMARC negates the control signals and looks for another ECS or AS. If neither of these signals is present to set FF 560 and initiate another cycle, the sequencer moves to the idle state 0000. If one of these signals is present the sequencer moves from state 0100 directly to state 0001, bypassing the idle state.

Interrupt Processing

As previously indicated, an interrupt message cycle may be initiated to transfer status to the system if the memory access error count reaches 256, an error occurs during a message passing or DMA transfer cycle or a DMA transfer is completed. The initiation of the interrupt message cycle is controlled by the configuration of the system control register 264 and DMA control register 266.

An alternative to initiating an interrupt message cycle to report status to the system is to generate an interrupt signal on output lead 1013.

If bit 1 of the DMA control register is set it enables one input of NAND 1024. When an interrupt condition exists which sets stage 7 of the DMA status register 276, the output of the stage passes through NAND 1024 to block NAND 1032. Assuming for the moment that LINTEN is asserted on lead 299, the output of NAND 1032 passes through AND 1038 and transceiver 1044 to assert /INT on lead 1013. This signal may then be applied to the processor local to the DMARC. The interrupt condition is cleared by reading the system status and DMA status.

If bit 11 of the system control register is set then any condition which sets stage 7 of the system status register 274 may cause /INT to be asserted. In this case the output of stage 7 passes through NAND 1026, NAND 1032, AND 1038 and transceiver 1044. The interrupt condition is cleared by reading the system status and DMA status registers.

/INT may also be asserted at the end of a message transfer cycle if stage 0 of the system control register 264 is reset. The output of stage 0 is applied over lead 299 to NAND 1022. At the end of a message transfer cycle, when NAND 1006 asserts a signal to reset the message cycle FF 1032, the output of NAND 1006 acts through inverter 1012 to set FF 1018. The output of the FF passes through NAND 1022, NAND 1032, AND 1038 and transceiver 1038 to assert /INT. In this case /INT tells the local processor it must read the message register 270. When the processor addresses the DMARC to read the register, the read decode circuits of FIG. 7B assert the signal RDMSG3 on lead 721. This signal resets FF 1018 and negates /INT.

The /INT output of the DMARC may be totally disabled if stage 2 of the system control register is reset. This condition negates LINTEN on lead 299 to block AND 1032 so the /INT output remains high.

Refresh State Machine

Figure 12:
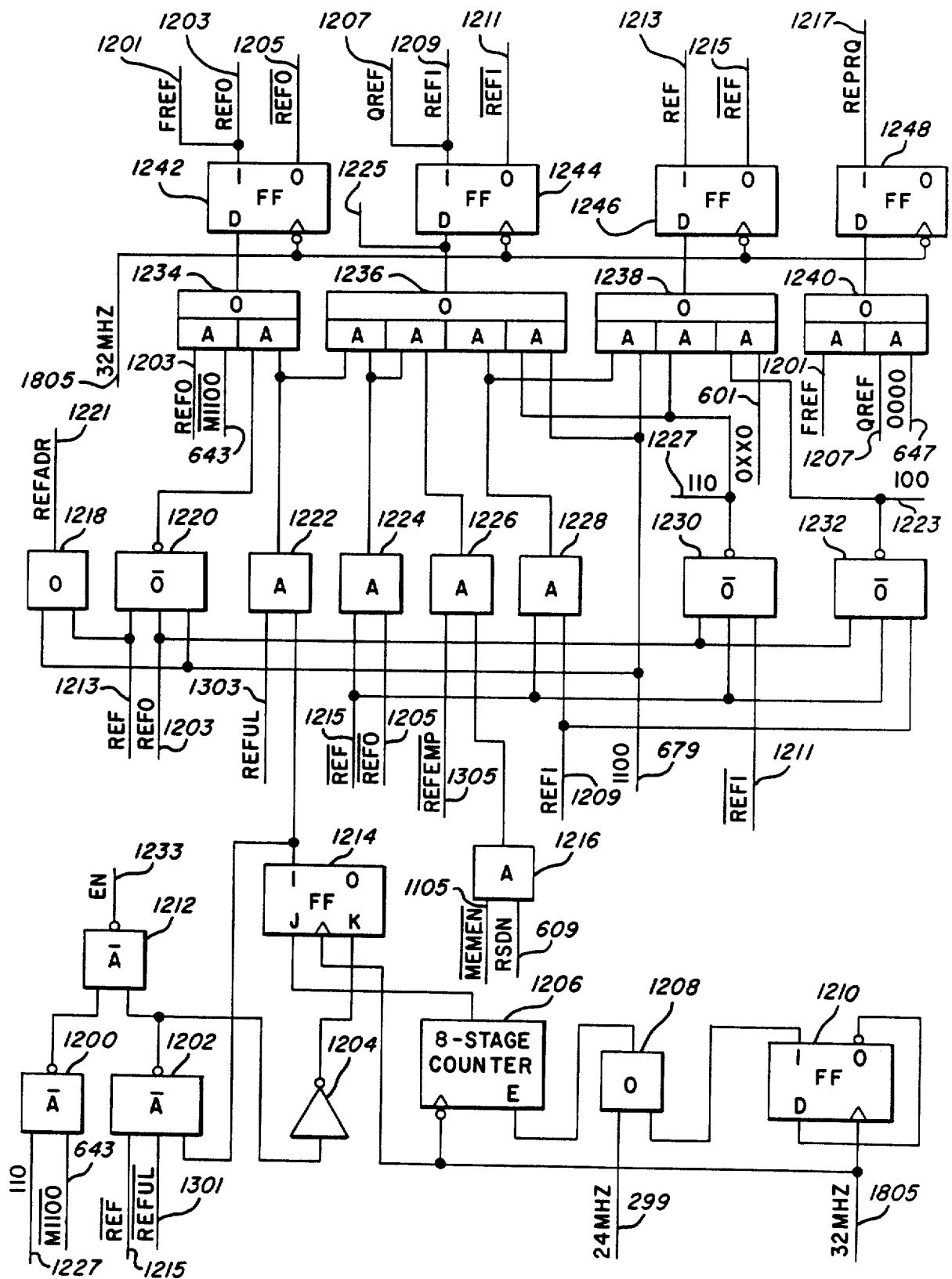
FIGS. 12 and 13 illustrate the memory refresh controls.

The refresh control circuits for controlling the refreshing of the dynamic ram 102 are shown in FIGS. 12 and 13. In FIG. 13, an 8-stage counter is enabled to count upwardly or downwardly when the signal on lead 1233 is high. When enabled, the counter counts upwardly if the signal on lead 1215 is high and counts downward when the signal on lead 1215 is low. The outputs of the counter are connected to four NORs 1304, 1306, 1308 and 1310 and the outputs of the NORs are connected to a NAND 1314. The arrangement is such that when counter 1300 contains a count of zero NAND 1314 asserts the signal /REFEMP on lead 1305 and this signal is applied to AND 1226.

The four high order stages of counter 1300 are connected to a NAND 1302 which asserts the signal /REFUL when counter 1300 contains a count of 240 or greater. /REFUL is inverted at 1312 to assert the signal REFUL. In FIG. 12, /REFUL is applied to one input on NAND 1202 while REFUL is applied to one input of AND 1222.

Clock pulses are applied over lead 1805 to a FF 1210 and an 8-stage counter 1206. FF 1210 acts as a single stage counter which divides the frequency of the 32 MHZ clock by two. Assuming for the moment that input lead 299 to OR 1208 is negated, the output of FF 1210 passes through OR 1208 to enable counter 1206 so that the counter may be incremented by alternate clock pulses. If bit 10 of the system control register 264 is set, it asserts the signal 24 MHZ on lead 299 and this signal acts through OR 1208 to enable the counter to count every 32 MHZ clock pulse. Thus, the counting of counter 1206 is programmable by the system so that the refreshing rate conforms to the type of memory being employed.

The counter 1206 continuously counts clock pulses and each time it reaches a full count it asserts an output signal which sets FF 1214 at the next clock pulse. The output of FF 1214 is applied to AND 1222 and NAND 1202. Assuming that the refresh controls are in state 000 i.e. FFs 1242, 1244 and 1246 are reset, and counter 1300 does not yet contain a count of 240, the output of FF 1214 passes through NAND 1202 to block NAND 1212 and, through inverter 1204, reset FF 1214. The output of NAND 1212 enables counter 1300 so that it begins counting clock pulses. Because FF 1246 is assumed to be reset, the counter counts upwardly. Assuming FF 1246 remains reset, the signal REFUL is asserted on lead 1303 when the counter reaches a count of 240. In FIG. 12 REFUL passes through AND 1222 and AND-/OR 1236 to set FF 1244. The output of NAND 1222 also passes through AND/OR 1234 to set FF 1242 thus placing the refresh controls in state 011 indicating a request and forced request. The output of AND/OR 1236 is applied over lead 1225 to FIG. 6B where it passes through NOR 670 to reset FF 672. This negates REFRESH which is applied to PLA 600. When FF 1242 is set it asserts FREF which passes over lead 1201 and through AND/OR 1240 to set FF 1248. This FF then asserts REFRQ which is applied over lead 1217 to PLA 600. The setting of FF 1244 will also cause REFRQ to be asserted if the main state sequencer is in state 0000. In this case QREF passes through AND/OR 1240 to set FF 1248.

The refresh controls remain in state 011 until the main state sequencer of FIG. 6B reaches state 1100. REF0 is applied to AND/OR 1234 to keep FF 1242 set while REF1 and /REF act through AND 1228 and AND-/OR 1236 to keep FF 1244 set. During this state counter 1300 does not count. When the main state sequencer reaches state 1100 the refresh controls move to state 110 indicating a refresh cycle and request. The signal 1100 passes through AND/OR 1238 to set FF 1246 while the signal /M1100 blocks the AND of AND/OR 1234 through which FF 1234 was being set.

In refresh control state 110 the output /REF from FF 1246 sets the counter 1300 for decrementing but /REF and /M1100 block NANDs 1200 and 1202 so that the output of NAND 1212 prevents counting as long as the main state sequencer is in state 1100.

Also, the output REF of FF 1246 passes through OR 1218 to assert REFADR on lead 1221. In FIG. 2D this signal addresses MUX 248 to gate the output of refresh counter 244 through the MUX to MUXs 216 and 218. The signal SW is negated so the refresh address is applied to the memory through drivers 220. The main state sequencer subsequently causes ROM 618 to assert /RASEN to strobe the row address and refresh the memory.

The refresh controls move to state 100, indicating a refresh cycle, when the main state sequencer leaves state 1100 and moves to the next state. The signal 1100 blocks AND/OR 1236 so that the output of NOR 1230 cannot pass through the AND/OR. The resulting output of the AND/OR resets FF 1244 at the next low-going transition of the clock. The output of FF 1244 passes through NOR 1230 to block NAND 1200 and the output of the NAND 1200 acts through NAND 1233 to enable counter 1300 which is then decremented by succeeding clock pulses. When state 100 is entered the outputs of FFs 1242 and 1244 block AND/OR 1240 so that FF 1248 is reset.

The refresh controls remain in state 100 from the time the main state sequencer leaves state 1100 until it reaches state 0110. At this time both inputs to AND 1404 are enabled and it produces an output signal to enable the refresh counter 244 to be incremented by the next clock pulse. The refresh controls remain in state 100 until the main state sequencer leaves state 0110 at which time AND/OR 1238 is blocked and FF 1246 reset to return the control to state 000.

A cycle of the refresh state controls may also be initiated when counter 1300 does not contain a zero count, the main state sequencer is in state 0X00, the DMARC is not controlling a memory cycle, and FF 1214 is not set or counter 1300 does not contain a count greater than 240. In this case the cycle starts by moving from state 000 to state 010. FF 1244 is set when AND 1216 produces an output to enable AND 1226. With /REFEMP negated the output of AND 1216 passes through AND 1226 and AND/OR 1236 to set FF 1244 and, over lead 1225, reset FF 672.

From state 010 the refresh controls may move to either state 011 or state 110. If REFUL and a refresh request (setting of FF 1214) should occur before the main state sequencer reaches state 1100 the controls move to state 011. In this case the output of AND 1222 acts through AND/ORs 1234 and 1236 to set FFs 1242 and 1244. On the other hand, if the main sequencer should reach state 1100 first then the refresh controls move to state 110. The output of AND 1228 passes through AND/OR 1236 to set FF 1244. The output of the AND 1228 together with the signal 1100 enables AND/OR 1238 to set FF 1246. From state 011 or 110, as the case may be, the refresh controls then move through the same sequence of states as previously described.

During a refresh cycle, the main state sequencer moves through the same sequence of states as for the cycles previously described except that for a refresh cycle the main state sequencer moves from state 0100 through state 1100 to state 0001, bypassing state 0000. In view of the previous explanations with regard to the main state sequencer, its operation in the refresh cycle should be obvious from Tables A, B and C appended hereto.

Error Cycle

If a memory error is detected during a read operation the current DMARC cycle is terminated and an internal error cycle is started. When this occurs the DMARC asserts both the Bus Error and HALT signals. The Bus Error signal is negated when the DMARC cycle is completed. The HALT signal remains asserted until the DMARC is ready to have the processor retry the same access. During the time that HALT is active, the processor must continue to supply a valid memory address on the address bus. The internal error cycle corrects a 1-bit error or asserts a bus error without a HALT signal if more than one bit is detected to be an error. The memory retry cycle is compatible with the 68020 retry function.

During a memory read operation PLA 616 produces a signal at its output 3 when the main state sequencer reaches state 1111. The output of the PLA passes through AND 624 to assert IBEREN on lead 677. In FIG. 19, IBEREN drives the output of NAND 1902 low if bits 12 and 14 of the system control register 264 are set so that ECCOR and ECCPARITY are both asserted. This enables OR 1908 to pass the clocking pulse F32MHZ on lead 1803 to the clocking input of latch 1922.

In FIG. 2C, the error correction bits pass through transceivers 284 and are applied over leads 298 to a first set of seven XNORs 1904 and a second set of seven XNORs 1906. The data read from the memory passes through transceivers 250 in FIG. 2C to the ECC generator 280 which generates ECC bits from the data. These bits are applied over leads 294 to the XNORs 1904. The XNORs 1904 compare the ECC bits read from the memory with those generated from the data read from the memory and if they are not equal at least one of the XNORs asserts a low level output through a seveninput NAND 1912 to enable one input of AND/OR 1918. Since the internal error cycle has not yet started (the sequencer is still in the memory read cycle) the signal on lead 903 is high so AND/OR 1918 produces an output signal to set latch 1922.

The set output of latch 1922 is applied to AND/OR 1928. Both /DMAG and /RMC are high so the output of AND 1900 enables AND/OR 1928 to pass the output of the latch through to transceiver 1932. The transceiver asserts /HALT on lead 1911 and this signal is applied to the bus. The transceiver also asserts HALTI on lead 1909 and, through inverter 1936, /HALTI on lead 1907. In FIG. 5, HALTI acts through NOR 552, NAND 556 and NAND 558 to reset the FF 560.

The reset output of latch 1922 blocks NAND 1930 and the high level output of the NAND is applied to transceiver 1934. The transceiver asserts /BERR on lead 1905 and this signal is applied to the bus. The transceiver also asserts BERRS on lead 1901 and in FIG. 9 this signal is applied to AND 912. Since the main state sequencer is not in state 0000 or 0100 the signal /RSDN is high and the output of AND 912 causes FF 924 to be set at the next clock transition. When the flip-flop is set /LBERR on lead 915 is asserted and in FIG. 19 this signal is applied to transceivers 1932 and 1934 so that the transceivers continue to assert /BERR and /HALT on the bus.

At the time latch 1922 is set it asserts ECCC on lead 1915 and this signal passes through NAND 902 and inverter 906 to set FF 908 at the next clock pulse. The output of NAND 902 is the signal ADRLTCH which is applied over lead 913 to the clocking input of the fault address register 210. This clocks the memory address of the faulty data into the register.

Even though an error has occurred, the main state sequencer continues its normal memory read sequence through states 0110, 0110 and 0100 to state 0000. However, with FF 560 reset, PLA 600 does not produce signals at its outputs 5 and 6. Also, with BERRS asserted at one input of PLA 616, this PLA is prevented from asserting signals at its outputs 1 and 3-6. When state 0110 is reached the signal 0110 on lead 605 passes through AND 918 to set FFs 930 and 932. FF 932 asserts KPHLT through OR 940. The FF 930 asserts ERRCYL on lead 907 and, through OR 938, the signal ERRCYLEX on lead 905. The output of FF 930 also passes through AND 916 to FF 928 which is set by the next low-going transition of the clock.

/ERRCYL blocks NAND 910 and the ouput of the NAND acts through AND 914 to set FF 926 at the same time FF 928 is set. The output of FF 926 acts through OR 934 and NOR 936 to assert RMC and /RMC on leads 901 and 903, respectively. In FIG. 19, KPHLT acts through AND/OR 1928 to continue asserting /HALT even though latch 1922 is reset by the signal /RSDN at state 0100 to disable the other set of inputs to AND/OR 1928. However, the resetting of latch 1922 terminates /BERR.

Table III illustrates the sequence of states the main state sequencer assumes during the error cycle. As previously stated, a valid memory address, i.e. the one resulting in the error, must be maintained on the bus and the signal R/W on lead 345 is asserted high. During the error cycle, the DMARC rereads the data from the memory, corrects it if the error is correctable, writes the corrected data word back in memory and also places the corrected data word on the bus.

In the initial state (0000) PLA 616 negates /WEO on lead 657 and in FIG. 11 /WEO negates /WE so that the circuits of the RAM areset for reading. /WEO remains negated until state 1111 of the error retry cycle is reached.

In state 0001 ROM 618 asserts /RASEN on lead 633 and in FIG. 11 this causes /RAS to be asserted to strobe the row address from the DMARC into the RAM addressing circuits. /RASEN continues to be asserted until the main state sequencer reaches state 1110.

TABLE III

| Input to PLA 600 | SETS STATE | PLA 616 OUT | ROM 618 OUT 0-7 |
|---|---|---|---|
|  | 0000 | 7 | 00010110 |
| 0000 | 0001 | 7 | 01000000 |
| 0001 | 0011 | 0 7 | 01000000 |
| 0011 | 0111 | 0 4 7 | 01000000 |
| 0111 | 0101 | 0 4 7 | 01000000 |
| 0111 | 0010 | * 4 7 | 01000000 |
| — | — | — | — |
| 0010 | 1010 | 01 7 | 01000001 |
| 1010 | 1101 | 01 7 | 01000001 |
| 1101 | 1011 | 01 67 | 01000001 |
| 1011 | 1111 | 01 6 | 01010001 |
| 1111 | 1110 | 01 67 | 01110101 |
| 1110 | 0110 | 1 67 | 01011101 |
| 0110 | 0100 | 5 7 | 00011100 |
| 0100 | 0000 | 7 | 00010110 |

Also, when state 0001 is entered ROM 618 asserts /SWEN on lead 625. In FIG. 6B, /SWEN blocks NAND 634 so that on the next clock, as the sequencer enters state 0011, FF 662 is set. This asserts SW on lead 603 to switch MUXs 216 and 218 so that the column address bits are applied through drivers 220 to the RAM.

In state 0011 PLA 616 begins asserting a signal at its output 0 to set FF 622. The FF asserts CASEN which passes through NOR 1126 to enable generation of one of the column address strobe signals /CAS1-/CAS3 to strobe the column address signals into the RAM. Except for state 0010, PLA 618 continues to assert CASEN until the sequencer reaches state 0110. However, in FIG. 11 the signals /MS1 and 0110 are both low during state 0010 so the output of NOR 1122 acts through NOR 1126 to enable the generation of the column address strobe during state 0010.

Figure 9:
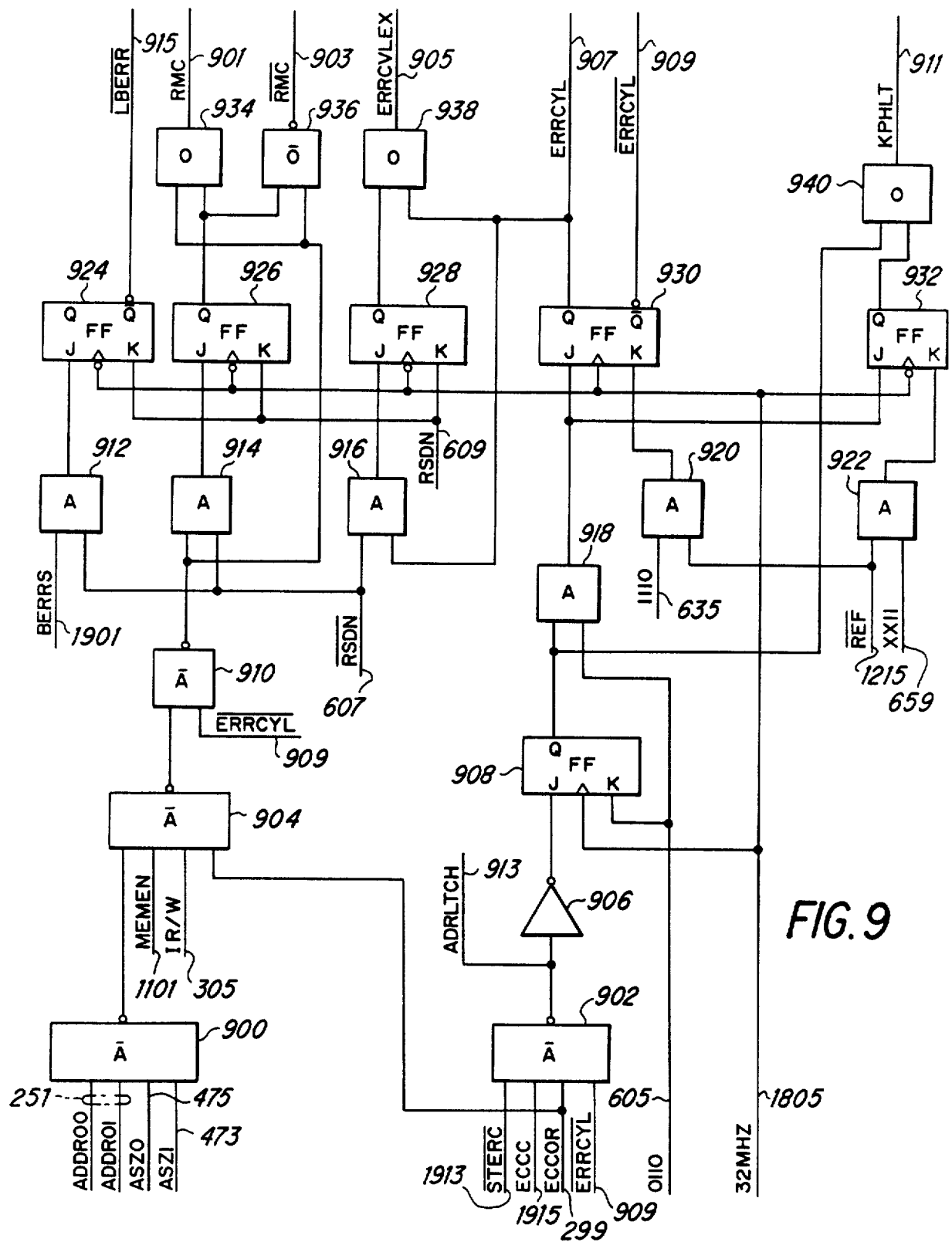
FIGS. 9 and 10 illustrate the message and interrupt cycle controls.

When state 0011 is entered the outputs of sequence FFs 610 and 612 (FIG. 6A) enable NAND 632 (FIG. 6B) so that the signals XX11 and /XX11 are asserted on leads 659 and 615. In FIG. 9, XX11 passes through AND 922 to reset FF 932 at the next low-going transition of the clock. This negates KPHLT and in FIG. 19 KPHLT acts through AND/OR 1928 to negate the bus signal /HALT.

In state 0111 PLA 616 begins asserting a low level signal at its output 4* and continues asserting this signal until state 1010 is reached. When output 4* is low, NOR 626 acts through buffer 628 to assert /OEN to enable the RAM output buffers 132. The data read from the memory is checked as before, and assuming that the error is correctable the bus signal /HALT is negated. The corrected data is later latched into register 258 when ECCLK is asserted on lead 641 as state 1010 is reached.

The sequencer steps through state 0101 to state 0010 and waits for /DS to be asserted on the bus. When /DS is asserted the sequencer moves to state 1010 where /OE is negated by output 4* from PLA 616. At this time ROM 618 asserts the signal 11XXXX11 on lead 667 and, through AND 639, the signal RMCDIR on lead 639. In FIG. 8, 11XXXX11 causes /DMA1-/DMA4 to be asserted and in FIG. 2C these signals set transceivers to the output mode so that the corrected data may be written back into RAM 102 from register 258. In FIG. 3B, RMCDIR causes IBDIRBO to be negated thereby setting transceivers 284 to he output mode so that the ECC bits may be gated from the ECC generator 280 through the transceivers to the RAM.

From state 1010 the sequencer moves to state 1101 and then to state 1011. In state 1011 PLA 616 begins asserting the signal INDTAK on lead 671. In FIG. 18 this signal passes through NOR 1850, inverter 1852 and transceiver 1854 to assert /DTAK on the bus. The sequencer then advances to state 1111 where PLA 616 asserts /WEO on lead 657. In FIG. 11, /WEO passes through NOR 1106 and driver 1108 to assert /WE on lead 1111. This signal enables the RAM control circuits to write the corrected data back into the RAM 102.

When state 1111 is entered ROM 618 negates /SWEN and when state 1110 is entered the ROM negates /RASEN and asserts the signal 1110 on lead 635. The signal on lead 635 acts through AND 920 to reset the error FF 930 thereby negating the signals ERRCYL and RMC.

The sequence then moves to state 0110 and PLA 616 negates the signal which has kept FF 622 set. CASEN is then negated at the next low-going clock transition. From state 0110 the sequencer moves to state 0100 where PLA 616 negates INDTAK, and BUF and asserts the signal ISDTAK. The signal ISDTAK is applied over lead 653 to transceiver 1858 which asserts /SDTAK on the bus. /DTAK is negated. The sequencer then moves to state 0000 at which time PLA 616 negates ISDTAK.

If the error should not be correctable, the sequencer moves through the states just described. However, the /BERR is asserted (without bus HALT). In this case, the comparison of the ECC read from the memory with the ECC generated from the data causes XNORs 1904 to produce an address which, when applied to ROM 1910, causes the ROM to produce an output signal which passes through AND/OR 1918 to set latch 1922. The reset output of the latch passes through NAND 1930 and transceiver 1934 to assert /BERR. However, the set output of the latch is blocked at AND/OR 1928 because /RMC is asserted so that the output of AND 1900 blocks AND/OR 1928. This prevents the assertion of /HALT.

Conclusion

From the foregoing description it is seen that a DMARC chip constructed in accordance with the principles of the present invention provides a controller incorporating many advantageous features. It permits direct memory-to-memory transfers during a single clock cycle by simultaneously addressing both memories and passing the data from memory to bus and bus to memory, the data bypassing the controller. A secure system is provided because each controller, must when it is a bus master, transmit an indication of what degree of freedom it may have in accessing memory space. For all but the lowest degree of freedom, the indication is stored in the controller by the system processor when operating in the executive mode or by another controller whose indication has previously been set by the system processor. The controller provides an improved handling of interrupts which does not require polling before the interrupt status is reported. In addition, it provides memory refreshing for dynamic memories and extensive error checking of data.

While a specific embodiment has been described for purposes of illustration, it will be understood that various substitutions and modifications may be made in the described embodiment without departing from the spirit and scope of the invention as defined in the appended claims. For example, it is within the scope of the invention to provide, on bus 107, one or more units which are permitted only the "external" level of access, such units being controlled by DMARC controllers and including an EXTERNAL signal generator operative in response to a bus grant acknowledge for asserting the signal EXTERNAL on each bus transaction.

TABLE A
PLA 600 LOGIC EQUATIONS APPENDIX

```
F0=  (A11*.A10.A9*.A8*.A7*.A1)
    +(A11*.A10*.A9*.A8*.A1)
    +(A11*.A10*.A8)
    +(A11.A10*.A9.A8*)
    +(A11.A10*.A9.A8)
    +(A11*.A10.A9.A8)
    +(A11.A10.A9*.A8)
    +(A11.A10*.A9*.A8*)
    +(A11.A10.A9*.A8*.A2*)

F1=  (A11*.A10*.A9*.A8.A6)
    +(A11.A10*.A9*.A8*)
    +(A11*.A10*.A9)
    +(A11*.A10.A9*.A8)
    +(A11.A10*.A9.A8)
    +(A11.A10.A9*.A8)
    +(A11.A10.A9.A8)
    +(A11.A10.A9.A8*)
    +(A11*.A10.A9.A8*.A3.A2.A1*)

F2=  (A11*.A10.A9*.A8*.A7)
    +(A11*.A10*.A9*.A8*.A7.A1*)
    +(A11.A10.A9*.A8*.A2)
    +(A11*.A10*.A9.A8.A5.A2.A1.A0*)
    +(A11*.A10*.A9.A8.A2.A1.A0)
    +(A11*.A10*.A9.A8.A4.A2)
    +(A11*.A10.A9.A8*)
    +(A11*.A10.A9.A8)
    +(A11.A10*.A9.A8*)
    +(A11.A10*.A9.A8)
    +(A11.A10.A9.A8*)
    +(A11.A10.A9.A8)

F3=  (A11*.A10*.A9*.A8*.A7.A1*)
    +(A11*.A10*.A9*.A8.A6*)
    +(A11*.A10*.A9.A8*.A3)
    +(A11*.A10*.A9.A8*.A1)
    +(A11*.A10*.A9.A2*)
    +(A11*.A10*.A9.A8.A4*.A3.A1*)
    +(A11*.A10.A9*.A8*.A7)
    +(A11*.A10.A9.A8.A4*)
    +(A11.A10*.A9*.A8)
    +(A11.A10*.A9.A8*)
    +(A11.A10*.A9.A8)
    +(A11.A10.A9*.A8*.A2)
    +(A11.A10.A9*.A8)
    +(A11.A10.A9.A8*.A5*.A2.A1)
    +(A11.A10.A9.A8)

F4=  0

F=5  (A8.A4*.A2.A1.A0*)
    +(A11.A10*.A9*.A4*.A2.A1.A0*)
    +(A11.A9.A4*.A2.A1)
    +(A11.A10.A8.A4*.A2.A1)

F6=  (A8.A4*.A2.A1)
    +(A11.A10*.A9*.A4*.A2.A1)
    +(A11.A9.A4*.A2.A1)

F7=  0
```

. = AND  
* = COMPLEMENT  
+ = OR

TABLE B
PLA 616 LOGIC EQUATIONS

```
F0=  (A1.A3.A9*)
    +(A2.A3.A9*)
    +(A0.A1*.A2*.A9*)
    +(A0.A2.A9*)

F1=  (A0.A2.A9*.A10.A7*)
    +(A1.A2.A3*.A9*.A10.A7*)
    +(A0.A1.A3.A9*.A10.A7*)
    +(A8)
    +(A2.A9*.A4.A7*)
    +(A1.A2*.A3.A9*.A4.A7*)
    +(A2.A3.A11*.A9*.A10.A5*.A7*)

F2=  0
F3=  (A0.A1.A2.A3.A10.A6.A11*.A7*)
    +(A0*.A1*.A2.A3*.A5.A7*)
    +(A0.A1.A2*.A3.A4.A5*.A6*.A11*.A7*)

F4=  (A0*.A1.A3.A5.A8*.A7*)
    +(A0*.A1*.A2.A3*.A5.A8*.A7*)
    +(A0.A2.A3.A5*.A6.A8*.A7*)
    +(A1.A2.A3*.A5*.A6.A8*.A7*)
    +(A0*.A1.A2.A3.A6.A4.A7*)
    +(A0.A1.A2*.A3.A4.A5*.A6.A7*)

F5=  (A0*.A1.A3*.A10.A9*.A7*)
    +(A0*.A1.A3*.A8.A9*.A7*)

F6=  (A1.A2.A3*.A10.A9*.A7*)
    +(A1.A2.A3*.A8.A9*.A7*)
    +(A0.A2.A3.A10.A9*.A7*)
    +(A0.A2.A3.A8.A9*.A7*)

F7=  A0*+A2*+A3*+(A5*.A6)
```

. = AND  
* = COMPLEMENT  
+ = OR

TABLE C

| DECODE ROM 618 | | | |
|---|---|---|---|
| ADDR | OUTPUT | ADDR | OUTPUT |
| 00 | 02 | 09 | 82 |
| 01 | 02 | 0A | 02 |
| 02 | 02 | 0B | 02 |
| 03 | 68 | 0C | 8A |
| 04 | 02 | 0D | AE |
| 05 | BA | 0E | 82 |
| 06 | 02 | 0F | 28 |
| 07 | 38 | 10-1F | FF |

We claim:

1. In a data processing system including a system processor, a plurality of units having addressable memory space, and a bus over which data may be transferred between said units, the improvement comprising:
   a plurality of controllers connected to said bus, each of said controllers being associated with one of said units by connection thereto;
   each of said controllers including,
   first means for placing an address on said bus, said address being an address in the memory space of a unit associated with one of said controllers other than the one placing said address;
   second means for generating and placing on said bus a security level signal indicating the security level of memory space which the controller may access;
   third means for storing limiting addresses defining boundaries for each security level of the memory space in the unit associated with the controller, said boundaries defining at least a lower security level memory space and a higher security level memory space;

fourth means responsive to a security level signal placed on said bus by any other controller for selecting one of said limiting addresses;

fifth means for comparing said selected limiting address and an address placed on said bus, said fifth means producing an error signal when the address placed on said bus by a given controller is an address in said memory space having a higher security level than that of the security level signal placed on said bus by said given controller.

2. The improvement as claimed in claim 1 wherein:

said second means in at least one of said controllers comprises means for selectively producing a system security level signal or a user security level signal, said system security level signal indicating a highest level of security, said second means in another of said controllers comprises means for generating an external security level signal indicating the lowest level of security; and, said fifth means is responsive to a user security level signal for comparing one of said limiting addresses to an address placed on said bus and responsive to an external security level signal for comparing a second of said limiting addresses to an address placed on said bus.

3. The improvement as claimed in claim 1 wherein said second means comprises a register for selectively producing a system security level signal or a user security level signal, means for selectively setting or resetting said register only when said register is addressed by an address on said bus and a system security level signal is on said bus, said register producing said system security level signal when set and said user security level signal when reset.

4. The improvement as claimed in claim 1 wherein two of said units comprise addressable memories and the controllers associated with said addressable memories include sixth means for addressing the addressable memory associated with the controller concurrently with the placing of an address on said bus by said first means whereby two addressable memories are concurrently addressed for direct memory to memory transfer of data therebetween.

5. The improvement as claimed in claim 4 wherein said first means and said sixth means each comprises a counter, and means for incrementing both of said counters whereby blocks of data are transferred between said memories.

6. The improvement as claimed in claim 5 wherein one of said memories is a local memory for said system processor.

7. In a data processing system including a system processor producing an address and a system security level signal or a user security level signal, a memory unit including addressable memory space, at least one other unit, and a bus interconnecting all of said units and said system processor for the transfer of data, the improvement comprising:

first and second controllers, said first controller being connected to said bus and said memory unit and said second controller being connected to said bus and said other unit;

said second controller including a register settable only when a system security level signal is present on said bus for selectively placing on said bus a system security level signal or a user security level signal;

said second controller including means for placing on said bus an address for accessing said memory space;

said first controller including first means for defining addresses in said memory space as user space and system space;

said first controller including second means responsive to said system security level signal and the address place on said bus for accessing said memory space when the address placed on said bus is an address in said system space or said user space;

said first controller including means responsive to said user security level signal for prohibiting access to said memory space when the address placed on said bus is an address in said system space.

8. The improvement as claimed in claim 7 wherein said memory unit is a local memory for said system processor.

9. The improvement as claimed in claim 7 and further comprising:

at least one external unit connected to said bus and including, means for placing an address on said bus;

means for placing an external security level signal on said bus each time said external unit places an address on said bus;

said first controller including third means for defining addresses in said memory space as external space;

said first controller including a fourth means responsive to said external security level signal and the address placed on said bus for accessing said memory space only if said address is an address in said memory space that is defined by said third means as external space.

10. The improvement as claimed in claim 9 wherein said external unit comprises a second system processor.

11. The improvement as claimed in claim 7 wherein said other unit is an addressable memory.

12. In a data processing system including plurality of units at least one of which includes addressable memory space, a system processor, a bus interconnecting said units and said system processor, each unit having a controller connected to it and said bus, the improvement comprising means for limiting access to said addressable memory space, said means comprising:

first means in each of said controllers and said system processor for placing a system or a user security level signal on said bus concurrently with an address;

means defining boundaries of user space in said addressable memory space; and, means responsive to a security level signal placed on said bus by any of said units for determining if the address on said bus is permitted to access said addressable memory space, said last-named means permitting access to all said addressable memory space if the security level signal on said bus is a system security level signal but permitting access to said user space only if the security level signal on said bus is a user security level signal.

13. The improvement as claimed in claim 12 wherein said first means comprises a register settable only when addressed by an address on said bus and a system security level signal is present on said bus.

14. In a data processing system including a system processor for generating a higher security level signal or a lower security level signal, a first unit including addressable memory space which may be accessed;, a plurality of other units for addressing said addressable memory space; and a bus interconnecting said system processor and said units, the improvement comprising:
- a plurality of controllers, each of said controllers being connected to said bus and associated with one of said units by connection thereto;
- means in each of said controllers for placing an address and a security level signal on said bus, the security level signal indicating the highest security level memory space to which the controller is permitted access;
- first means in the controller associated with said first unit responsive to an address placed on said bus by said system processor or any of said plurality of other units for accessing said addressable memory space, and,
- second means in the controller associated with said first unit for selectively inhibiting said first means, said second means including third means responsive to a security level signal on said bus for partitioning said memory space into higher security level space and lower security level space, and fourth means responsive to the address on said bus and to said third means for producing a signal to inhibit said first means when the address on said bus is an address in said higher security level space and the security level signal on said bus is a lower security level signal.

15. The improvement as claimed in claim 14 wherein the means in each of said controllers for placing an address and a security level signal on said bus comprises an addressable register for generating said security level signal, said register being loadable from said bus only when its address appears on said bus together with a higher security level signal.

16. The improvement as claimed in claim 14 wherein said third means comprises addressable register means loadable from said bus only when its address appears on said bus together with a higher security level signal.

17. The improvement as claimed in claim 14 wherein a second of said units includes further addressable memory space the controllers associated with said first unit and said second unit each including direct memory access control means for simultaneously generating the address of a memory location in said memory space and a memory location in said further addressable memory space.

* * * * *